US011884077B2

(12) United States Patent
Tomoguchi

(10) Patent No.: US 11,884,077 B2
(45) Date of Patent: *Jan. 30, 2024

(54) PRINTING-FLUID CARTRIDGE INCLUDING CONTACT SURFACE FOR PROVIDING POSITIONING OF THE PRINTING-FLUID CARTRIDGE

(71) Applicant: BROTHER KOGYO KABUSHIKI KAISHA, Nagoya (JP)

(72) Inventor: Suguru Tomoguchi, Okazaki (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/061,654

(22) Filed: Dec. 5, 2022

(65) Prior Publication Data

US 2023/0166517 A1 Jun. 1, 2023

Related U.S. Application Data

(60) Continuation of application No. 16/865,553, filed on May 4, 2020, now Pat. No. 11,529,812, which is a (Continued)

(30) Foreign Application Priority Data

Dec. 28, 2016 (JP) ................................ 2016-255351

(51) Int. Cl.
*B41J 2/175* (2006.01)

(52) U.S. Cl.
CPC ........... *B41J 2/17526* (2013.01); *B41J 2/175* (2013.01); *B41J 2/1752* (2013.01); *B41J 2/1753* (2013.01);
(Continued)

(58) Field of Classification Search
CPC .... B41J 2/17526; B41J 2/175; B41J 2/17513; B41J 2/1752; B41J 2/17523; B41J 2/1753; B41J 2/17553
See application file for complete search history.

(56) References Cited

U.S. PATENT DOCUMENTS 5,788,388 A 8/1998 Cowger et al.
5,949,459 A 9/1999 Gasvoda et al.
(Continued)

FOREIGN PATENT DOCUMENTS

CN 1344618 A 4/2002
CN 1449919 A 10/2003
(Continued)

OTHER PUBLICATIONS

Related U.S. Appl. No. 15/664,015, filed Jul. 31, 2017.
(Continued)

*Primary Examiner* — Yaovi M Ameh
(74) *Attorney, Agent, or Firm* — Merchant & Gould P.C.

(57) ABSTRACT

A printing-fluid cartridge is inserted into a printing-fluid consuming apparatus in an insertion direction crossing a gravitational direction and attached thereto in a first posture. The printing-fluid cartridge includes: a storage chamber, a supply portion having a supply port, an upper surface and a locking surface positioned upward of the storage chamber, an electrical interface disposed at the upper surface, and a contact surface positioned rearward relative to the supply port of the supply portion in the insertion direction in the first posture. The printing-fluid cartridge inserted in the printing-fluid consuming apparatus is movable between the first posture and a second posture. In the first posture, the locking surface engages a lock portion and the contact surface abuts against a positioning portion. In the second posture, the locking surface is positioned downward relative
(Continued)

to the lock portion and the contact surface is separated from the positioning portion.

17 Claims, 30 Drawing Sheets

Related U.S. Application Data continuation of application No. 16/410,507, filed on May 13, 2019, now Pat. No. 10,668,735, which is a division of application No. 15/664,348, filed on Jul. 31, 2017, now Pat. No. 10,328,706.

(52) U.S. Cl.
CPC ....... *B41J 2/17513* (2013.01); *B41J 2/17523* (2013.01); *B41J 2/17553* (2013.01)

(56) References Cited

U.S. PATENT DOCUMENTS

| | | | |
|---|---|---|---|
| 9,511,592 | B2 | 12/2016 | Kobayashi et al. |
| 9,815,288 | B2 | 11/2017 | Wang |
| 10,363,750 | B2 | 7/2019 | Miyao |
| 11,027,552 | B2 | 6/2021 | Nukui et al. |
| 11,529,812 | B2 * | 12/2022 | Tomoguchi ............ B41J 2/1752 |
| 2002/0071002 | A1 | 6/2002 | Kawamura et al. |
| 2003/0214559 | A1 | 11/2003 | Shinada et al. |
| 2005/0140758 | A1 | 6/2005 | Merz et al. |
| 2006/0007282 | A1 | 1/2006 | Lee |
| 2006/0139420 | A1 | 6/2006 | Muranaka et al. |
| 2007/0149044 | A1 | 6/2007 | Asauchi |
| 2007/0242115 | A1 | 10/2007 | Shizawa et al. |
| 2007/0268325 | A1 | 11/2007 | Watanabe |
| 2011/0205284 | A1 | 8/2011 | Yoshino et al. |
| 2011/0310189 | A1 | 12/2011 | Kanbe et al. |
| 2013/0050357 | A1 | 2/2013 | Kanbe et al. |
| 2013/0050358 | A1 | 2/2013 | Kanbe et al. |
| 2013/0050359 | A1 | 2/2013 | Kanbe et al. |
| 2013/0063532 | A1 | 3/2013 | Takata et al. |
| 2013/0162733 | A1 * | 6/2013 | Nakamura ........... B41J 2/17513 347/86 |
| 2013/0162734 | A1 | 6/2013 | Norikane et al. |
| 2013/0278683 | A1 | 10/2013 | Tomoguchi |
| 2013/0278684 | A1 | 10/2013 | Kanbe et al. |
| 2014/0015904 | A1 | 1/2014 | Kanbe et al. |
| 2014/0292958 | A1 | 10/2014 | Tomoguchi et al. |
| 2014/0362147 | A1 | 12/2014 | Blowfield et al. |
| 2015/0077484 | A1 | 3/2015 | Nagashima et al. |
| 2016/0001563 | A1 | 1/2016 | Takagi et al. |
| 2016/0167392 | A1 | 6/2016 | Xia et al. |
| 2016/0279952 | A1 | 9/2016 | Wang |
| 2016/0279955 | A1 | 9/2016 | Wang et al. |
| 2016/0279959 | A1 | 9/2016 | Okazaki et al. |
| 2016/0279960 | A1 | 9/2016 | Okazaki et al. |
| 2016/0368272 | A1 | 12/2016 | Ono et al. |
| 2017/0066248 | A1 | 3/2017 | Ono |
| 2017/0066249 | A1 | 3/2017 | Ono et al. |
| 2017/0120588 | A1 | 5/2017 | Muraoka et al. |
| 2018/0178528 | A1 | 6/2018 | Nakazawa |
| 2018/0178535 | A1 | 6/2018 | Tomoguchi |

FOREIGN PATENT DOCUMENTS

| | | | |
|---|---|---|---|
| CN | 1721193 | A | 1/2006 |
| CN | 1968818 | A | 5/2007 |
| CN | 101073951 | A | 11/2007 |
| CN | 101132925 | A | 2/2008 |
| CN | 101954795 | A | 1/2011 |
| CN | 102285233 | A | 12/2011 |
| CN | 103171293 | A | 6/2013 |
| CN | 203543370 | A | 4/2014 |
| CN | 203567363 | U | 4/2014 |
| CN | 104070821 | A | 10/2014 |
| CN | 204172493 | U | 2/2015 |
| CN | 104999798 | A | 10/2015 |
| CN | 205439589 | U | 8/2016 |
| EP | 1 967 367 | A2 | 9/2008 |
| EP | 2 607 083 | A1 | 6/2013 |
| EP | 2 607 084 | A1 | 6/2013 |
| EP | 2 607 087 | A1 | 6/2013 |
| EP | 2 607 088 | A2 | 6/2013 |
| EP | 2 743 086 | A2 | 6/2014 |
| EP | 2 783 862 | A2 | 10/2014 |
| EP | 3 112 163 | A1 | 1/2017 |
| EP | 3 112 167 | A | 1/2017 |
| JP | 2002-508720 | A | 3/2002 |
| JP | 2004-195962 | A | 7/2004 |
| JP | 2005-193664 | A | 7/2005 |
| JP | 2006-159578 | A | 6/2006 |
| JP | 2007-261286 | A | 10/2007 |
| JP | 2007-301979 | A | 11/2007 |
| JP | 2008-221803 | A | 9/2008 |
| JP | 2009-132118 | A | 6/2009 |
| JP | 2011-167966 | A | 9/2011 |
| JP | 2013-049166 | A | 3/2013 |
| JP | 2013-129171 | A | 7/2013 |
| JP | 2013-129178 | A | 7/2013 |
| JP | 2013-220650 | A | 10/2013 |
| JP | 2015-58545 | A | 3/2015 |
| JP | 2016-185643 | A | 10/2016 |
| JP | 2016-185648 | A | 10/2016 |
| JP | 2016-185650 | A | 10/2016 |
| JP | 2016-185652 | A | 10/2016 |
| JP | 2016-185658 | A | 10/2016 |
| JP | 2016-185707 | A | 10/2016 |
| JP | 2017-81009 | A | 5/2017 |
| WO | 2017/006365 | A1 | 1/2017 |
| WO | 2017/006368 | A1 | 1/2017 |

OTHER PUBLICATIONS

Related U.S. Appl. No. 15/664,048, filed Jul. 31, 2017.
Related U.S. Appl. No. 15/664,089, filed Jul. 31, 2017.
Extended European Search Report issued in related European Application No. 17184057.2, dated Jan. 24, 2018.
Extended European Search Report issued in related European Application No. 17184052.3, dated Jan. 23, 2018.
International Search Report and Written Opinion issued in related International Application No. PCT/JP2017/027650 dated Apr. 5, 2018.
Extended European Search Report issued in related European Patent Application No. 17184060.6, dated Feb. 7, 2018.
International Search Report and Written Opinion issued in related International Application No. PCT/JP2017/027644 dated May 7, 2018.
International Search Report and Written Opinion issued in related International Application No. PCT/JP2017/027639 dated May 7, 2018.
International Search Report and Writtention issued in related international applicaiton PCT/JP2017/027631, dated Apr. 30, 2018.
Office Action issued in related U.S. Appl. No. 15/664,015, dated Jun. 29, 2018.
Office Action issued in related U.S. Appl. No. 15/664,089, dated Aug. 9, 2018.
Office Action issued in related U.S. Appl. No. 15/664,048, dated Aug. 10, 2018.
Office Action issued in related U.S. Appl. No. 15/664,015, dated Jan. 28, 2019.
Office Action (Notice of Allowance) issued in related U.S. Appl. No. 15/664,048, dated Mar. 21, 2019.
Office Action (Notice of Allowance) issued in related U.S. Appl. No. 15/664,089,dated Apr. 4, 2019.
Office Action (Notice of Allowance) issued in related U.S. Appl. No. 15/664,015, dated Apr. 16, 2019.
Extended European Search Report issued in related European Application No. 17184043.2, dated Jan. 19, 2018.
International Preliminary Report on Patentability issued in corresponding International Patent Application No. PCT/JP2017/027639, dated Feb. 13, 2020.

(56) References Cited

OTHER PUBLICATIONS

International Preliminary Report on Patentability issued in related International Patent Application No. PCT/JP2017/027631, dated Feb. 13, 2020.
International Preliminary Report on Patentability issued in related International Patent Application No. PCT/JP2017/027644, dated Feb. 13, 2020.
International Preliminary Report on Patentability issued in related International Patent Application No. PCT/JP2017/027650, dated Feb. 13, 2020.
Written Opinion issued in related Singapore Patent Application No. 11201908024W, dated Apr. 6, 2020.
Written Opinion issued in related Singapore Patent Application No. 11201907784W, dated Apr. 6, 2020.
Office Action issued in related U.S. Appl. No. 16/517,966, dated Jun. 26, 2020.
Office Action issued in related U.S. Appl. No. 16/516,797, dated Jun. 26, 2020.
Office Action (Examination Report No. 1) issued related Australian Patent Application No. 2017426461, dated Jul. 8, 2020.
Extended European Search Report issued in related European Patent Application No. 20159598.0, dated Jul. 16, 2020.
Extended European Search Report issued in corresponding European Patent Application No. 20174579.1, dated Aug. 24, 2020.
Notification of First Office Action issued in related Chinese Patent Application No. 201780005302.X, dated Sep. 27, 2020.
Notice of Allowance issued in related U.S. Appl. No. 16/517,966, dated Oct. 29, 2020.
Notification of First Office Action issued in related Chinese Patent Application No. 201780005279.4, dated Sep. 18, 2020.
Notification of First Office Action issued in related Chinese Patent Application No. 201780005291.5, dated Sep. 27, 2020.
Office Action issued in related Canadian Patent Application No. 3,054,274, dated Nov. 3, 2020.
Notice of Allowance issued in related U.S. Appl. No. 16/516,797, dated Dec. 30, 2020.
Notice of Allowance issued in related U.S. Appl. No. 16/516,911, dated Dec. 30, 2020.
Office Action (Notice of Reasons for Refusal) issued in related Japanese Patent Application No. 2016-256032, dated Dec. 1, 2020.
Office Action (Notice of Reasons for Refusal) issued in related Japanese Patent Application No. 2016-255352, dated Dec. 15, 2020.
Office Action (Notice of Reasons for Refusal) issued in corresponding Japanese Patent Application No. 2016-255351, dated Dec. 15, 2020.
Notice of Allowance issued in related U.S. Appl. No. 16/516,797, dated Jan. 22, 2021.
Notice of Allowance issued in related U.S. Appl. No. 16/516,911, filed Jan. 22, 2021.
Notice of Allowance issued in related U.S. Appl. No. 16/517,966, dated Jan. 22, 2021.
Notice of Allowance issued in related U.S. Appl. No. 16/516,797, dated Feb. 3, 2021.
Notice of Allowance issued in related U.S. Appl. No. 16/516,911, dated Feb. 3, 2021.
Notice of Allowance issued in related U.S. Appl. No. 16/517,966, dated Feb. 3, 2021.
Examination Report issued in related New Zealand Patent Application No. 756914, dated May 31, 2021.
Office Action issued in related Japanese Patent Application No. 2016-255352, dated Jul. 13, 2021.
Notification of Second Office Action issued in corresponding Chinese Patent Application No. 201780005303.4, dated Aug. 3, 2021.
Office Action issued in related European Patent Application No. 19211032.8, dated Mar. 17, 2022.
Office Action issued in related U.S. Appl. No. 17/337,685, dated Jul. 5, 2022.
Notice of Allowance issued in related U.S. Appl. No. 17/337,685, dated Nov. 2, 2022.
Office Action issued in related Japanese Patent Application No. 2022-013853, dated Mar. 22, 2023.

* cited by examiner

PRINTING-FLUID CARTRIDGE INCLUDING CONTACT SURFACE FOR PROVIDING POSITIONING OF THE PRINTING-FLUID CARTRIDGE

CROSS REFERENCE TO RELATED APPLICATION

This application is a continuation of U.S. patent application Ser. No. 16/865,553, filed May 4, 2020, now U.S. Pat. No. 11,529,812, which is a continuation of U.S. patent application Ser. No. 16/410,507, filed May 13, 2019, now U.S. Pat. No. 10,668,735, which is a divisional of U.S. patent application Ser. No. 15/664,348, filed Jul. 31, 2017, now U.S. Pat. No. 10,328,706, which further claims priority from Japanese Patent Application No. 2016-255351 filed Dec. 28, 2016, now Japan Patent No. 6930104. The entire contents of the aforementioned applications are incorporated herein by reference. Further, the present application closely relates to U.S. patent application Ser. No. 15/664,015, filed Jul. 31, 2017, now U.S. Pat. No. 10,391,777, another U.S. patent application Ser. No. 15/664,089, filed Jul. 31, 2017, now U.S. Pat. No. 10,384,459, and still another U.S. patent application Ser. No. 15/664,048, filed Jul. 31, 2017, now U.S. Pat. No. 10,363,750, which are incorporated by reference.

TECHNICAL FIELD

The present disclosure relates to a printing-fluid cartridge configured to be attached to a printing-fluid consuming apparatus.

BACKGROUND

Conventionally, there have been known inkjet recording apparatuses configured to record images on recording mediums by ejecting ink stored in ink cartridges through nozzles. There is known an inkjet recording apparatus in which a new ink cartridge is mountable every time ink is consumed.

For example, Japanese Patent Application Publication (Translation of PCT application) No. 2002-508720 discloses an ink container 12 that is detachably mountable in a printing device 86. The ink container 12 includes an engaging portion 62. In a state that the ink container 12 is inserted in the printing device 86, the engaging portion 62 of the ink container 12 is engaged with an engaging portion 76 of the printing device 86, thereby realizing positioning of the ink container 12 within the printing device 86 against urging forces of springs 98 and 108.

SUMMARY

The ink container 12 includes an information storage device 34. In order to prevent adhesion of ink to the information storage device 34 during insertion of the ink container 12 into the printing device 86, the information storage device 34 may be disposed at an upper surface of the ink container 12 rather than a surface at which an ink supply portion is disposed. In this case, the information storage device 34 should preferably be positioned with accuracy relative to the printing device 86. In the above-described conventional structure, the urging forces of the springs 98 and 108 solely apply to the engaging portion 76. As a result, creep deformation is likely to occur at the engaging portion 76. Further, in case that the engaging portion 76 is configured of a plurality of parts, tolerance of the plurality of parts may have adverse effect on accuracy in positioning of the information storage device 34.

In view of the foregoing, it is an object of the present disclosure to provide a printing-fluid cartridge that can realize, through a simple structure, enhanced positioning accuracy of a printing-fluid cartridge and an electrical interface of the printing-fluid cartridge relative to a printing-fluid consuming apparatus in which the printing-fluid cartridge is mounted.

In order to attain the above and other objects, the present disclosure provides a printing fluid cartridge configured to be inserted into a printing-fluid consuming apparatus in an insertion direction crossing a gravitational direction and attached to the printing-fluid consuming apparatus in a first posture against an urging force acting in a removal direction opposite to the insertion direction. The printing-fluid cartridge includes a storage chamber, a supply portion, an upper surface, an electrical interface, a locking surface, and a contact surface. The storage chamber is configured to store printing fluid therein. The supply portion is configured to supply the printing fluid from the storage chamber, the supply portion having a supply port into which a supply tube provided at the printing-fluid consuming apparatus is configured to be inserted, the supply port facing frontward in the insertion direction in the first posture. The upper surface is positioned upward relative to the storage chamber and faces upward in the first posture. The electrical interface is disposed at the upper surface and is configured to make contact with a contact provided at the printing-fluid consuming apparatus, the electrical interface being positioned rearward relative to the supply port of the supply portion in the insertion direction in the first posture. The locking surface is positioned upward relative to the storage chamber and faces rearward in the insertion direction in the first posture, the locking surface having an engaging portion configured to engage a lock portion provided at the printing-fluid consuming apparatus. The contact surface is positioned rearward relative to the supply port of the supply portion in the insertion direction in the first posture, the contact surface facing upward in the first posture and configured to abut against a positioning portion provided at the printing-fluid consuming apparatus. The printing-fluid cartridge inserted in the printing-fluid consuming apparatus is movable between the first posture and a second posture, the engaging portion of the locking surface being in engagement with the lock portion and the contact surface being in abutment with the positioning portion in the first posture of the printing-fluid cartridge, the locking surface being positioned downward relative to the lock portion and the contact surface being separated from the positioning portion in the second posture of the printing-fluid cartridge.

According to another aspect, the present disclosure also provides a printing-fluid cartridge including a front surface, a rear surface, a storage chamber, a supply portion, an upper surface, a locking surface, an electrical interface and a contact surface. The rear surface is away from the front surface in a rearward direction crossing a gravitational direction in an upright posture, the rear surface facing rearward in the upright posture. The storage chamber is configured to store printing fluid therein and positioned between the front surface and the rear surface. The supply portion has a supply port through which the printing fluid is configured to flow out of the storage chamber in a frontward direction opposite to the rearward direction in the upright posture, the supply port defining a center in the gravitational direction. The upper surface is positioned upward relative to the storage chamber in the upright posture and facing upward in the upright posture. The locking surface is positioned upward relative to the storage chamber and faces rearward in the upright posture, the locking surface having an upper end in the upright posture. The electrical interface is positioned upward relative to the storage chamber and faces upward in the upright posture, the electrical interface being positioned rearward relative to the supply port of the supply portion in the frontward direction in the upright posture. The contact surface is provided rearward relative to the supply port of the supply portion in the frontward direction and faces upward in the upright posture. The printing-fluid cartridge defines a rearmost point in the frontward direction in the upright posture, the locking surface being positioned closer to the rearmost point than to the supply port in the frontward direction in the upright posture. The upper end of the locking surface is positioned farther away from the center of the supply port than the contact surface is from the center of the supply port in an upward direction opposite to the gravitational direction in the upright posture.

DETAILED DESCRIPTION

Figure 1:
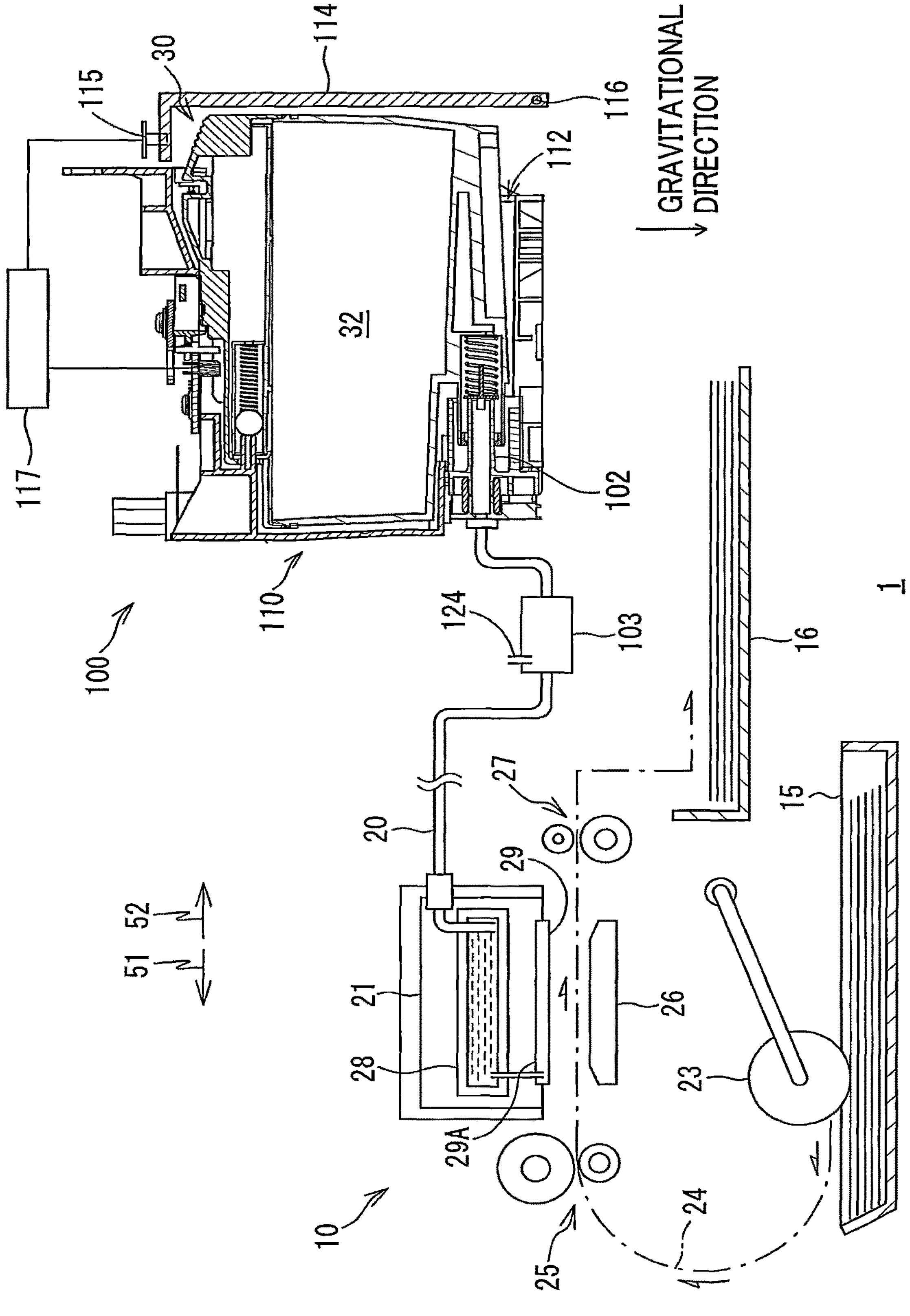
FIG. 1 is a schematic cross-sectional diagram conceptually showing an internal configuration of a printer including a cartridge-attachment section configured to detachably accommodate ink cartridges according to an embodiment of the present disclosure.

Hereinafter, an embodiment of the disclosure is described in detail while referring to accompanying drawings. It would be apparent to those skilled in the art that the embodiment described below is merely an example of the present disclosure and modifications and variations may be made therein without departing from the scope of the disclosure.

In the following description, a frontward direction 51 is defined as a direction in which an ink cartridge 30 according to the embodiment is inserted into a cartridge-attachment section 110, while a rearward direction 52 is defined as a direction opposite the frontward direction 51, that is, a direction in which the ink cartridge 30 is extracted from the cartridge-attachment section 110. The frontward direction 51 and rearward direction 52 are horizontal in the present embodiment.

Further, a downward direction 53 is defined as a direction perpendicular to the frontward direction 51 or the rearward direction 52, while an upward direction 54 is defined as a direction opposite the downward direction 53. Further, a rightward direction 55 and a leftward direction 56 are defined as directions perpendicular to the frontward direction 51 and the downward direction 53. The rightward direction 55 and the leftward direction 56 are also parallel to a horizontal plane in the present embodiment.

In a state where the ink cartridge 30 is attached to the cartridge-attachment section 110 (in an attached state) and the ink cartridge 30 is capable of being used or operated by the printer 10, the downward direction 53 is coincident with a direction of a gravitational force acting on the ink cartridge 30 (i.e. gravitational direction), and the upward direction 54 is coincident with a direction opposite to the gravitational direction. Further, the rightward direction 55 and the leftward direction 56 are defined as directions perpendicular to the frontward direction 51 and the downward direction 53. More specifically, in a state where the ink cartridge 30 is attached to the cartridge attachment section 110 and is capable of being used by the printer 10, the rightward direction 55 is a direction toward the right and the leftward direction 56 is a direction toward the left when the ink cartridge 30 is viewed from a rear side thereof.

Note that a state where the ink cartridge 30 is attached to the cartridge attachment section 110 or a state where the ink cartridge 30 is capable of being operated by the printer 10 implies a state of the ink cartridge 30 when the ink cartridge 30 has been completely inserted into an attachment position in the cartridge attachment section 110. Hereinafter, a posture of the ink cartridge 30 in a state where the ink cartridge 30 is attached to the cartridge attachment section 110 or a state where the ink cartridge 30 is capable of being operated by the printer 10 will be referred to as an "attached posture."

In other words, in the attached posture, the ink cartridge 30 has a height in the gravitational direction; a depth in the frontward direction 51 or in the rearward direction 52 (i.e., insertion direction) which is orthogonal to the gravitational direction; and a width in the rightward direction 55 or in the leftward direction 56 (i.e., widthwise direction) which is orthogonal to the gravitational direction (height) and the insertion direction (depth).

Further, in the following description, the frontward direction 51 and the rearward direction 52 may be collectively referred to as a front-rear direction. The upward direction 54 and the downward direction 53 may be collectively referred to as an up-down direction. The rightward direction 55 and the leftward direction 56 may be collectively referred to as a left-right direction.

In this specification, "facing frontward" includes facing in a direction including a frontward component, "facing rearward" includes facing in a direction including a rearward component, "facing downward" includes facing in a direction including a downward component, and "facing upward" includes facing in a direction including an upward component. For example, "a front surface faces frontward" denotes that the front surface may face in a frontward direction, or the front surface may face in a direction inclined relative to the frontward direction.

[Overview of the Printer 10]

FIG. 1 shows a system 1 configured of a printer 10 and the ink cartridge 30 according to the embodiment. First, a detailed structure of the printer 10 according to the embodiment will be described with reference to FIG. 1.

The printer 10 is configured to form an image by selectively ejecting ink droplets onto a sheet based on an inkjet recording system. As illustrated in FIG. 1, the printer 10 includes a recording head 21, an ink-supplying device 100, and ink tubes 20 connecting the recording head 21 to the ink-supplying device 100. The ink-supplying device 100 includes the cartridge-attachment section 110. The cartridge-attachment section 110 can detachably accommodate a plurality of ink cartridges 30 therein.

Specifically, in the present embodiment, four ink cartridges 30C, 30M, 30Y and 30K each storing ink of one of four colors of cyan, magenta, yellow, and black can be mounted in corresponding insertion spaces 111C, 111M, 111Y and 111K of the cartridge-attachment section 110. Hereinafter, whenever necessary, the ink cartridges 30C, 30M, 30Y and 30K may be referred to as "ink cartridge 30" or "ink cartridges 30" when no color distinction is necessary. Likewise, the insertion spaces 111C, 111M, 111Y and 111K of the cartridge-attachment section 110 may be referred to as "insertion space 111" or "insertion spaces 111" when no color distinction is necessary.

The cartridge-attachment section 110 has a wall formed with an opening 112. The ink cartridges 30 can be inserted into the cartridge-attachment section 110 in the frontward direction 51 (i.e., insertion direction orthogonal to the gravitational direction) through the opening 112, and extracted from the cartridge-attachment section 110 in the rearward direction 52 (i.e., removal direction orthogonal to the gravitational direction) through the opening 112.

Each ink cartridge 30 stores ink therein that the printer 10 can use for printing. The ink cartridges 30 are connected to the recording head 21 through the corresponding ink tubes 20 when the ink cartridges 30 are completely mounted in the cartridge-attachment section 110.

The recording head 21 includes sub tanks 28 each serving to temporarily store ink supplied from the corresponding ink cartridge 30 through the corresponding ink tube 20. The recording head 21 also includes a plurality of nozzles 29 through which the ink supplied from the sub tanks 28 is selectively ejected in accordance with the inkjet recording system. More specifically, the recording head 21 includes a head control board (not shown), and piezoelectric elements 29A each corresponding to one of the nozzles 29. The head control board is configured to selectively apply drive voltages to the piezoelectric elements 29A to eject ink of each color selectively from the nozzles 29. In this way, the recording head 21 is configured to consume the ink stored in the respective ink cartridges 30 mounted in the cartridge-attachment section 110.

The printer 10 also includes a sheet tray 15, a sheet feeding roller 23, a conveying path 24, a pair of conveying rollers 25, a platen 26, a pair of discharge rollers 27, and a sheet discharge tray 16. The sheets from the sheet tray 15 are fed by the sheet feeding roller 23 onto the conveying path 24, and then conveyed by the conveying rollers 25 onto the platen 26. The recording head 21 is configured to selectively eject ink onto the sheets as the sheets move over the platen 26, thereby recording images on the sheets. The sheets that have passed the platen 26 are then discharged by the discharge rollers 27 onto the sheet discharge tray 16 disposed at a downstream end of the conveying path 24.

<Ink-Supplying Device 100>

The ink-supplying device 100 is provided in the printer 10, as illustrated in FIG. 1. The ink-supplying device 100 functions to supply ink to the recording head 21. As described above, the ink-supplying device 100 includes the cartridge-attachment section 110 for detachably receive the ink cartridges 30 therein. FIG. 1 depicts a state where one of the ink cartridges 30 has been completely received in the cartridge-attachment section 110. In other words, the ink cartridge 30 depicted in FIG. 1 is in the attached posture in which the ink cartridge 30 is used by the printer 10.

<Cartridge-Attachment Section 110>

Figure 2:
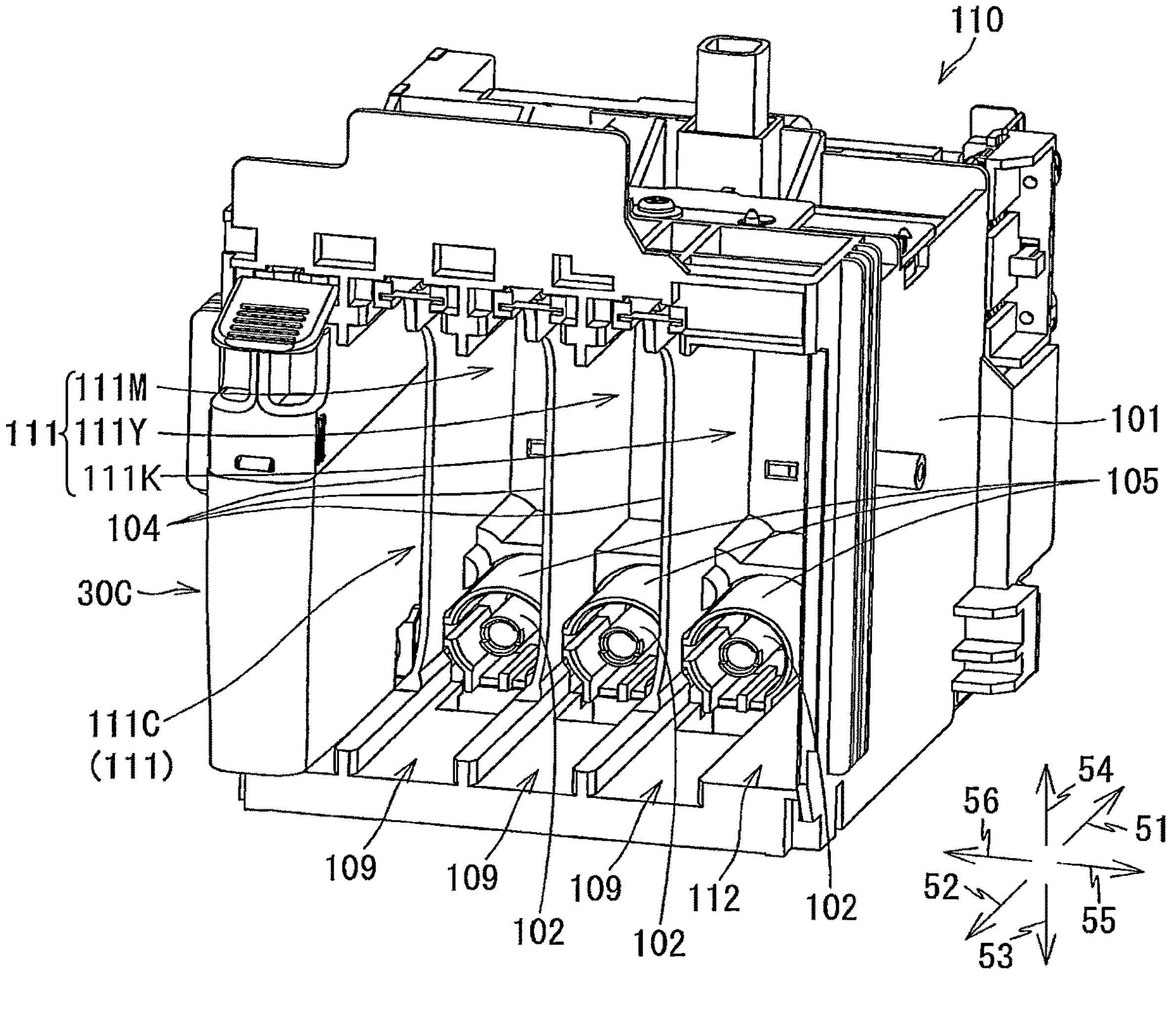
FIG. 2 is a perspective view showing an external appearance of the cartridge-attachment section and an opening of the cartridge-attachment section.
Figure 3:
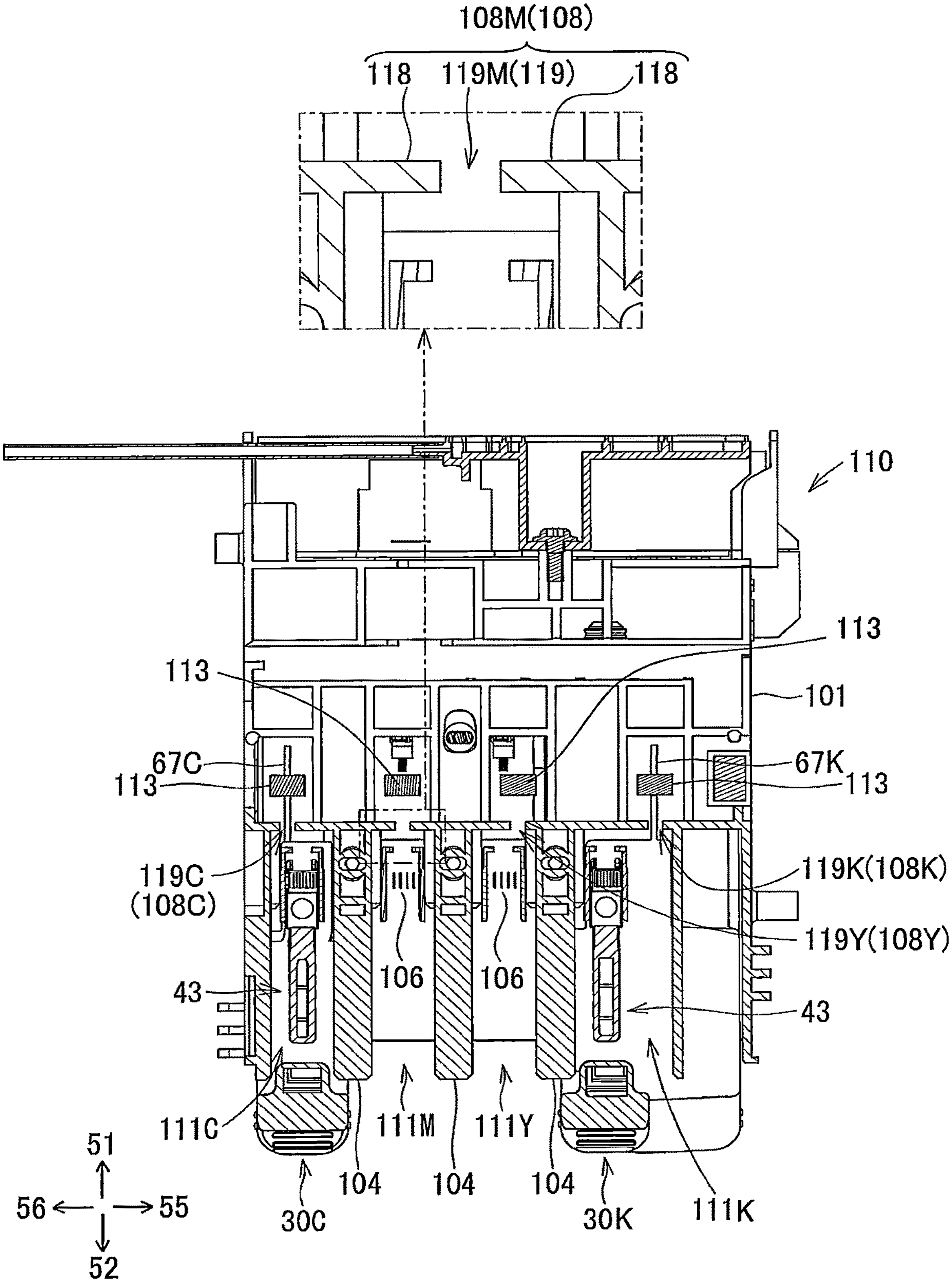
FIG. 3 is a cross-sectional view of the cartridge-attachment section taken along a plane III-III in FIG. 4, the cartridge-attachment section including gates formed with slits, wherein two of the ink cartridges according to the embodiment are inserted into corresponding insertion spaces.

In the ink-supplying device 100, the ink cartridges 30C, 30M, 30Y and 30K (the four kinds of ink cartridges 30 corresponding to the colors of cyan, magenta, yellow and black) are detachably mountable. Specifically, as illustrated in FIGS. 1 through 3, the cartridge-attachment section 110 includes a case 101, and four sets of an ink needle 102, a tank 103, an optical sensor 113, four contacts 106, a rod 125, a positioning portion 107 and a gate 108, each set for each of the four ink cartridges 30C, 30M, 30Y and 30K.

<Case 101>

The case 101 constitutes a housing of the cartridge-attachment section 110. As depicted in FIG. 2, the case 101 has a box-like shape defining an internal space therein. Specifically, the case 101 includes a top wall defining a ceiling of the internal space, a bottom wall defining a bottom of the internal space, an end wall connecting the top wall and the bottom wall, and the opening 112 positioned opposite the end wall in the front-rear direction. The opening 112 can be exposed to a surface (user-interface surface) that a user can face when using the printer 10.

The four kinds of ink cartridges 30 can be inserted into and removed from the case 101 through the opening 112. In the case 101, the bottom wall is formed with four guide grooves 109 for guiding insertion/removal of the corresponding ink cartridges 30. Specifically, when the ink cartridges 30 are inserted into and removed from the case 101 through the opening 112, lower ends of the respective ink cartridges 30 are received in the corresponding guide grooves 109 and guided thereby in the front-rear direction in FIG. 2. Further, the case 101 includes three plates 104 that partition the internal space into the four insertion spaces 111C, 111M, 111Y and 111K. The respective insertion spaces 111C, 111M, 111Y and 111K are elongated in the up-down direction 53 and 54. The four kinds of ink cartridges 30C, 30M, 30Y and 30K can be mounted in the four insertion spaces 111C, 111M, 111Y and 111K, respectively.

As illustrated in FIG. 2, when the case 101 is viewed from rearward thereof in the forward direction 51, the four insertion spaces 111C, 111M, 111Y and 111K of the case 101 are arranged in this order from the left end to the right. Specifically, the ink cartridge 30C is adapted to be inserted into the insertion space 111C. The ink cartridge 30M is adapted to be inserted into the insertion space 111M. The ink cartridge 30Y is adapted to be inserted into the insertion space 111Y. The ink cartridge 30K is adapted to be inserted into the insertion space 111K. That is, when the ink cartridges 30 are accommodated in the case 101, the ink cartridge 30M is interposed between the ink cartridges 30C and 30Y in the left-right direction. The ink cartridge 30K has a left-right dimension larger than a left-right dimension of each of the ink cartridges 30C, 30M, and 30Y, as will be described later. Thus, the insertion space 111K has a left-right dimension that is larger than a left-right dimension of each of the insertion spaces 111C, 111M and 111Y.

<Ink Needle 102>

Each ink needle 102 is formed of a resin and has a generally hollow tubular shape. As illustrated in FIG. 2, the ink needles 102 are disposed at a lower end portion of the end wall constituting the case 101. Specifically, each ink needle 102 is disposed at a position corresponding to an ink supply portion 34 (described later) of the corresponding ink cartridge 30 mounted in the cartridge-attachment section 110. The respective ink needles 102 protrude rearward from the end wall of the case 101. The ink needle 102 has a distal end 102E facing rearward.

A cylindrical-shaped guide portion 105 is provided at the end wall to surround each of the ink needles 102. Each guide portion 105 protrudes rearward from the end wall. Each guide portion 105 has a protruding end that is open rearward. Specifically, each ink needle 102 is positioned at a diametrical center of the corresponding guide portion 105. Each guide portion 105 is shaped to allow the ink supply portion 34 of the corresponding ink cartridge 30 to be received in the corresponding guide portion 105.

Figure 4:
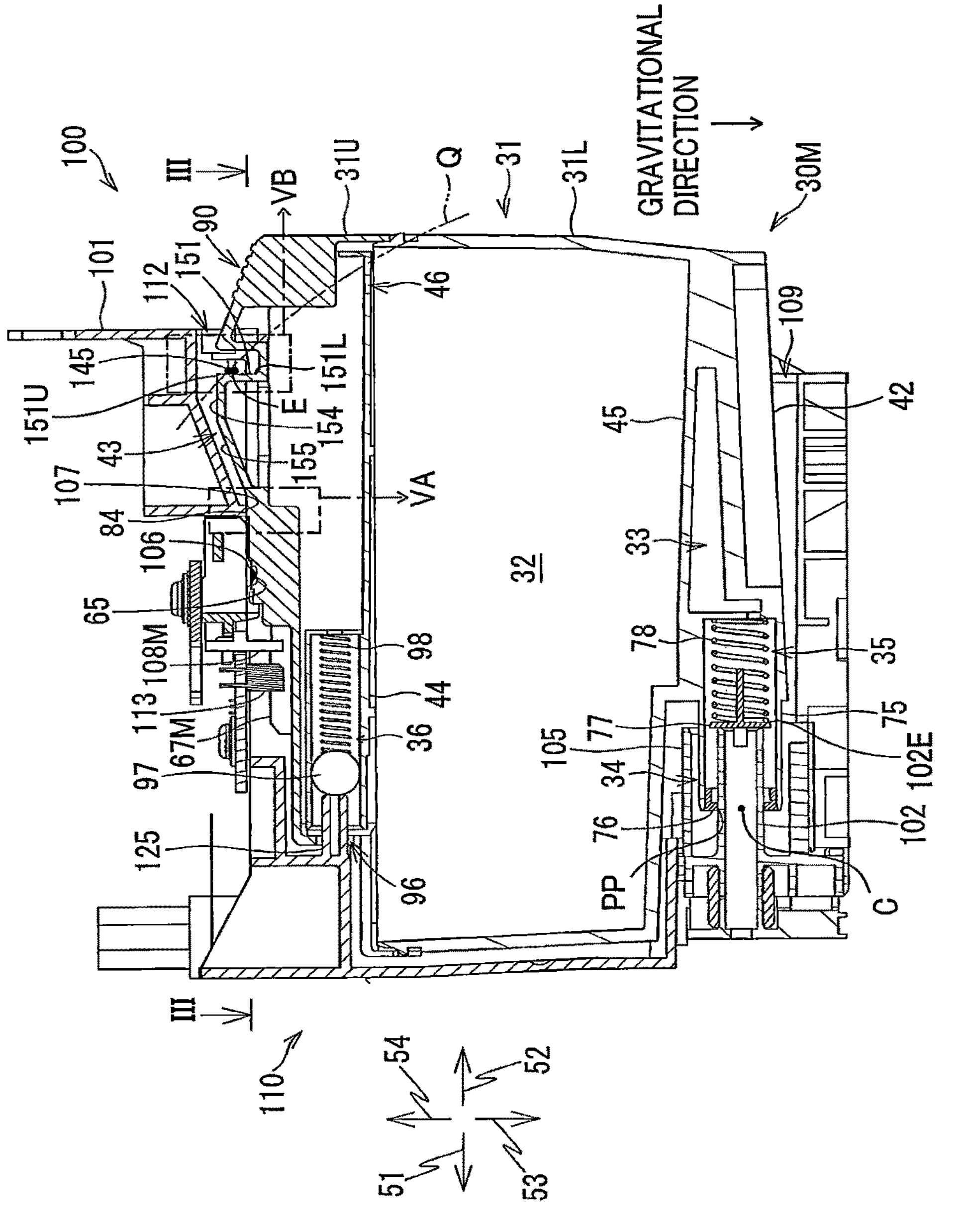
FIG. 4 is a vertical cross-sectional diagram illustrating a state where the ink cartridge (of magenta color) according to the embodiment is attached to the cartridge-attachment section in a first posture.

During insertion of the ink cartridge 30 into the cartridge-attachment section 110 in the frontward direction 51, i.e., in a process for moving the ink cartridge 30 to the attached posture, the ink supply portion 34 of the ink cartridge 30 enters into the corresponding guide portion 105 (refer to FIG. 4). As the ink cartridge 30 is inserted further forward in the frontward direction 51, the ink needle 102 enters into an ink supply port 71 of the corresponding ink supply portion 34. The ink needle 102 is thus connected to the corresponding ink supply portion 34 to allow communication with each other. Hence, the ink stored in a second ink chamber 33 formed inside the ink cartridge 30 is allowed to flow into the corresponding tank 103 through an ink valve chamber 35 defined in the ink supply portion 34 and an inner space defined in the corresponding ink needle 102.

Incidentally, the distal end 102E of each ink needle 102 may have a flat shape or a pointed shape. The guide portions 105 may be formed into any shape, provided that the guide portions 105 can allow attachment of the ink cartridges 30 to the cartridge-attachment section 110. The guide portions 105 need not necessarily be provided in the cartridge-attachment section 110.

<Contacts 106>

A set of the four contacts 106 is provided for each of the four insertion spaces 111 of the case 101. Precisely, the contacts 106 are provided in a holder (not shown) that is supported by the cartridge-attachment section 110. As illustrated in FIG. 4, each of the four sets of the contacts 106 is disposed at the top wall of the case 101, for each insertion space 111, at a position near the end wall of the case 101. Each set of the four contacts 106 is disposed rearward relative to the corresponding ink needle 102. Each of the four contacts 106 protrude from a lower surface of the top wall downward toward the corresponding insertion space 111 of the case 101. Although not illustrated in detail in the drawings, the four contacts 106 in each set are arranged to be spaced apart from one another in the left-right direction. The four contacts 106 in each set are arranged at positions respectively corresponding to four electrodes 65 provided at each of the ink cartridges 30, as will be described later. Each contact 106 is formed of a material having electrical conductivity and resiliency. The contacts 106 are therefore upwardly resiliently deformable.

In the present embodiment, the four sets of the four contacts 106 are disposed each set for each of the four ink cartridges 30C, 30M, 30Y and 30K in the present embodiment. That is, a total of sixteen contacts 106 are provided at the case 101. However, the number of contacts 106 and the number of electrodes 65 may be arbitrary.

Each contact 106 is electrically connected to an arithmetic-logic unit via an electrical circuit. In the present embodiment, each contact 106 is connected to a controller 117 (see FIG. 1) provided in the cartridge-attachment section 110. The controller 117 may include a CPU, a ROM, and a RAM, for example. The contacts 106 are engaged with the corresponding electrodes 65 when the ink cartridge 30 is attached to the case 101. When in contact with the corresponding electrodes 65, the contacts 106 are electrically connected to the corresponding electrodes 65, so that a voltage Vc is applied to one of the electrodes 65; another one of the electrodes 65 is grounded; signals are exchanged between the controller 117 and another one of the electrodes 65; and power is supplied to another one of the electrodes 65. Due to establishment of the electrical connection between the contacts 106 and the electrodes 65, the controller 117 is electrically accessible to the data stored in an IC of each ink cartridge 30. Outputs from the respective contacts 106 through the electrical circuits are configured to be inputted into the controller 117.

<Rod 125>

As illustrated in FIG. 4, each rod 125 is provided at the end wall of the case 101 at a position upward of the corresponding ink needle 102 for each insertion space 111. Each rod 125 has a generally cylindrical shape and protrudes rearward from the end wall of the case 101. In a state where the ink cartridges 30 are attached to the cartridge-attachment section 110, that is, when the ink cartridges 30 are in the attached posture, the rods 125 are respectively received in air communication ports 96 (described later) of the corresponding ink cartridges 30.

<Optical Sensor 113>

As illustrated in FIG. 4, the optical sensors 113 are disposed at the top wall of the case 101. Specifically, each optical sensor 113 is disposed, for each insertion space 111, at a position rearward of the corresponding rod 125 but frontward of the set of four contacts 106. Each optical sensor 113 includes a light-emitting portion and a light-receiving portion. The light-emitting portion is arranged to oppose the light-receiving portion and is spaced apart from the light-receiving portion in the left-right direction. When the ink cartridge 30 is attached to the cartridge-attachment section 110, a light-blocking plate 67 of the attached ink cartridge 30 is located between the light-emitting portion and the light-receiving portion of the corresponding optical sensor 113. In other words, the light-emitting portion and the light-receiving portion are arranged to oppose each other with the light-blocking plate 67 of the ink cartridge 30 attached to the cartridge-attachment section 110 interposed between the light-emitting portion and the light-receiving portion.

The optical sensor 113 is configured to output different detection signals depending on whether or not light emitted in the left-right direction from the light-emitting portion is received by the light-receiving portion. For example, the optical sensor 113 outputs a low-level signal when the light emitted from the light-emitting portion is not received at the light-receiving portion (that is, when an intensity of the light received at the light-receiving portion is less than a predetermined intensity). On the other hand, the optical sensor 113 outputs a high-level signal when the light emitted from the light-emitting portion is received by the light-receiving portion (that is, when the intensity of the received light is equal to or greater than the predetermined intensity).

<Lock Shaft 145>

As illustrated in FIG. 4, a lock shaft 145 is also provided at the case 101. The lock shaft 145 extends in the left-right direction at a position near the top wall and the opening 112 of the case 101. The lock shaft 145 is disposed rearward of the contacts 106. The lock shaft 145 is a rod-like member extending in the left-right direction. For example, the lock shaft 145 is a columnar-shaped metal. The lock shaft 145 has both ends that are fixed to walls defining both ends of the case 101 in the left-right direction. Accordingly, the lock shaft 145 is not movable (for example, is not pivotable) relative to the case 101. The lock shaft 145 extends in the left-right direction across the four insertion spaces 111 respectively corresponding to the four ink cartridges 30. In each of the insertion spaces 111, a space is provided around the lock shaft 145. Thus, a locking surface 151 (described later) of each ink cartridge 30 can access the lock shaft 145 by moving upward or rearward.

The lock shaft 145 functions to maintain the ink cartridges 30 attached to the cartridge-attachment section 110 in the attached state. When the ink cartridge 30 is inserted into the cartridge-attachment section 110 and pivoted into a posture to be used thereby (i.e., attached posture), the ink cartridge 30 is brought into engagement with the lock shaft 145 in the corresponding insertion space 111. Further, the lock shaft 145 holds the ink cartridge 30 in the attached posture in the cartridge-attachment section 110 against urging forces of coil springs 78 and 98 (described later) of the ink cartridge 30 that push the ink cartridge 30 as a whole rearward.

<Positioning Portion 107>

As illustrated in FIG. 4, the positioning portions 107 are arranged near the top wall of the case 101. Each positioning portion 107 is disposed between the corresponding set of contacts 106 and the lock shaft 145 in the front-rear direction. The positioning portions 107 protrude downward from the top wall of the case 101. The positioning portions 107 are integrally formed with the case 101. Each positioning portion 107 has a lower end surface that is configured to abut against a contact surface 84 of the corresponding ink cartridge 30 in the state where the ink cartridge 30 is attached to the cartridge-attachment section 110 (in the attached posture). The lower end surface of each positioning portion 107 is positioned slightly upward relative to the lower ends of the corresponding contacts 106.

<Gate 108>

As illustrated in FIGS. 3 and 4, the gates 108 (specifically, gates 108C, 108M, 108Y and 108K) are provided near the top wall of the case 101. Each gate 108 protrudes downward from a wall defining an upper edge of each insertion space 111. Each gate 108 is provided for each insertion space 111 at a position between the corresponding optical sensor 113 and the set of contacts 106 in the front-rear direction. Referring to FIG. 3, each gate 108 includes a pair of opposing walls 118 and a slit 119 provided between the opposing walls 118. The opposing walls 118 extend respectively in the left-right direction from neighboring partitioning members that oppose each other in the right-left direction and that define the corresponding insertion space 111, such as the neighboring two plates 104. The opposing walls 118 extend in the up-down direction and are paired to oppose each other in the left-right direction with a gap defined therebetween. This gap between the paired opposing walls 118 serve as the slit 119 in each gate 108. Put another way, each slit 119 is defined by two opposing end faces of the paired opposing walls 118 extending in the up-down direction. However, the slits 119 (slits 119C, 119M, 119Y and 119K) are formed at different positions from one another in the left-right direction in the respective insertion spaces 111C, 111M, 111Y and 111K. Specifically, relative positions between the slits 119 (slits 119C, 119M, 119Y and 119K) and the corresponding contacts 106 in the respective insertion spaces 111C, 111M, 111Y and 111K in the left-right direction are different from one another. More specifically, for example, referring to FIG. 3, while the slit 119M of the gate 108M is positioned at a generally left-right center of the insertion space 111M, the slit 119C of the gate 108C is positioned offset from a left-right center of the insertion space 111C (i.e., rightward relative to the left-right center of the insertion space 111C). The respective slits 119C, 119M, 119Y and 119K in the insertion spaces 111C, 111M, 111Y and 111K are formed at such left-right positions that correspond to left-right positions of the light-blocking plates 67 (67C, 67M, 67Y and 67K) of the ink cartridges 30C, 30M, 30Y and 30K, respectively. Each slit 119 has a width in the left-right direction that is larger than a width of the corresponding light-blocking plate 67 in the left-right direction (defined as a width W1 illustrated in FIGS. 14 and 15). That is, the light-blocking plates 67C, 67M, 67Y and 67K are allowed to pass through the corresponding slits 119C, 119M, 119Y and 119K in the front-rear direction.

<Tank 103>

As illustrated in FIG. 1, each tank 103 is provided forward of the case 101 and is connected to the corresponding ink needle 102. The tank 103 has a box-like shape that allows ink to be stored therein. An atmosphere communication port 124 is formed at an upper portion of each tank 103 so that the tank 103 can be opened to the atmosphere through the atmosphere communication port 124. The tank 103 has an inner space that communicates with the inner space of the ink needle 102. With this structure, ink can flow out from the ink cartridge 30 through the ink needle 102 and is stored in the tank 103. Each tank 103 is also connected to the corresponding ink tube 20. Thus, the ink stored in the inner space of each tank 103 is supplied to the recording head 21 through the corresponding ink tube 20.

<Cover 114 and Cover Sensor 115>

As illustrated in FIG. 1, the cartridge-attachment section 110 also includes a cover 114, and a cover sensor 115. The cover 114 is configured to open and close the opening 112 of the case 101. The cover 114 extends in the left-right direction. The cover 114 is pivotally movable relative to the case 101 about a shaft 116 provided near a lower end of the case 101. The cover 114 has a substantially flat-plate shape and constitutes a part of the outer surface of the printer 10. The cover sensor 115 is configured to detect whether or not the cover 114 is in a closing position that closes the opening 112.

In a state illustrated in FIG. 1, the cover 114 is at the closing position. The cover 114 at the closing position extends upward relative to the shaft 116. When the cover 114 is at the closing position, the opening 112 of the case 101 is closed. At this time, a user cannot perform insertion and removal of the ink cartridges 30 relative to the cartridge-attachment section 110. The cover sensor 115 is disposed at such a position that the cover sensor 115 can detect presence of a portion of the cover 114 at the closing position. To move the cover 114 from the closing position to an opening position opening the opening 112, the cover 114 is pivoted about the shaft 116 to move an upper end portion of the cover 114 downward. The cover 114 at the opening position extends substantially horizontally in the rearward direction 52 relative to the shaft 116. When the cover 114 is pivoted from the closing position toward the opening position, the cover 114 goes out of a range within which the cover sensor 115 can detect the cover 114. When the cover 114 is at the opening position, the opening 112 of the case 101 is opened. In this state, the user can insert/remove the ink cartridges 30 into/from the cartridge-attachment section 110.

<Controller 117>

As illustrated in FIG. 1, the cartridge-attachment section 110 also includes a controller 117. As described earlier, the controller 117 is an arithmetic-logic unit including a CPU, a memory, and the like, for example. The controller 117 may be configured as a controller of the printer 10. The controller 117 is configured to receive signals outputted from the optical sensor 113 and the cover sensor 115. In response to receipt of a signal from the cover sensor 115 indicating that the cover 114 is at the closing position, the controller 117 is configured to determine a type of the ink cartridge 30 inserted into the insertion space 111 based on a signal outputted from the optical sensor 113. Details of the detection performed by the controller 117 will be described later.

[Ink Cartridge 30]

The ink cartridge 30 is a container configured to store ink therein. The ink cartridges 30C, 30M, 30Y and 30K have generally the same structure as each other, but have some differences from one another.

Hereinafter, in order to describe a configuration common to all of the ink cartridges 30, a structure of the ink cartridge 30M will be first described as an illustrative example, with reference to FIGS. 4 to 10. Subsequently, a detailed structure of the ink cartridge 30K, and differences among the ink cartridges 30C, 30M, 30Y and 30K will be described.

The ink cartridge 30 is inserted into and attached to the cartridge-attachment section 110 in a posture illustrated in FIGS. 4 to 10. This posture of the ink cartridge 30 in the attached state (attached posture) will also be called an upright posture, hereinafter, whenever necessary. That is, the upright posture corresponds to the attached posture. In other words, the ink cartridge 30 is in the upright posture when the ink cartridge 30 is attached to the cartridge-attachment section 110. In the upright posture or in the attached posture, the ink stored in the first ink chamber 32 of the ink cartridge 30 can flow out therefrom to be supplied into the corresponding ink needle 102 through the ink supply port 71 of the ink supply portion 34. That is, the ink cartridge 30 can be used in the printer 10 when in the attached posture or in the upright posture.

Specifically, as will be described later, the ink cartridge 30 includes a front wall 40, a rear wall 41, an upper wall 39, and a bottom wall 42. When the ink cartridge 30(30M) is in the upright posture or in the attached posture illustrated in FIGS. 4 to 10, a direction from the rear wall 41 toward the front wall 40 coincides with the frontward direction 51; a direction from the front wall 40 toward the rear wall 41 coincides with the rearward direction 52; a direction from the upper wall 39 toward the bottom wall 42 coincides with the downward direction 53, and a direction from the bottom wall 42 toward the upper wall 39 coincides with the upward direction 54.

In the upright posture of the ink cartridge 30, the front wall 40 faces frontward or is oriented in the frontward direction 51; the rear wall 41 is spaced away from the front wall 40 in the front-rear direction; the upper wall 39 is positioned between the front wall 40 and the rear wall 41 in the front-rear direction; and the bottom wall 42 is spaced away from the upper wall 39 in the up-down direction. The bottom wall 42 is positioned between the front wall 40 and the rear wall 41 in the front-rear direction. In other words, in the upright posture of the ink cartridge 30, the front wall 40 faces frontward, the rear wall 41 faces rearward, the bottom wall 42 faces downward, and the upper wall 39 faces upward.

More specifically, when the ink cartridge 30 is in the attached posture or in the upright posture, a front surface of the front wall 40 constitutes an front surface of the ink cartridge 30; a rear surface of the rear wall 41 constitutes a rear surface of the ink cartridge 30; an upper surface of the upper wall 39 constitutes an upper surface of the ink cartridge 30; and a bottom surface of the bottom wall 42 constitutes a bottom surface of the ink cartridge 30. That is, in the upright posture (attached posture) of the ink cartridge 30, the front surface of the front wall 40 faces frontward, the rear surface of the rear wall 41 faces rearward, the bottom surface of the bottom wall 42 faces downward, and the upper surface of the upper wall 39 faces upward.

Hereinafter, for simplifying explanation, whenever necessary, the front surface of the front wall 40 will be referred to as the front surface 40; the rear surface of the rear wall 41 will be simply to as the rear surface 41; the upper surface of the upper wall 39 will be referred to as the upper surface 39; and the bottom surface of the bottom wall 42 will be referred to as the bottom surface 42.

As illustrated in FIGS. 4 to 10, the ink cartridge 30(30M) includes a cartridge body 31 of a substantially rectangular parallelepiped shape. The cartridge body 31 in the upright posture has a generally flat shape having a height in the up-down direction (in the gravitational direction), a width in the left-right direction, and a depth in the front-rear direction, the width being smaller than the height and the depth. The cartridge body 31 includes the front wall 40, the rear wall 41, the upper wall 39, the bottom wall 42 and side walls 37 and 38.

In a state where the ink cartridge 30 is in the upright posture or in the attached state, the front surface 40 (front surface of the front wall 40) faces frontward, the rear surface 41 (the rear surface of the rear wall 41) faces rearward, the upper surface 39 (the upper surface of the upper wall 39) faces upward, and the bottom surface 42 (the bottom surface of the bottom wall 42) faces downward. The side walls 37 and 38 extend to intersect with the front wall 40 and rear wall 41 so as to connect the front wall 40 and the rear wall 41. In the upright posture (attached posture) of the ink cartridge 30, outer surfaces of the side walls 37 and 38 faces rightward and leftward, respectively.

More specifically, in the present embodiment, the cartridge body 31 includes a lower case 31L, and an upper cover 31U fitted to the lower case 31L. Within the lower case 31L, a first ink chamber 32 and the second ink chamber 33 are formed (see FIG. 8). The lower case 31L includes the bottom wall 42, and the upper cover 31U includes the upper wall 39. In the cartridge body 31, at least a portion of the rear wall 41 constituting the lower case 31L is capable of transmitting light so that a liquid surface of the ink stored in the first ink chamber 32 and second ink chamber 33 can be viewed from outside. An upper surface of the upper cover 31U constitutes the upper surface 39 of the cartridge body 31.

Figure 7:
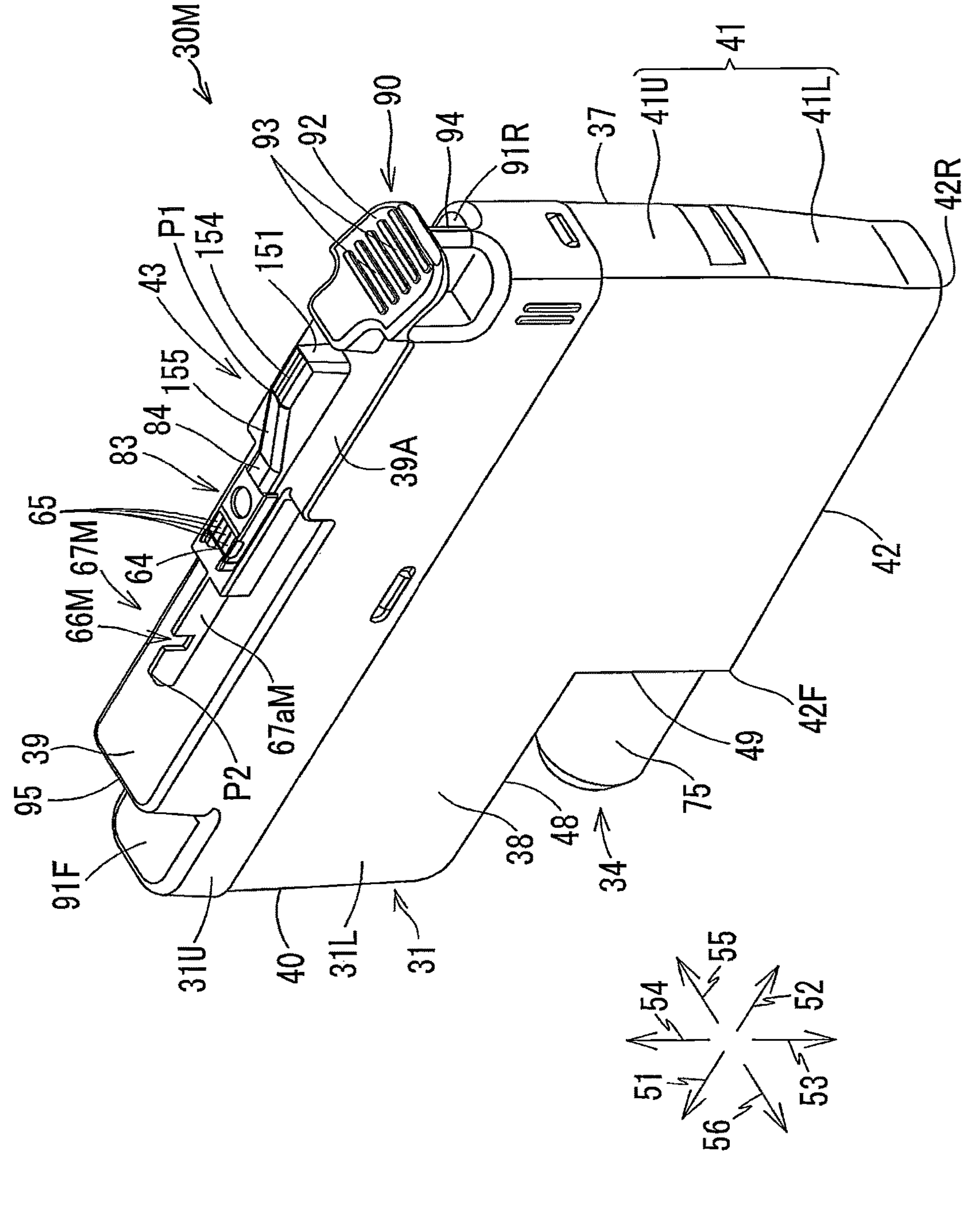
FIG. 7 is a perspective view of the ink cartridge (of magenta color) according to the embodiment when viewed from a perspective rearward and upward thereof.
Figure 8:
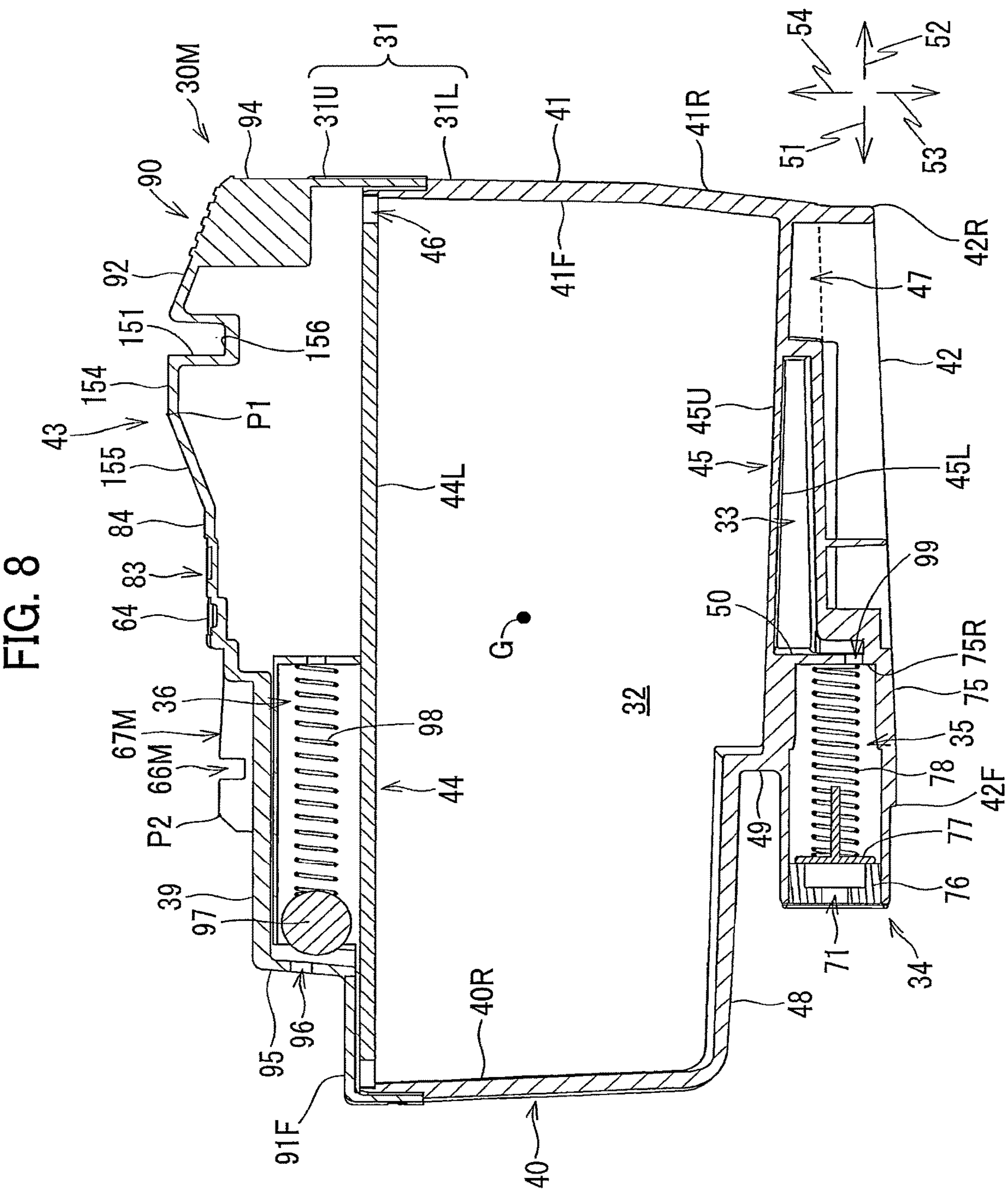
FIG. 8 is a cross-sectional view of the ink cartridge (of magenta color) according to the embodiment taken along an imaginary plane X2 illustrated in FIG. 9B and showing an internal configuration of the ink cartridge according to the embodiment.
Figure 10:
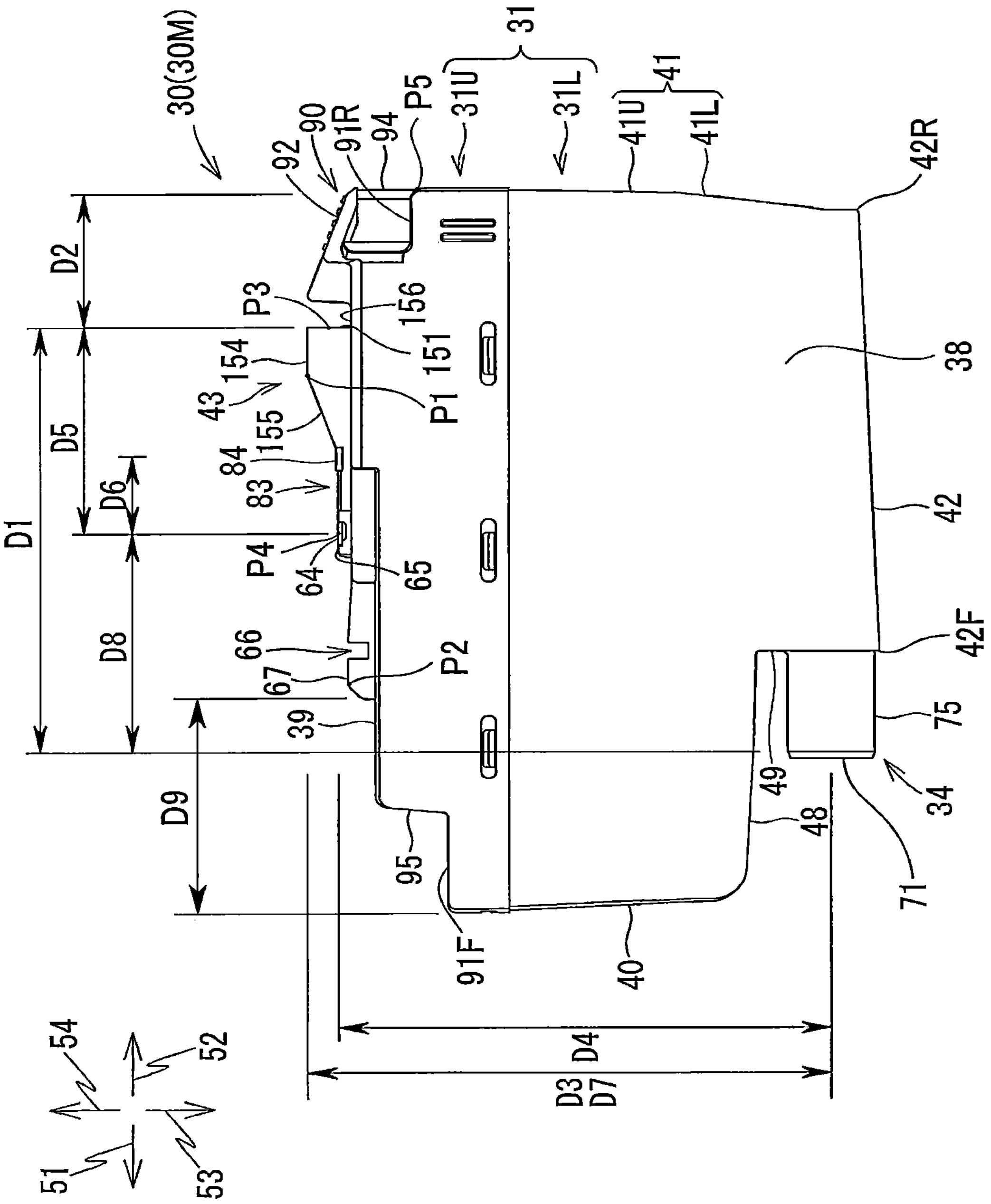
FIG. 10 is a left side view of the ink cartridge (of magenta color) according to the embodiment and illustrating positional relationship among various parts of the ink cartridge in the front-rear direction and up-down direction.
Figure 11B:
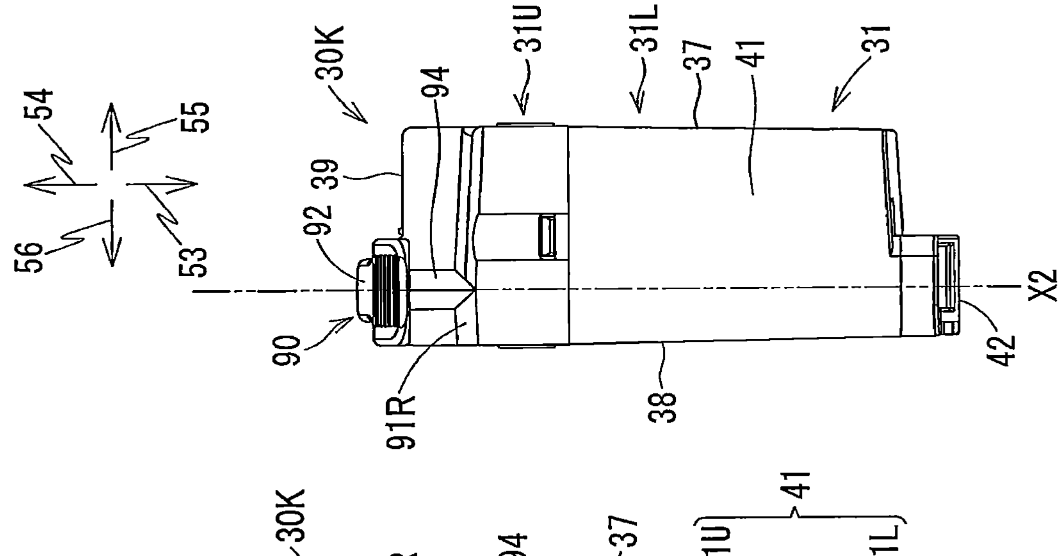
FIG. 11B is a rear side view of the ink cartridge of black color according to the embodiment.
Figure 11A:
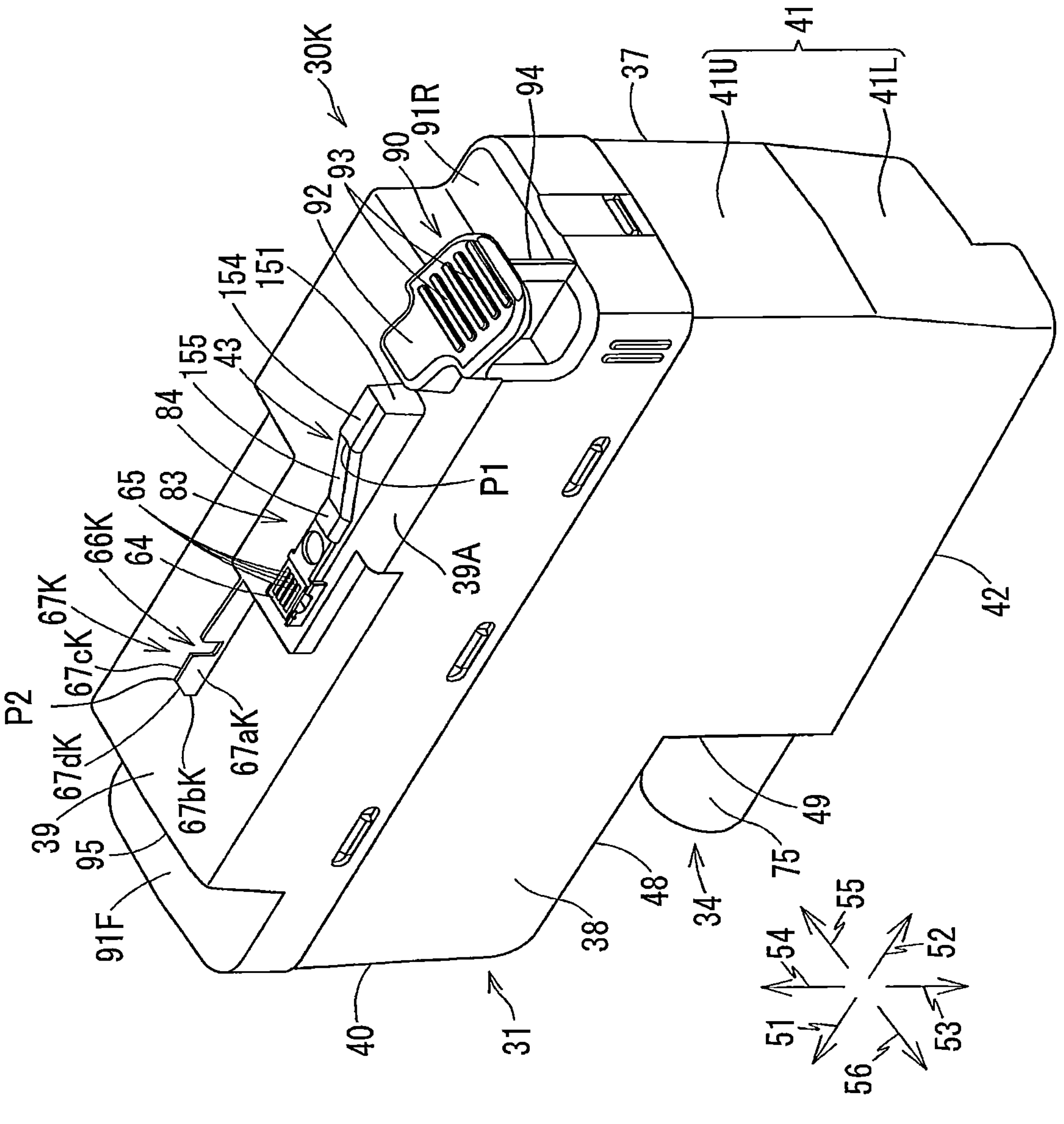
FIG. 11A is a perspective view of the ink cartridge of black color according to the embodiment when viewed from a perspective rearward and upward thereof.
Figure 12:
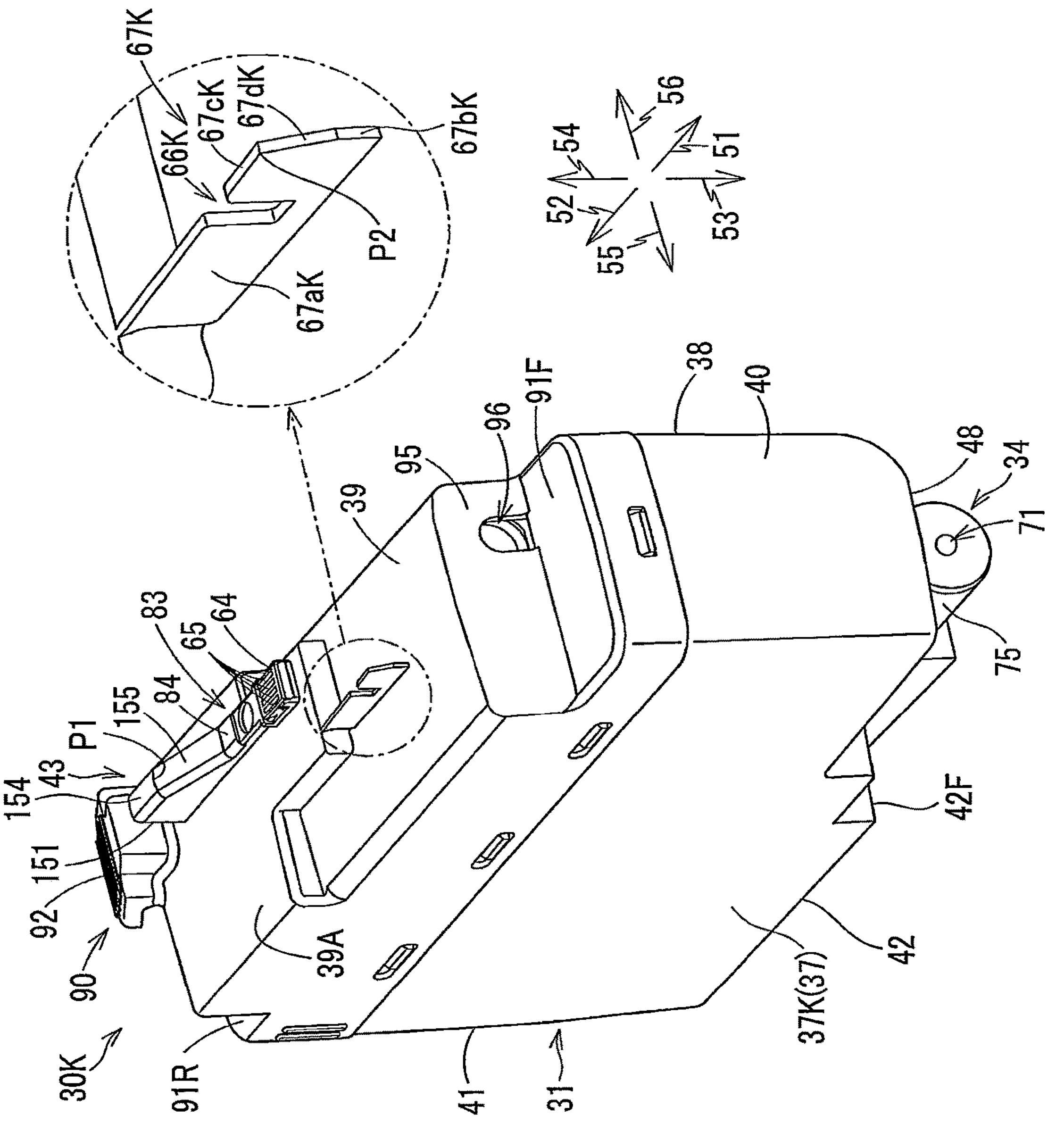
FIG. 12 is a perspective view of the ink cartridge of black color according to the embodiment when viewed from a perspective frontward and upward thereof.

As illustrated in FIGS. 7 and 8, the rear surface 41 includes an upper portion 41U and a lower portion 41L. The upper portion 41U is positioned upward of the lower portion 41L. The lower portion 41L is positioned forward of the upper portion 41U. Each of the upper and lower portions 41U and 41L is a flat surface. The upper portion 41U and lower portion 41L cross each other but are not orthogonal to each other. Specifically, the lower portion 41L is inclined relative to the up-down direction so as to extend closer to the front surface 40 toward the lower surface 42. In other words, in the present embodiment, the upper portion 41U constitutes a rearmost portion of the rear surface 41 in the rearward direction 52. Further, in the present embodiment, the upper portion 41U also constitutes a rearmost portion of the ink cartridge 30. In FIG. 10, a rearmost point of the ink cartridge 30 is illustrated as a point P5.

As illustrated in FIGS. 4 and 8, the lower surface 42 is inclined relative to the front-rear direction. Specifically, assuming the lower surface 42 has a front end 42F and a rear end 42R, the bottom surface 42 is inclined relative to the front-rear direction such that the front end 42F is positioned downward relative to the rear end 42R. The front end 42F of the lower surface 42 (inclined surface) is positioned frontward relative to the IC board 64, as will be described later. The rear end 42R of the lower surface 42 (inclined surface) is connected to a lower end of the lower portion 41L of the rear surface 41. Preferably, the lower surface 42 is inclined relative to the horizontal direction at an angle of 2° to 4°.

Figure 6:
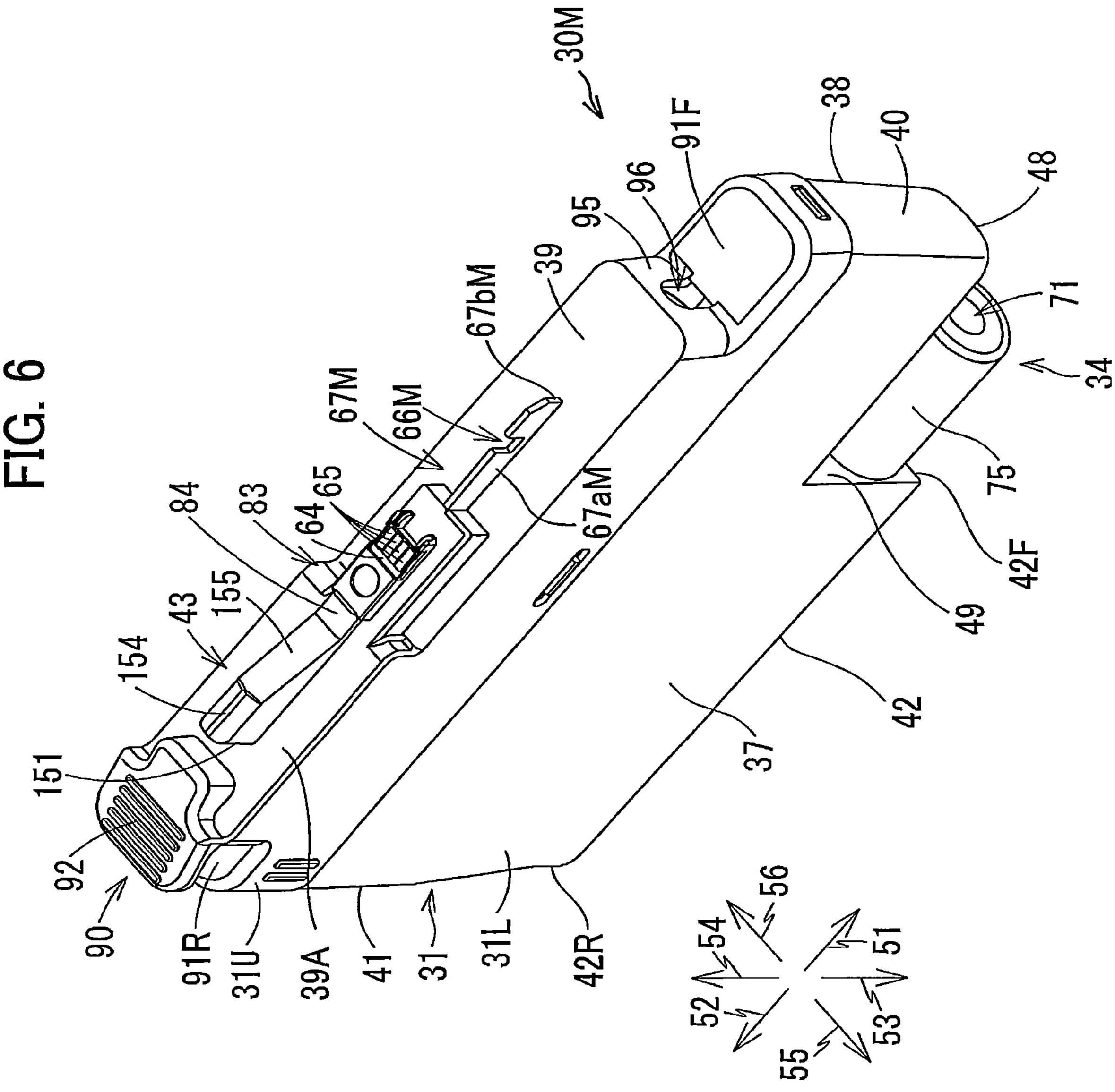
FIG. 6 is a perspective view of the ink cartridge (of magenta color) according to the embodiment when viewed from a perspective frontward and upward thereof.

As illustrated in FIGS. 6 and 7, the cartridge body 31 also includes a sub-lower wall 48 and a connecting wall 49 that belong to the lower case 31L. The sub-lower wall 48 is positioned upward of the lower wall 42. The sub-lower wall 48 extends rearward from a lower end of the front wall 40. In the present embodiment, a front end of the sub-lower wall 48 is positioned frontward of a front end of the ink supply portion 34, and a rear end of the sub-lower wall 48 is positioned rearward of the front end of the ink supply portion 34. The connecting wall 49 connects the lower wall 42 (lower surface 42) and the sub-lower wall 48. The ink supply portion 34 extends forward from the connecting wall 49 at a position downward of the sub-lower wall 48 and upward of the lower surface 42. Note that the front end of the sub-lower wall 48 may be arranged at an arbitrary position, for example, at a position rearward of the front end of the ink supply portion 34.

As illustrated in FIGS. 4, 6-9A and 10, the upper wall 39 belonging to the upper cover 31U has a stepped upper surface. Specifically, the upper surface 39 (upper surface of the upper wall 39) includes a rearward portion that is raised upward relative to a frontward portion of the upper surface 39. Hereinafter, the rearward portion will be referred to as a raised portion 39A, whenever necessary.

A first protrusion 43 is provided on the upper surface 39 of the cartridge body 31. More specifically, the first protrusion 43 is disposed at the raised portion 39A of the upper surface 39. The first protrusion 43 extends in the front-rear direction and is positioned at a generally left-right center of the upper surface 39 (raised portion 39A). The first protrusion 43 has a rear end whose surface faces rearward. This surface serves as the locking surface 151.

The locking surface 151 is a plane parallel to the gravitational direction (downward direction 53). That is, the locking surface 151 extends in the up-down direction and in the left-right direction. In the present embodiment, the locking surface 151 extends upward from the upper surface 39 (raised portion 39A) of the cartridge body 31. In a state where the ink cartridge 30 is attached to the cartridge-attachment section 110, the locking surface 151 facing rearward is in contact with the lock shaft 145 from frontward thereof in an engaging region E (illustrated in FIG. 5A). In other words, the locking surface 151 has the engaging region E configured to engage the lock shaft 145 in a state where the ink cartridge 30 is attached to the cartridge-attachment section 110. The engaging region E is positioned upward relative to the IC board 64 in the attached posture. The contact (engagement) between the locking surface 151 (engaging region E) and the lock shaft 145 in the front-rear direction enables the ink cartridge 30 to be held in the cartridge-attachment section 110 against the biasing force of a coil spring 78 of the ink supply portion 34, as will be described later. Although the locking surface 151 contacts the lock shaft 145 at the engaging region (surface contact) in the embodiment, the locking surface 151 may make contact with the lock shaft 145 at a specific point (point contact), as long as the locking surface 151 can receive the rearward urging force of the coil spring 78 to maintain the ink cartridge 30 in the attached state. As an example, the locking surface 151 may make contact with the lock shaft 145 on an engaging point P3 within the engaging region E (see FIG. 5A).

The first protrusion 43 also includes a horizontal surface 154 and an inclined surface 155. The horizontal surface 154 extends frontward from an upper edge 151U of the locking surface 151. That is, the horizontal surface 154 is provided frontward of the locking surface 151. The horizontal surface 154 is a surface extending in the front-rear direction and in the left-right direction. The horizontal surface 154 is a surface that is positioned farthest away from the upper surface 39 among surfaces constituting the first protrusion 43. The horizontal surface 154 has a left-right dimension that is smaller than a front-rear dimension thereof. The inclined surface 155 extends frontward and downward from a front edge of the horizontal surface 154. That is, the front edge of the horizontal surface 154 is the rear edge of the inclined surface 155 (denoted as a point P1 in FIGS. 7, 8, 9A and 10). The inclined surface 155 is disposed frontward relative to the horizontal surface 154. The inclined surface 155 is a surface facing upward and forward. Preferably, the inclined surface 155 is included relative to the horizontal direction at an angle of 15° to 25°. Put another way, the locking surface 151 and the inclined surface 155 are connected to each other via the horizontal surface 154. Thus, a boundary edge between the locking surface 151 and inclined surface 155 does not constitute a ridge-like shape. The inclined surface 155 is positioned between the IC board 64 and the locking surface 151 in the front-rear direction. During insertion of the ink cartridge 30 into the cartridge-attachment section 110, the lock shaft 145 is smoothly guided toward the rear beyond the locking surface 151 while abutting against and sliding along the inclined surface 155 and horizontal surface 154.

Further, the cartridge body 31 (upper cover 31U) also includes a pair of sub-upper walls 91 extending in the front-rear direction. One of the sub-upper walls 91 is located frontward of the upper wall 39 (to be referred to as a front sub-upper wall 91F), while the other sub-upper wall 91 is located rearward of the upper wall 39 (to be referred to as a rear sub-upper wall 91R). The front sub-upper wall 91F has a front end connected to an upper end of the front wall 40, and a rear end connected to a front end of the upper wall 39 via a connecting wall 95 extending in the up-down direction. The rear sub-upper wall 91R has a rear end connected to an upper end of the rear wall 41. The front and rear sub-upper walls 91F and 91R are positioned downward relative to a center portion of the upper surface 39 in the front-rear direction.

An operation portion 90 is also provided on the upper surface 39 (raised portion 39A) of the cartridge body 31 at a position rearward of the locking surface 151. The operation portion 90 is disposed upward relative to the rear sub-upper wall 91R (upper surface of the rear sub-upper wall 91R) and is spaced apart therefrom in the front-rear direction. The operation portion 90 has a generally flat plate-like shape. Specifically, the operation portion 90 protrudes upward from the raised portion 39A of the upper surface 39, and is then bent obliquely rearward and downward. The operation portion 90 protrudes upward from the raised portion 39A of the upper surface 39 up to the same degree as the first protrusion 43 protrudes from the raised portion 39A in the up-down direction. Here, "the same degree" means that an upper edge of the operation portion 90 is positioned higher by 0 to 1 mm, or lower by 0 to 1 mm, relative to the upper edge of the first protrusion 43 (i.e., relative to the horizontal surface 154). The operation portion 90 is connected to a lower edge 151L of the locking surface 151 via a surface 156 constituting part of the upper surface 39 (or, part of the raised portion 39A). A rib 94 is provided between the operation portion 90 and the rear sub-upper wall 91F. The rib 94 connects the operation portion 90 and the rear sub-upper wall 91R in the up-down direction and extends in the front-rear direction. The rib 94 has a dimension in the left-right direction that is smaller than each of a dimension of the operation portion 90 and a dimension of the rear sub-upper wall 91R in the left-right direction.

The operation portion 90 has a surface that faces diagonally upward and rearward. This surface serves as an operation surface 92. The operation surface 92 and the rear sub-upper wall 91R are aligned with each other at least partially in the up-down direction. In other words, when the ink cartridge 30 is viewed from above, the operation surface 92 and the rear sub-upper wall 91R overlap with each other. On the operation surface 92, a plurality of projections, e.g., a plurality of ridges 93 extending in the left-right direction is formed to be spaced apart from one another in the front-rear direction. These ridges 93 (as the plurality of projections) allow the user to easily visually recognize the operation surface 92. The ridges 93 can also serve to prevent the user's finger from slipping over the operation surface 92 when he or she operates the operation surface 92.

The operation surface 92 is visible when the ink cartridge 30 is viewed from rearward and from upward. The user operates the operation surface 92 in order to remove the ink cartridge 30 attached to the cartridge-attachment section 110 therefrom. The operation portion 90 is fixed to the cartridge body 31 so as not to move relative to the cartridge body 31. For example, the operation portion 90 may be formed integrally with the cartridge body 31 so as not to pivot relative to the cartridge body 31. Thus, a force applied from the user to the operation surface 92 is directly transmitted to the cartridge body 31 without changing a direction of the force.

As illustrated in FIGS. 4, 6-8, 9A and 10, a second protrusion 83 is also provided at the upper surface 39 (raised portion 39A) of the cartridge body 31 at a position forward of the first protrusion 43. The second protrusion 83 is provided at the upper cover 31U. The second protrusion 83 extends forward from the front end of the first protrusion 43. That is, the second protrusion 83 and the first protrusion 43 are connected to each other. The second protrusion 83 is formed at the same left-right position as the first protrusion 43. The second protrusion 83 supports the IC board 64. The second protrusion 83 has a rear end portion whose upper surface serves as the contact surface 84. Put another way, the contact surface 84 is connected to a lower end (front end) of the inclined surface 155 and extends frontward therefrom. The contact surface 84 faces upward (i.e., a flat upper surface). That is, the contact surface 84 is positioned between the IC board 64 and the locking surface 151 in the front-rear direction. In a state where the ink cartridge 30 is attached to the cartridge-attachment section 110, the contact surface 84 is in contact with the positioning portion 107 of the cartridge-attachment section 110, thereby providing positioning of the ink cartridge 30 relative to the cartridge-attachment section 110 with respect to the up-down direction. The contact surface 84 is a surface that is not movable relative to the IC board 64. In the present embodiment, the contact surface 84 is made of the same material as a member that supports the IC board 64, i.e., the upper cover 31U. The inclined surface 155 may have an arbitrary configuration. For example, a continuous surface need not be formed between the contact surface 84 and the locking surface 151. Alternatively, for example, the second protrusion 83 having the contact surface 84 and the first protrusion 43 having the locking surface 151 may not be formed to be continuous with each other. That is, the second protrusion 83 and the first protrusion 43 may be provided separately on the upper surface 39 so as to protrude upward therefrom.

Note that, the front surface, rear surface, top surface, bottom surface, and side surfaces constituting the ink cartridge 30 need not be configured as one flat plane, respectively. That is, the front surface of the ink cartridge 30 can be any surface(s) that can be seen when the ink cartridge 30 in its upright posture is viewed from its front side, and that is(are) positioned frontward relative to a front-rear center of the ink cartridge 30. In the present embodiment, the front surface 40 (i.e., the front surface of the front wall 40 connecting the sub-lower wall 48 and front sub-upper wall 91F) and a front surface of the connecting wall 49 connecting the sub-lower wall 48 and the bottom wall 42 (bottom surface 42) constitute the front surface of the ink cartridge 30. Also, the connecting wall 95 connecting the front sub-upper wall 91F and the upper wall 39 also constitutes the front surface of the ink cartridges 30. On the other hand, the ink cartridge 30 may not have the sub-lower wall 48 and the front sub-upper wall 91F. In other words, the front surface 40 of the ink cartridge 30 may be configured as one surface continuously connecting the upper surface 39 and the lower surface 42.

Likewise, the rear surface of the ink cartridge 30 can be any surface(s) that can be seen when the ink cartridge 30 in its upright posture is viewed from its rear side, and that is(are) positioned rearward relative to the front-rear center of the ink cartridge 30. The upper surface of the ink cartridge 30 can be any surface(s) that can be seen when the ink cartridge 30 in its upright posture is viewed from above, and that is(are) positioned upward relative to a center of the ink cartridge 30 in the up-down direction. The lower surface of the ink cartridge 30 can be any surface(s) that can be seen when the ink cartridge 30 in its upright posture is viewed from below, and that is(are) positioned downward relative to the center of the ink cartridge 30 in the up-down direction. The same is applied to the side surfaces of the ink cartridge 30.

As illustrated in FIGS. 4, 6-8, 9A and 10, the light-blocking plate 67 is also provided at the upper surface 39 (upper surface of the upper wall 39). Specifically, the light-blocking plate 67 protrudes upward from the upper surface 39 at a position frontward relative to the raised portion 39A. In the present embodiment, the light-blocking plate 67 is integrally formed with the upper cover 31U. The light-blocking plate 67 extends in the front-rear direction. The light-blocking plate 67 is positioned frontward relative to the second protrusion 83. The light-blocking plate 67 is connected to the raised portion 39A that supports the second protrusion 83 on which the IC board 64 is disposed. In other words, the raised portion 39A, which constitutes a part of the upper surface 39, also serves as a supporting portion that supports the IC board 64.

The light-blocking plate 67 is also positioned frontward and downward relative to the IC board 64. In the present embodiment, the light-blocking plate 67 is a plate made of resin containing a colored material capable of absorbing light (carbon black pigment, for example). Alternatively, the light-blocking plate 67 may be configured by attaching a material that cannot transmit light, such as aluminum, to a side surface of a plate capable of transmitting light.

The light-blocking plate 67 has a flat plate-like shape whose left-right dimension (the width W1 illustrated in FIG. 14) is smaller than a front-rear dimension thereof. The light-blocking plate 67 has a front surface 67*b*, left and right side surfaces 67*a*, an upper surface 67*c*, and a sloped surface 67*d*.

The front surface 67*b* of the light-blocking plate 67 is a surface facing frontward in the upright posture of the ink cartridge 30. The front surface 67*b* serves as an interfering surface 67*b* of the ink cartridge 30. That is, the interfering surface 67*b* faces frontward in the upright posture of the ink cartridge 30. The interfering surface 67*b* extends upward from the upper surface 39 of the cartridge body 31. Put another way, the interfering surface 67*b* is a plane extending upward from the upper surface 39 of the cartridge body 31. The interfering surface 67*b* is a flat plane extending in the up-down direction and in the left-right direction. The interfering surface 67*b*M of the ink cartridge 30M is configured to abut against any one of the gates 108 other than the corresponding gate 108M when the ink cartridge 30M is inserted into any one of the insertion spaces 111 different from the specified insertion space 111M. That is, the interfering surface 67*b*M of the ink cartridge 30M is designed to abut against the gate 108C, or the gate 108Y, or the gate 108K, in case that the ink cartridge 30M is inserted into the insertion space 111C, or the insertion space 111Y, or the insertion space 111K. More specifically, the interfering surface 67*b*M of the ink cartridge 30M is designed to abut against any one of the gate 108C, the gate 108Y and the gate 108K, during insertion of the ink cartridge 30M into any one of the insertion space 111C, the insertion space 111Y, and the insertion space 111K other than the insertion space 111M, i.e., in a process of insertion of the ink cartridge 30M until the ink cartridge 30M is completely attached to the cartridge-attachment section 110 to be at the attached posture.

The both side surfaces 67*a* of the light-blocking plate 67 are positioned rearward of the interfering surface 67*b*. The both side surfaces 67*a* facing rightward and leftward, respectively, serve as light-blocking surfaces 67*a* of the light-blocking plate 67. The sloped surface 67*d* is a sloped surface that connects a front edge of the upper surface 67*c* and an upper edge of the interfering surface 67*b*. The sloped surface 67*d* faces forward and upward. The rear edge of the sloped surface 67*d*, i.e., the front edge of the upper surface 67*c* (denoted as a point P2 in FIGS. 7, 8, 9A, 10) is the highest portion in the light-blocking plate 67. The upper edge of the interfering surface 67*b* is positioned slightly downward relative to the upper surface (horizontal surface 154 and inclined surface 155) of the first protrusion 43. The interfering surface 67*b* is positioned forward and downward of the electrodes 65 of the IC board 64.

Figure 9B:
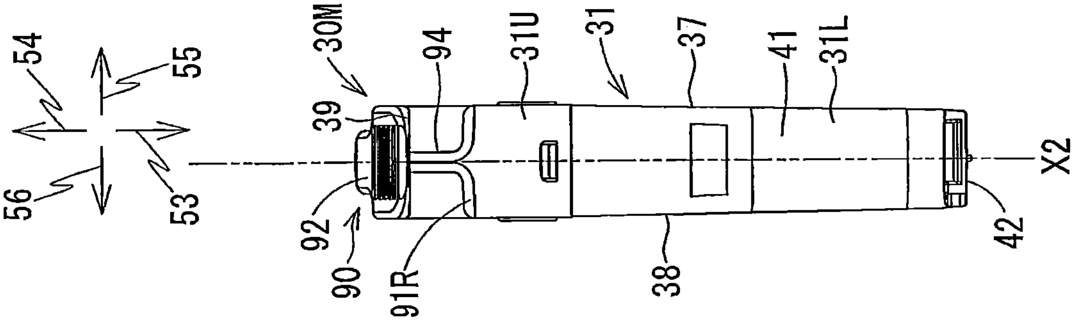
FIG. 9B is a rear side view of the ink cartridge (of magenta color) according to the embodiment.
Figure 9A:
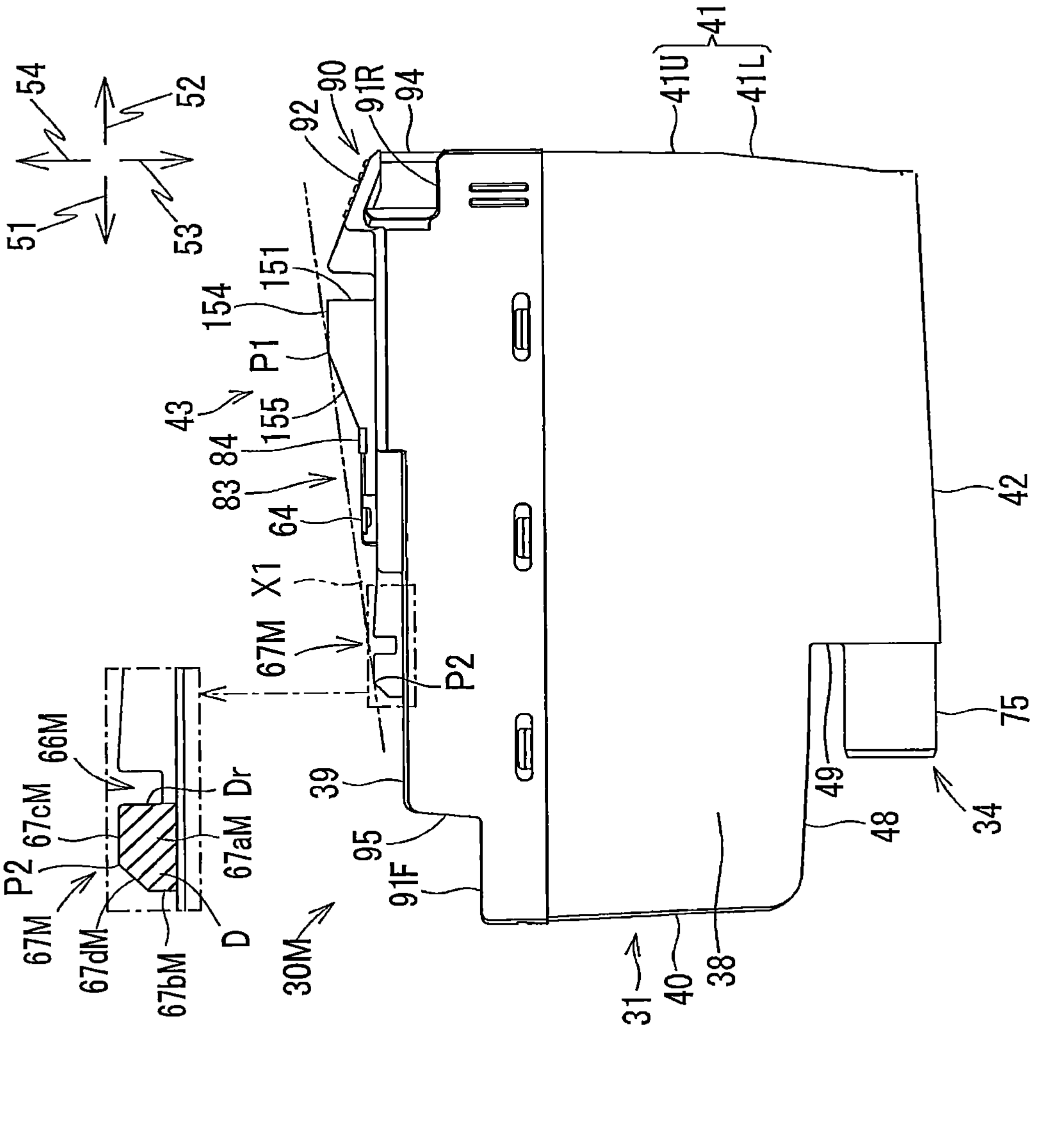
FIG. 9A is a left side view of the ink cartridge (of magenta color) according to the embodiment and illustrating arrangement of parts disposed at an upper surface of the ink cartridge according to the embodiment.

As illustrated in FIGS. 6 and 9A, the both side surfaces 67*a* (light-blocking surfaces 67*a*) of the light-blocking plate 67 extend rearward from left and right ends of the interfering surface 67*b* (also see FIG. and 12). That is, the interfering surface 67*b* and each side surface 67*a* are aligned with each other in the front-rear direction. Further, referring to FIG. 8, the interfering surface 67*b* is positioned rearward relative to an inner surface 40R (rear surface) of the front wall 40, the inner surface 40R defining a front edge of the first ink chamber 32, as will be described later.

The light-blocking plate 67 is configured to block the light of the optical sensor 113 traveling in the left-right direction from the light-emitting portion to the light-receiving portion. More specifically, when the light emitted from the light-emitting portion of the optical sensor 113 is incident on the right or left side surface 67*a* of the light-blocking plate 67 before arriving at the light-receiving portion, the intensity of light received at the light-receiving portion is less than a predetermined intensity, for example, zero. Note that the light-blocking plate 67 may completely block the light traveling in the left-right direction, or may partially attenuate the light, may refract the light to change a traveling direction thereof, or may fully reflect the light.

As illustrated in FIGS. 6-9A and 10, the light-blocking plate 67(67M) is formed with the cutout 66(66M). The cutout 66 is configured to allow light to pass therethrough in the left-right direction (light-transmission portion). The cutout 66 is a space provided by cutting out a portion of an upper end portion of the light-blocking plate 67. In other words, the cutout 66 is recessed downward from the upper surface 67*c* of the light-blocking plate 67. The cutout 66 extends in the front-rear direction and in the left-right direction. The cutout 66 is formed at a position coincident with the corresponding optical sensor 113 in the left-right direction when the ink cartridge 30 having the light-blocking plate 67 provided with the cutout 66 is mounted in the corresponding insertion space 111. In other words, in a state where the ink cartridge 30 is attached to the cartridge-attachment section 110, the cutout 66 of the light-blocking plate 67 of the attached ink cartridge 30 is located between the light-emitting portion and the light-receiving portion of the corresponding optical sensor 113. Hence, the light from the light-emitting portion of the corresponding optical sensor 113 is not blocked by the cutout 66, and is received at the light-receiving portion.

Note that, the light-blocking plate 67 of the present embodiment is provided with the cutout 66 as the light-transmission portion. However, the light-transmission portion of the light-blocking plate 67 may not necessarily be provided as a cutout, as long as light from the light-emitting portion of the optical sensor 113 can pass through the light-transmission portion. For example, the light-transmission portion may be provided as a through-hole penetrating a portion of the light-blocking plate 67 in the left-right direction, or as a transparent plate provided in the light-blocking plate 67.

More precisely, in the present embodiment, a portion of each side surface 67*a* enclosed by a broken line D in FIG. 9A serves as a light-blocking portion of the light-blocking plate 67. That is, the light emitted from the light-emitting portion of the corresponding optical sensor 113 is configured to be incident on this portion D of one of the light-blocking surfaces 67*a* during insertion of the ink cartridge 30. This portion D can block or attenuate the incident light from the optical sensor 113 during insertion of the ink cartridge 30 and is therefore configured to be detected by the controller 117 through the optical sensor 113. This portion D may serve as a detection surface D of the light-blocking plate 67. This detection surface D has a rear edge Dr that also constitutes a front edge of the cutout 66 (light-transmission portion). In the attached state of the ink cartridge 30, the optical sensor 113 is positioned to oppose the cutout 66. This means that, in the light-blocking surface 67*a*, the light from the optical sensor 113 is incident on the detection surface D but cannot be incident on a portion positioned rearward of the cutout 66.

Figure 17:
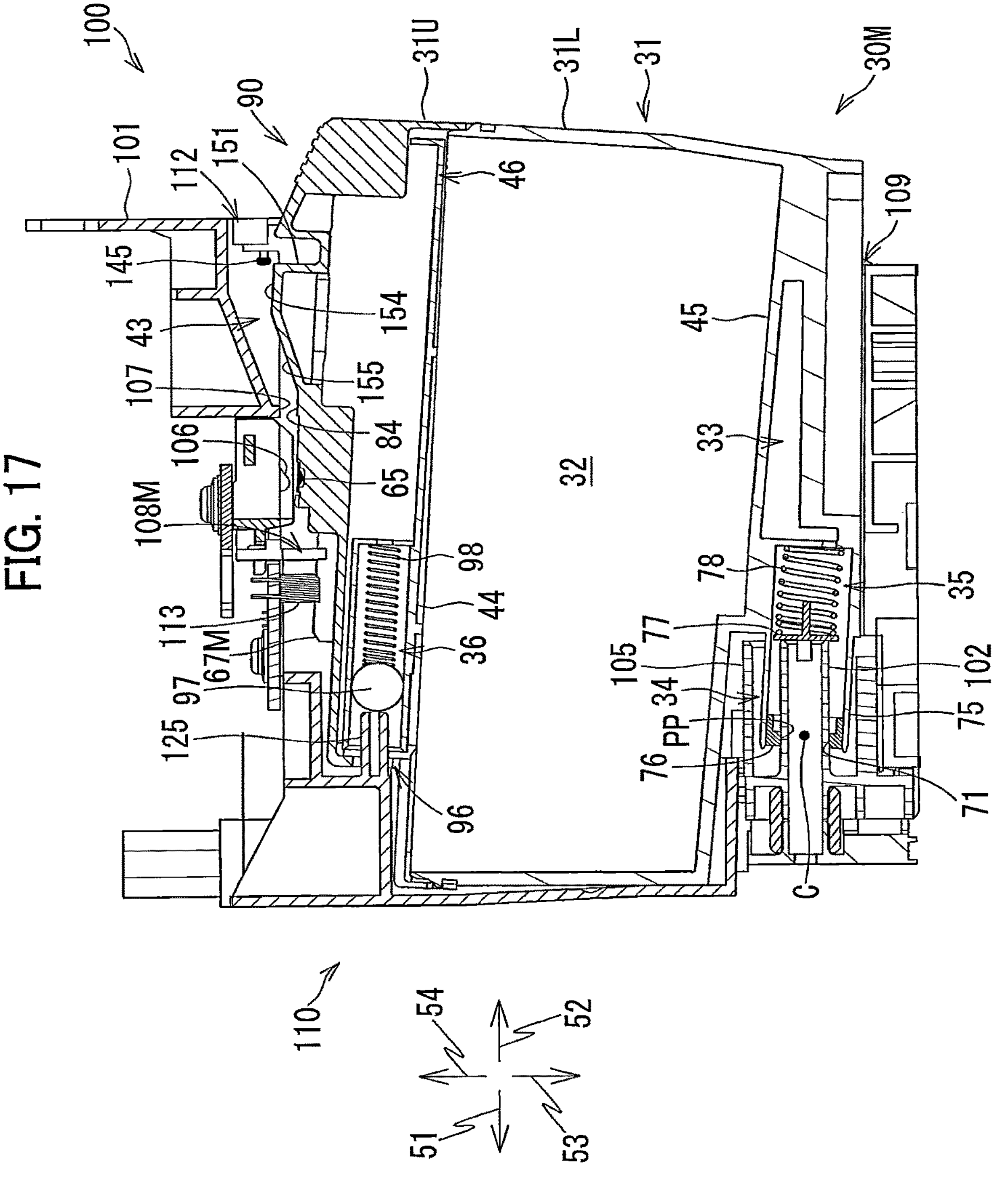
FIG. 17 is a vertical cross-sectional diagram illustrating a state where the ink cartridge (of magenta color) according to the embodiment is inserted further frontward in the corresponding insertion space of the cartridge-attachment section after the state illustrated in FIG. 16 and is in a second posture in the corresponding insertion space.

The light-blocking plate 67 may not be formed with the cutout 66. For example, the light-blocking plate 67 of the ink cartridge 30C depicted in FIG. 17 is not formed with the cutout 66. In case that the cutout 66 is not formed in the light-blocking plate 67, one of the side surfaces 67*a* of the light-blocking plate 67 opposes the light-emitting portion of the optical sensor 113 in the left-right direction when the ink cartridge 30 is attached to the cartridge-attachment section 110. Thus, the light emitted from the light-emitting portion of the optical sensor 113 is blocked by the light-blocking plate 67 and is not received at the light-receiving portion.

The ink cartridges 30 may or may not include the cutout 66 depending on types of the ink cartridges 30. For example, the types of the ink cartridges 30 may vary depending on colors of ink, initial amounts of ink (larger or smaller), or types of ink (pigment ink or dye ink) stored in the ink cartridges 30. In the present embodiment, the ink cartridges 30 are, for each color, configured to store different initial amounts of ink. Specifically, the ink cartridges 30M storing magenta ink can be classified into two types: larger-amount type and smaller-amount type. The ink cartridge 30M of the larger-amount type stores a larger amount of ink in the first ink chamber 32 as its initial amount of ink than the initial amount of ink stored in the first ink chamber 32 of the ink cartridge 30M of the smaller-amount type. In this example, the ink cartridge 30M of the larger-amount type includes the light-blocking plate 67M formed with the cutout 66M, while the ink cartridge 30M of the smaller amount type includes the light-blocking plate 67M without the cutout 66M. In the present embodiment, the type of the ink cartridge 30 (i.e., the initial amount of ink) attached to the cartridge-attachment section 110 can be determined based on presence or absence of the cutout 66 in the light-blocking plate 67, as will be described later in detail.

As illustrated in FIGS. 6 to 8, the IC board 64 is disposed at the upper end of the second protrusion 83 and between the light-blocking plate 67 and the first protrusion 43. The IC board 64 is positioned in a recess that is recessed downward and that is formed in the second protrusion 83, the recess being positioned frontward of the contact surface 84. The IC board 64 is supported by the second protrusion 83 from below. Specifically, although not depicted in detail in the drawings, a photocurable resin is filled in the recess of the second protrusion 83, whereby the IC board 64 is adhered to the second protrusion 83.

The IC board 64 includes a substrate, an IC (not illustrated), and four electrodes 65 mounted on an upper surface of the substrate, for example. The substrate is made of silicon, for example. The IC is a semiconductor integrated circuit and readably stores data indicating information relating to the ink cartridge 30, such as a lot number, a manufacturing date, and a color of the ink. Alternatively, the IC board 64 may be formed of a flexible board (substrate) having flexibility, provided with the IC and electrodes.

The electrodes 65 are electrically connected to the IC. The four electrodes 65 each extend in the front-rear direction. The four electrodes 65 are arranged spaced apart from one another in the left-right direction. The four electrodes 65 are arranged on the upper surface of the substrate such that the electrodes 65 are exposed above to allow electrically access thereto from above. The electrodes 65 of the IC board 64 come into contact with the corresponding contacts 106 each at a contact point P4 (illustrated in FIG. 10) to be electrically connected thereto during insertion of the ink cartridge 30 into the cartridge-attachment section 110, and is electrically connected to the corresponding set of contacts 106 in a state where the ink cartridge 30 is attached to the cartridge-attachment section 110.

As illustrated in FIGS. 9A and 10, the IC board 64 is arranged rearward relative to the ink supply port 71 of the ink supply portion 34. The IC board 64 is disposed forward of the locking surface 151. The IC board 64 is also positioned downward of the upper edge 151U of the locking surface 151, but upward relative to the light-blocking plate 67. Further, as illustrated in FIG. 4, the IC board 64 is positioned rearward relative to the distal end 102E of the ink needle 102 in the frontward direction 51 in the attached posture.

As described above, the connecting wall 95 connects the front sub-upper wall 91F and the upper wall 39. That is, the connecting wall 95 extends upward from the rear end of the front sub-upper wall 91F. The connecting wall 95 faces forward. The air communication port 96 is formed in the connecting wall 95. That is, the air communication port 96 is disposed upward relative to a center of the dimension of the cartridge body 31 in the up-down direction. The air communication port 96 is a through-hole formed in the connecting wall 95. The air communication port 96 has a substantially circular cross-section (see FIG. 6) and has an inner diameter larger than an outer diameter of the corresponding rod 125 of the cartridge-attachment section 110. The rod 125 is configured to enter the air communication port 96 during insertion of the ink cartridge 30 into the cartridge-attachment section 110.

<Internal Configuration of Cartridge Body 31>

As illustrated in FIG. 8, the first ink chamber 32, the second ink chamber 33, the ink valve chamber 35, and an air valve chamber 36 are provided inside the cartridge body 31.

The first ink chamber 32 and the air valve chamber 36 are partitioned by a partitioning wall 44. The first ink chamber 32 and the second ink chamber 33 are partitioned by a partitioning wall 45. The partitioning wall 44 and partitioning wall 45 are both walls extending in the front-rear direction and in the left-right direction. The partitioning wall 44 and partitioning wall 45 are disposed opposite to each other in the up-down direction. A through-hole 46 is formed in the partitioning wall 44. The first ink chamber 32 and the air valve chamber 36 communicate with each other through the through-hole 46.

As illustrated in FIG. 8, specifically, the first ink chamber 32 is a space enclosed by the following surfaces: a lower surface 44L of the partitioning wall 44, an upper surface 45U of the partitioning wall 45, and the inner surface 40R of the front wall 40, an inner surface 41F of the rear wall 41 (front surface of the rear wall 41), and inner surfaces of the side walls 37 and 38. The lower surface 44L and upper surface 45U defines upper and lower edges of the first ink chamber 32, respectively. The inner surface 40R, inner surface 41F, and the inner surfaces of the side walls 37 and 38 defines front, rear and side edges of the first ink chamber 32, respectively. The inner surface 40R is the rear surface of the front wall 40, i.e., a surface opposite to the front surface 40 (front surface of the front wall 40). The inner surface 41F is a front surface of the rear wall 41, i.e., a surface opposite to the rear surface 41 (rear surface of the rear wall 41). The inner surfaces of the side walls 37 and 38 are surfaces opposite to the outer surfaces of the side walls 37 and 38. In FIG. 7, the inner surface of the side wall 38 is not illustrated.

The second ink chamber 33 is positioned downward of the first ink chamber 32 in the upright posture of the ink cartridge 30. The second ink chamber 33 can store ink therein. The second ink chamber 33 has a capacity smaller than a capacity of the first ink chamber 32. That is, a smaller amount of ink can be stored in the second ink chamber 33 than in the first ink chamber 32.

The second ink chamber 33 and ink valve chamber 35 are partitioned by a partitioning wall 50. The second ink chamber 33 communicates with the first ink chamber 32 through a communication port 47 formed in the partitioning wall 45 (see FIG. 8). The second ink chamber 33 communicates with the ink valve chamber 35 through a through-hole 99 formed in the partitioning wall 50. The partitioning wall 50 defines a rear edge of the ink valve chamber 35, i.e., a rear edge 75R of the ink supply portion 34 (see FIG. 8).

The second ink chamber 33 is a space enclosed by the following surfaces: a lower surface 45L of the partitioning wall 45, an upper surface 42U of the lower wall 42, a rear surface 50R of the partitioning wall 50, the inner surface 41F of the rear wall 41, and the inner surfaces of the side walls 37 and 38. The lower surface 45L and upper surface 42U define upper and lower edges of the second ink chamber 33, respectively. The rear surface 50R, inner surface 41F and the inner surfaces of the side walls 37 and 38 define front, rear and side edges of the second ink chamber 33, respectively.

Within the air valve chamber 36, a valve 97 and the coil spring 98 are disposed. The air valve chamber 36 can communicate with ambient air through the air communication port 96 formed in the connecting wall 95. The valve 97 is movable between a closing position sealing the air communication port 96 and an opening position separated from the air communication port 96. The coil spring 98 is disposed rearward of the valve 97 so as to be capable of expanding and contracting in the front-rear direction. The coil spring 98 urges the valve 97 in the frontward direction 51 (toward the air communication port 96). Accordingly, in a state that no external force is applied, the valve 97 is in contact with the air communication port 96 to seal the air communication port 96. The coil spring 98 has a spring constant that is smaller than a spring constant of the coil spring 78 of the ink supply portion 34.

Incidentally, a member for sealing the air communication port 96 is not limited to the valve 97. For example, a seal may be removably affixed to the connecting wall 95 to seal the air communication port 96.

During insertion of the ink cartridges 30 into the cartridge-attachment section 110, the rod 125 of the cartridge-attachment section 110 enters inside the air communication port 96, thereby moving the valve 97 rearward from the closing position toward the opening position against the biasing force of the coil spring 98. When the valve 97 is separated from the air communication port 96 by the rod 125 and is at the separating position, the first ink chamber 32 is opened to the atmosphere.

The ink supply portion 34 is provided at the connecting wall 49 constituting the front surface of the ink cartridge 30. The ink supply portion 34 has a cylindrical outer shape. More specifically, the ink supply portion 34 includes a hollow cylindrical-shaped cylinder 75, and a packing 76. The cylinder 75 protrudes forward from the connecting wall 49. The cylinder 75 has a front end that is opened to the outside of the ink cartridge 30. The cylinder 75 defines an inner space therein that serves as the ink valve chamber 35.

The packing 76 is provided at the open front end of the cylinder 75. The packing 76 is a disk-shaped member and has a center portion formed with a through-hole. The packing 76 is made of an elastic material such as rubber or elastomer. The through-hole penetrates through the center portion of the packing 76 in the front-rear direction to provide a tubular-shaped inner peripheral surface that defines the ink supply port 71. The ink supply port 71 has a diameter that is slightly smaller than an outer diameter of the ink needle 102.

Within the ink valve chamber 35, a valve 77 and the coil spring 78 are disposed. The valve 77 is movable in the front-rear direction to open and close the ink supply port 71 penetrating the center portion of the packing 76. The coil spring 78 biases the valve 77 forward. Accordingly, without application of an external force, the valve 77 closes the ink supply port 71 of the packing 76.

When the ink cartridge 30 is inserted into the cartridge-attachment section 110 in a state where the valve 77 closes the ink supply port 71, the ink needle 102 enters the ink supply port 71. An outer peripheral surface of the ink needle 102 entering into the ink supply port 71 is brought into contact with the inner peripheral surface defining the ink supply port 71 to provide liquid-tight seal therewith, while elastically deforming the packing 76. When the distal end 102E of the ink needle 102 passes through the ink supply port 71 of the packing 76 and enters inside the ink valve chamber 35, the distal end 102E of the ink needle 102 comes in contact with the valve 77. As the ink cartridge 30 is further inserted into the cartridge-attachment section 110, the distal end 102E of the ink needle 102 moves the valve 77 rearward against the biasing force of the coil spring 78, thereby separating the valve 77 from the ink supply port 71 to open the ink supply port 71. Accordingly, the ink in the valve chamber 35 is allowed to flow into the inner space of the ink needle 102.

Note that, instead of the valve 77, the ink supply portion 34 may be closed with a film. In this case, the ink supply port 71 may be defined by the front end of the cylinder 75, not by the packing 76. Alternatively, the ink supply port 71 may be configured to be closed by a sealing member without a through-hole. In this case, the ink supply port 71 may be formed by piercing the ink needle 102 into the sealing member, and be closed by an elasticity of the sealing member itself as the ink needle 102 is removed from the sealing member. Still alternatively, the ink supply portion 34 need not be provided as a cylindrical-shaped member. For example, a through-hole may be formed in the front wall 40 to penetrate the same in a thickness direction thereof (front-rear direction). The ink supply portion is partially defined by the front wall 40.

Referring to FIG. 9A, here, assume an imaginary plane X1 that includes the point P1 and the point P2 and that extends in the left-right direction. As explained above, the point P1 denotes the boundary edge at which the inclined surface 155 and the horizontal surface 154 are connected to each other; and the point P2 denotes the front edge of the upper surface 67*c* of the light-blocking plate 67. In the present embodiment, the imaginary plane X1 is inclined to extend downward toward frontward. The IC board 64 is disposed below the imaginary plane X1.

More specifically, assume a region that is defined between the imaginary plane X1 and the upper surface 39 of the cartridge body 31, i.e., a space that is above the upper surface 39 of the cartridge body 31 and below the imaginary plane X1. The IC board 64 is disposed within this region. Further, the side surfaces 67*a* of the light-blocking plate 67, the cutout 66, the IC board 64, the contact surface 84, and the inclined surface 155 are all disposed between the point P1 and the point P2 in the front-rear direction within the region defined between the upper surface 39 and the imaginary plane X1 in the up-down direction. In other words, members that can be accessed from above or the left or the right side of the ink cartridge 30 are all disposed within this region. Put another way, in the ink cartridge 30 of the present embodiment, there is no member that extends to cross the imaginary plane X1 between the point P1 and the point P2. That is, the upper edge of the inclined surface 155 (point P1) is the highest point, and the front edge of the upper surface 67*c* of the light-blocking plate 67 (point P2) is the second highest point among all the members positioned between the point P1 and point P2 on the upper surface 39 of the ink cartridge 30.

In the frontward direction 51, the locking surface 151, IC board 64 and light-blocking plate 67 are arranged in this order, from the rear surface 41 toward the front surface 40. In the up-down direction, the light-blocking plate 67, IC board 64 and the locking surface 151 are arranged in this order toward the top. More specifically, uppermost portions of the light-blocking plate 67, the IC board 64 and the locking surface 151 are arranged toward the top in the recited order in the upward direction 54.

Figure 14:
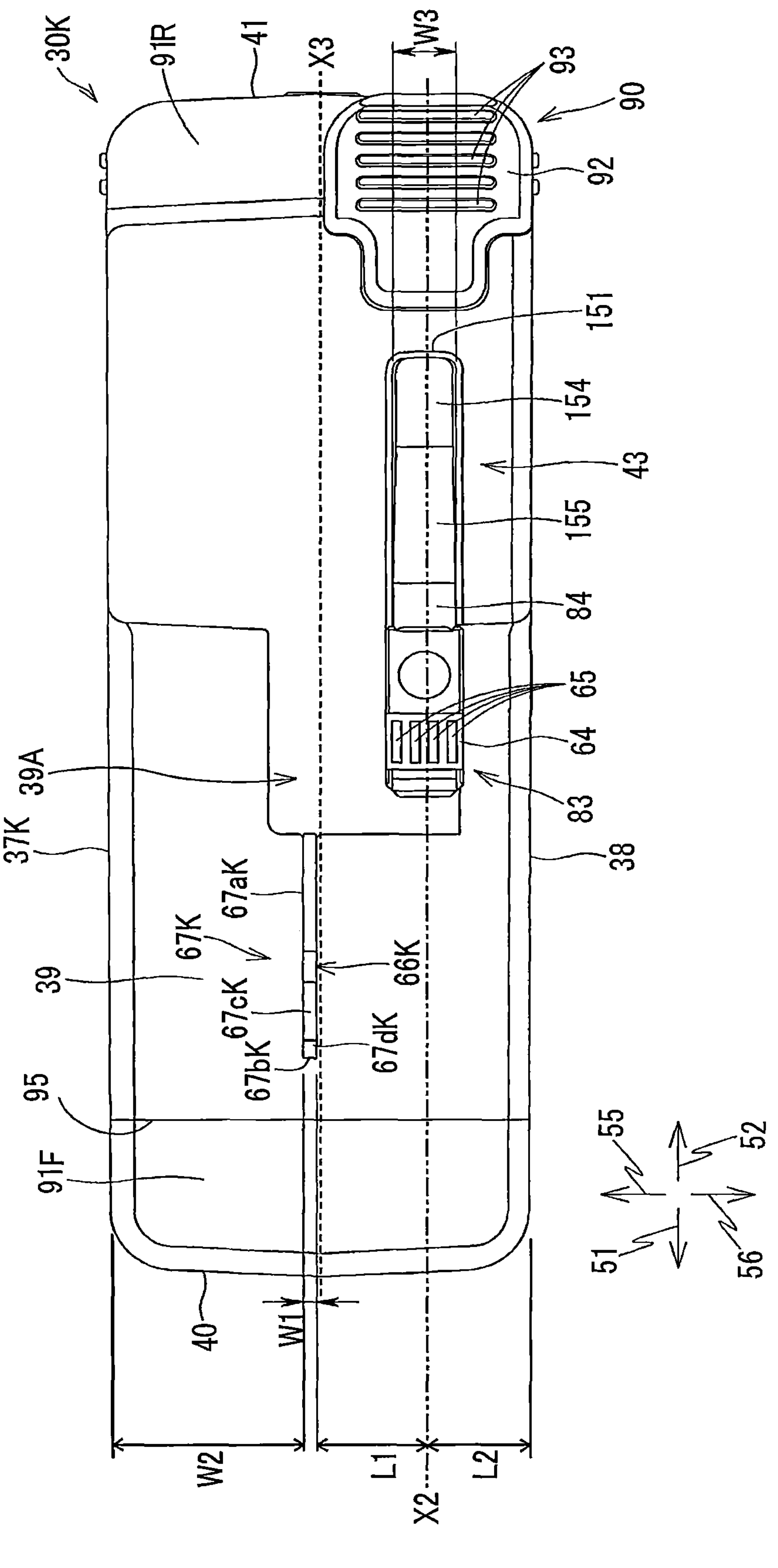
FIG. 14 is a top view of the ink cartridge of black color according to the embodiment.

Further, as illustrated in FIG. 14, the first protrusion 43 has a dimension or width in the left-right direction (width W3) that is greater than the width W1 of the light-blocking plate 67 in the left-right direction. That is, the first protrusion 43 has a wider width (W3) than the light-blocking plate 67 and protrudes from the upper surface 39 further upward relative to the light-blocking plate 67. The first protrusion 43 is designed to protect the light-blocking plate 67 from external damages, such as impacts that may be impinged at the time of falling of the ink cartridge 30 onto the floor, for example.

Further, referring to FIG. 8, the light-blocking plate 67 is positioned frontward relative to a center of gravity G of the ink cartridges 30 in the front-rear direction, whereas the locking surface 151 is positioned rearward relative to the center of gravity G of the ink cartridges 30 in the front-rear direction. In other words, the light-blocking plate 67 is positioned closer to the front surface 40 than the center of gravity G is to the front surface 40 in the front-rear direction. The locking surface 151 is positioned closer to the rear surface 41 than the center of gravity G is to the rear surface 41 in the front-rear direction.

Referring to FIG. 10 in which the ink cartridge 30 is in the attached posture or in the upright posture, the IC board 64 is positioned rearward relative to the ink supply port 71 of the ink supply portion 34 in the front-rear direction. Further, the IC board 64 is positioned rearward relative to the partitioning wall 50 defining the rear edge 75R of the ink supply portion 34 in the front-rear direction. The contact surface 84 is also positioned rearward relative to the ink supply port 71 of the ink supply portion 34. The IC board 64, the contact surface 84 and the inclined surface 155 are aligned in the front-rear direction in this order from the front toward the rear. More specifically, referring to FIGS. 9B and 13A to 13D, assume an imaginary plane X2 passing through the left-right center of the IC board 64 and extending parallel to the front-rear direction and up-down direction. In the present embodiment, this imaginary plane X2 also passes through centers of the contact surface 84, the inclined surface 155 and the locking surface 151 in the left-right direction. Further, in the present embodiment, the imaginary plane X2 also passes the left-right center of the ink supply port 71.

Again, on the upper surface 39 between the IC board 64 and the inclined surface 155 in the front-rear direction, the upper edge of the inclined surface 155 (point P1) is the uppermost position. The contact surface 84 is positioned slightly higher relative to the electrodes 65 on the IC board 64, but is positioned lower than the upper edge (point P1) of the inclined surface 155. The contact surface 84 is positioned at the substantially same level as or slightly lower relative to the lower edge of the inclined surface 155.

The ink supply portion 34, the IC board 64 and the locking surface 151 are aligned in the front-rear direction in this order from the front toward the rear. More specifically, referring to FIGS. 8 and 10, the IC board 64 is arranged rearward relative to the ink supply portion 34 (ink supply port 71) in the front-rear direction. Further, the IC board 64 and contact surface 84 are aligned with each other in the front-rear direction.

The light-blocking plate 67 is positioned between the ink supply port 71 of the ink supply portion 34 and the IC board 64 in the front-rear direction. The light-blocking plate 67 is also positioned lower than the upper surface of the IC board 64, i.e., the electrodes 65. The front end 42F of the bottom surface 42 is positioned frontward relative to the IC board 64.

FIG. 10 summarizes positional relationships among the above-mentioned elements of the ink cartridge 30.

A distance D1 is larger than a distance D2 (D1>D2). Here, the distance D1 is defined as a distance in the front-rear direction between the ink supply port 71 (i.e., the front end face of the ink supply portion 34 in which the ink supply port 71 is open) and the engaging point P3 on the locking surface 151. The distance D2 is defined as a distance in the front-rear direction between the engaging point P3 on the locking surface 151 and the upper portion 41U of the rear surface 41 (rearmost point P5 on the rear surface 41). Further, the distance D2 is shorter than a distance D5 (D2<D5). The distance D5 is defined as a distance in the front-rear direction between the contact point P4 on the electrodes 65 of the IC board 64 and the engaging point P3 on the locking surface 151. The distance D5 is greater than a distance D6 (D5>D6). The distance D6 is defined as a distance in the front-rear direction between the contact point P4 on the electrodes 65 of the IC board 64 and the front-rear center of the contact surface 84.

Further, a distance D3 is longer than a distance D4 (D3>D4). The distance D3 is defined as a distance in the up-down direction between the vertical center of the ink supply port 71 and the upper edge 151U of the locking surface 151. The distance D4 is defined as a distance in the up-down direction between the vertical center of the ink supply port 71 and the contact surface 84. Still further, the distance D4 is shorter than a distance D7 (D4<D7), where the distance D7 is defined as a distance in the up-down direction between the vertical center of the ink supply port 71 and the upper end 151U of the inclined surface 155. The contact point P4 on the electrodes 65 is spaced away from the ink supply port 71 (front end face of the ink supply portion 34 in which the ink supply port 71 is open) by a distance D8. That is, the distance D8 is defined as a distance in the front-rear direction between the ink supply port 71 (front end face of the ink supply portion 34 in which the ink supply port 71 is open) and the contact point P4 on the electrodes 65 of the IC board 64.

Preferably, the distance D1 may range from 90 mm to 95 mm; the distance D2 may range from 20 mm to 25 mm; the distance D3 may range from 71 mm to 80 mm; the distance D4 may range from 70 mm to 73 mm; the distance D5 may range from 30 mm to 35 mm; and the distance D6 may range from 10 mm to 13 mm. These numerals are just examples, and should not be limited thereto.

Note that, in the present embodiment, among the light-blocking plate 67, the IC board 64 and the locking surface 151, the light-blocking plate 67 is positioned closest to the front surface 40 (front surface of the front wall 40) that defines a frontmost edge of the ink cartridge 30. That is, the light-blocking plate 67 is the element that is positioned closest to the frontmost edge of the ink cartridge 30 among those elements that are configured to be accessed from outside (i.e., among the light-blocking plate 67, the IC board 64 and the locking surface 151). Accordingly, the distance D2 between the rearmost point P5 and the engaging point P3 in the front-rear direction is shorter than a distance D9 defined between the frontmost edge (front surface of the front wall 40) and the front edge of the light-blocking plate 67 (i.e., the interfering surface 67*b*) in the front-rear direction.

[Comparison of the Ink Cartridges 30C, 30M, 30Y and 30K]

<Ink Cartridge 30K>

The ink cartridge 30K is different from the ink cartridges 30C, 30M, and 30Y in terms of ink color and capacity of the first ink chamber 32.

The ink cartridge 30K stores ink of a black color. The ink cartridge 30K is different from the ink cartridges 30C, 30M, and 30Y in that the cartridge body 31 of the ink cartridge 30K has a left-right dimension that is larger than a left-right dimension of the cartridge body 31 of the ink cartridges 30C, 30M and 30Y, as illustrated in FIGS. 11A through 15. Accordingly, the capacity of the first ink chamber 32 of the ink cartridge 30K is larger than those of the ink cartridges 30C, 30M, and 30Y.

Referring to FIGS. 13A to 13D, the side surface 37 of the ink cartridge 30K (labelled as 37K in FIG. 13A) is positioned farther away from the imaginary plane X2 than the side surface 37 of each of the ink cartridges 30C, 30M and 30Y is from the imaginary plane X2 in the rightward direction 55. The left-right dimension of the ink cartridge 30K is defined as a distance between outer edges of the cartridge body 31 of the ink cartridge 30K in the left-right direction (i.e., the distance between the side surface 37K and the side surface 38 of the cartridge body 31 of the ink cartridge 30K).

Further, referring to FIGS. 13A to 13D, the first protrusion 43 and second protrusion 83 for the ink cartridges 30C, 30M and 30Y are disposed on the upper surface 39 at the left-right center thereof. On the other hand, on the upper surface 39 of the cartridge body 31 of the ink cartridge 30K, the first protrusion 43 and second protrusion 83 are arranged offset from the left-right center of the upper surface 39 of the cartridge body 31. More specifically, in the present embodiment, the first protrusion 43 and second protrusion 83 of the ink cartridge 30K are disposed on the upper surface 39 at a position offset to the left relative to the left-right center of the upper surface 39 of the cartridge body 31. On the other hand, the first protrusion 43 and second protrusion 83 for the ink cartridges 30C, 30M and 30Y are disposed on the upper surface 39 at the left-right center thereof.

The ink cartridges 30C, 30M, 30Y and 30K are different from one another in terms of the left-right position of the light-blocking plate 67. That is, specific positions of the respective light-blocking plates 67C, 67M, 67Y and 67K in the left-right direction differ from one another among the ink cartridges 30C, 30M, 30Y and 30K, as shown in FIGS. 13A to 13D.

Figure 13A:
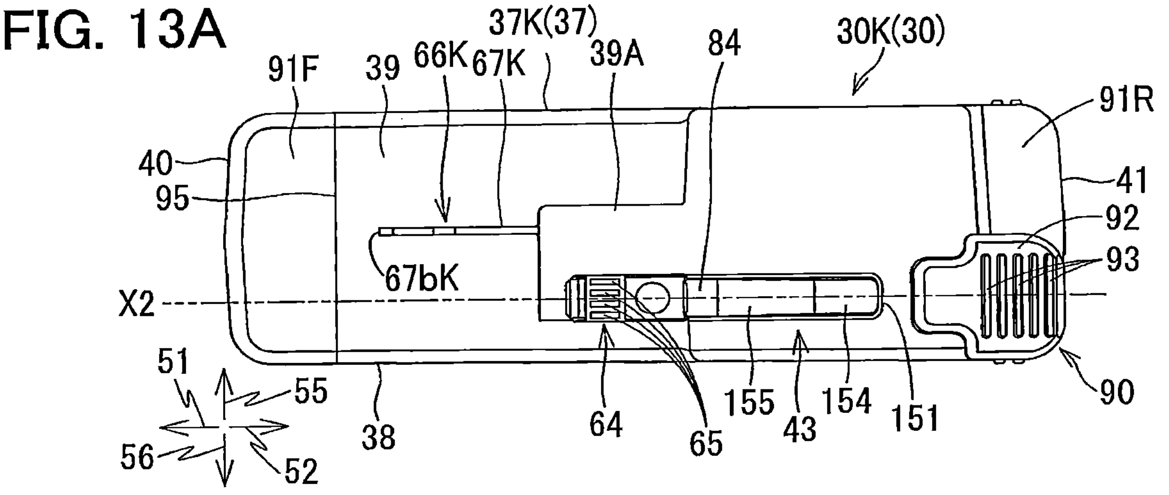
FIGS. 13A through 13D are top views of the ink cartridges of colors of black, magenta, cyan and yellow, respectively, according to the embodiment.

Referring to FIGS. 13A and 14, with regard to ink cartridge 30K, the left-right position of the light-blocking plate 67K does not fall within the width of the IC board 64 in left-right direction. That is, the light-blocking plate 67K of the ink cartridge 30K is not aligned with the IC board 64 (the second protrusion 83 and the first protrusion 43) in the front-rear direction.

More specifically, as illustrated in FIG. 14, in the ink cartridge 30K, the width W1 of the light-blocking plate 67K is smaller than a width W2 (W1<W2), where the width W2 is a defined as a distance (dimension) in the left-right direction between the right edge of the upper surface 39 (right side surface 37K) and the right edge of the interfering surface 67*b* (i.e., the right side surface 67*a* of the light-blocking plate 67K) in the ink cartridge 30K. Put another way, the width W2 is a shortest distance in the left-right direction between one of the outer edges of the upper surface 39 (i.e., right edge of the upper surface 39) and one of the light-blocking surface 67*a* of the light-blocking plate 67K (i.e., one of the outer edges of the interfering surface 67*b*) in the ink cartridge 30K. Note that, in the ink cartridge 30K, the right edge of the upper surface 39 (right side surface 37K) is closer to the right side surface 67*a* of the light-blocking plate 67K (right edge of the interfering surface 67*b*) than the left edge of the upper surface 39 (left side surface 38) is to the right side surface 67*a* of the light-blocking plate 67K in the left-right direction.

Further, referring to FIG. 14, assume an imaginary plane X3 that represents an outermost edge of the cartridge body 31 of the ink cartridge 30M(30C, 30Y) in the left-right direction. That is, the imaginary plane X3 corresponds to the side surface 37 of the ink cartridge 30M (30C, 30Y) in the present embodiment. The light-blocking plate 67K of the ink cartridge 30K is positioned outward relative to the imaginary plane X3 in the left-right direction, i.e., opposite to the imaginary plane X2 with respect to the imaginary plane X3. Put another way, in the left-right direction, a distance L1 is greater than a distance L2 (L1>L2), where the distance L1 is a distance between the side surface 67*a* (left side surface 67*a*K) of the light-blocking plate 67K and the imaginary plane X2; and the distance L2 is a shortest distance between the imaginary plane X2 and the outermost edge of the cartridge body 31 of the ink cartridge 30M (30C, 30Y) in the left-right direction (i.e., the distance in the left-right direction between the imaginary plane X2 and the side surface 38 in the present embodiment). That is, in the ink cartridge 30K, the interfering surface 67*b*(67*b*K) of the light-blocking plate 67K is not aligned with the IC board 64 in the front-rear direction and is offset toward the right from the imaginary plane X2. Or the interfering surface 67*b*(67*b*K) of the light-blocking plate 67K and the IC board 64 are arranged at different positions from each other in the left-right direction.

Figure 13B:
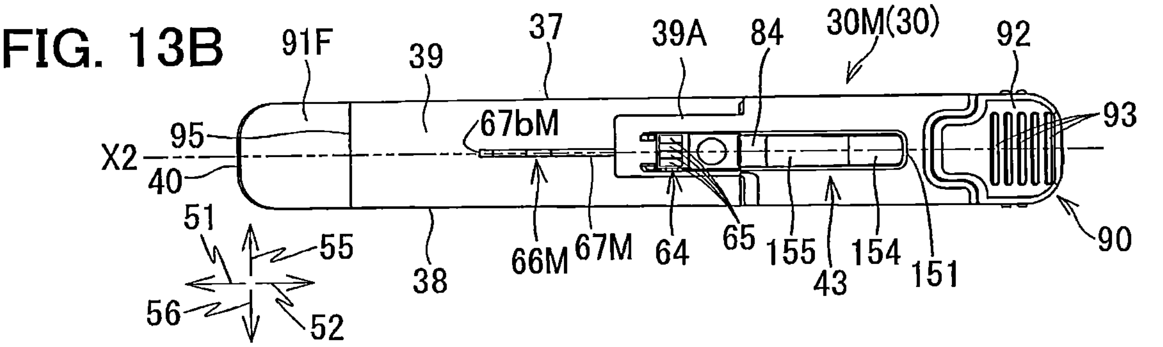
Figure 13C:
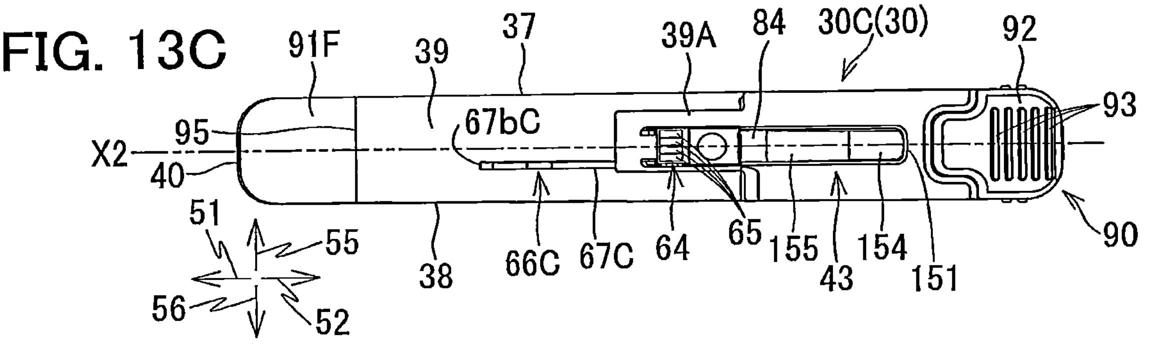
Figure 13D:
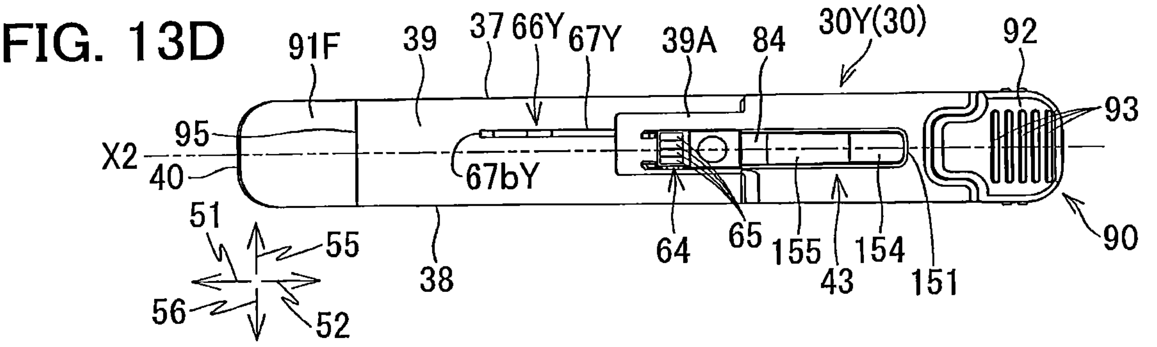

On the other hand, referring to FIGS. 13B to 13D, the light-blocking plates 67C, 67M and 67Y of the ink cartridges 30C, 30M, 30Y are all arranged at such left-right positions that fall within a width of the IC board 64 (a width of the second protrusion 83 and the first protrusion 43) in the left-right direction. However, the specific positions of the light-blocking plates 67C, 67M and 67Y differ from one another in the left-right direction.

Figure 15:
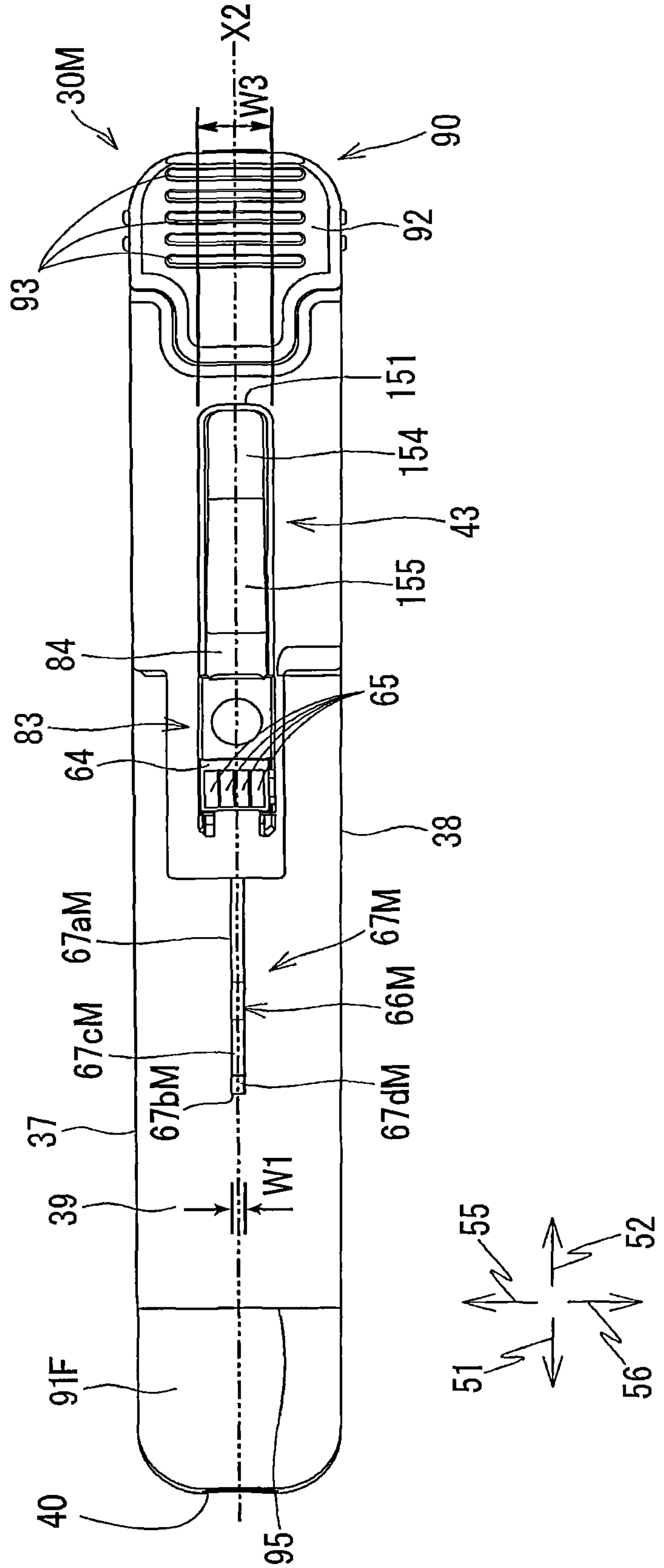
FIG. 15 is a top view of the ink cartridge of magenta color according to the embodiment.

More specifically, as illustrated in FIGS. 13B and 15, the light-blocking plate 67M of the ink cartridge 30M is positioned on the imaginary plane X2 to extend therealong. The interfering surface 67*b*M of the light-blocking plate 67M intersects with the imaginary plane X2, in the present embodiment. As illustrated in FIG. 13C, the light-blocking plate 67C of the ink cartridge 30C is positioned leftward relative to the imaginary plane X2. That is, the interfering surface 67*b*C of the light-blocking plate 67C is positioned offset to the left relative to the imaginary plane X2. Put different way, the interfering surface 67*b*C of the ink cartridge 30C is closer to the left edge of the upper surface 39 (left side surface 38) than the interfering surface 67*b*M of the ink cartridge 30M is to the left edge of the upper surface 39 (left side surface 38) in the left-right direction. As illustrated in FIG. 13D, the light-blocking plate 67Y of the ink cartridge 30Y is positioned rightward relative to the imaginary plane X2. That is, the interfering surface 67*b*Y of the light-blocking plate 67Y is positioned offset to the right relative to the imaginary plane X2. In other words, the interfering surfaces 67*b*C, 67*b*Y of the light-blocking plate 67C, 67Y are positioned away from the imaginary plane X2 in the left-right direction and offset from the center of the IC board 64 in the left-right direction.

[Attachment/Detachment of the Ink Cartridge 30 Relative to the Cartridge-Attachment Section 110]

Next, a process for attaching the ink cartridge 30 to the cartridge-attachment section 110 will be described with reference to FIGS. 4, 5A, 5B, 16 and 17. In FIGS. 4, 5A, 5B, 16 and 17, the ink cartridge 30M is depicted as an example.

As illustrated in FIG. 8, in the ink cartridges 30 prior to attachment to the cartridge-attachment section 110, the valve 77 closes the ink supply port 71 of the packing 76. Accordingly, at this time, ink flow to the outside of the ink cartridge 30 is interrupted. Further, in this state, the valve 97 closes the air communication port 96. Accordingly, the first ink chamber 32 is not opened to the atmosphere. Further, before attachment of the ink cartridge 30 to the cartridge-attachment section 110, the opening 112 of the case 101 is closed by the cover 114 at the closing position.

For inserting and removing the ink cartridge 30 into/from the cartridge-attachment section 110, the user pivots the cover 114 from the closing position to the opening position.

The ink cartridge 30 is configured to be inserted into the case 101 through the opening 112 of the cartridge-attachment section 110 in the upright posture: that is, in such a posture that the front surface 40 of the cartridge body 31 faces frontward, and the upper surface 39 of the cartridge body 31 face upward. Since the upper portion 41U of the rear surface 41 of the cartridge body 31 is positioned rearward relative to the lower portion 41L, that is, since the upper portion 41U is positioned closer to the user than the lower portion 41L is to the user, the user pushes the upper portion 41U forward to insert the ink cartridge 30 into the cartridge-attachment section 110. The bottom portion of the ink cartridge 30 thus enters the corresponding guide groove 109 provided in the bottom surface of the case 101.

As the ink cartridge 30 is further inserted into the case 101, the ink supply portion 34 enters the corresponding guide portion 105. At the same time, the rod 125 enters into the corresponding air communication port 96.

Figure 16:
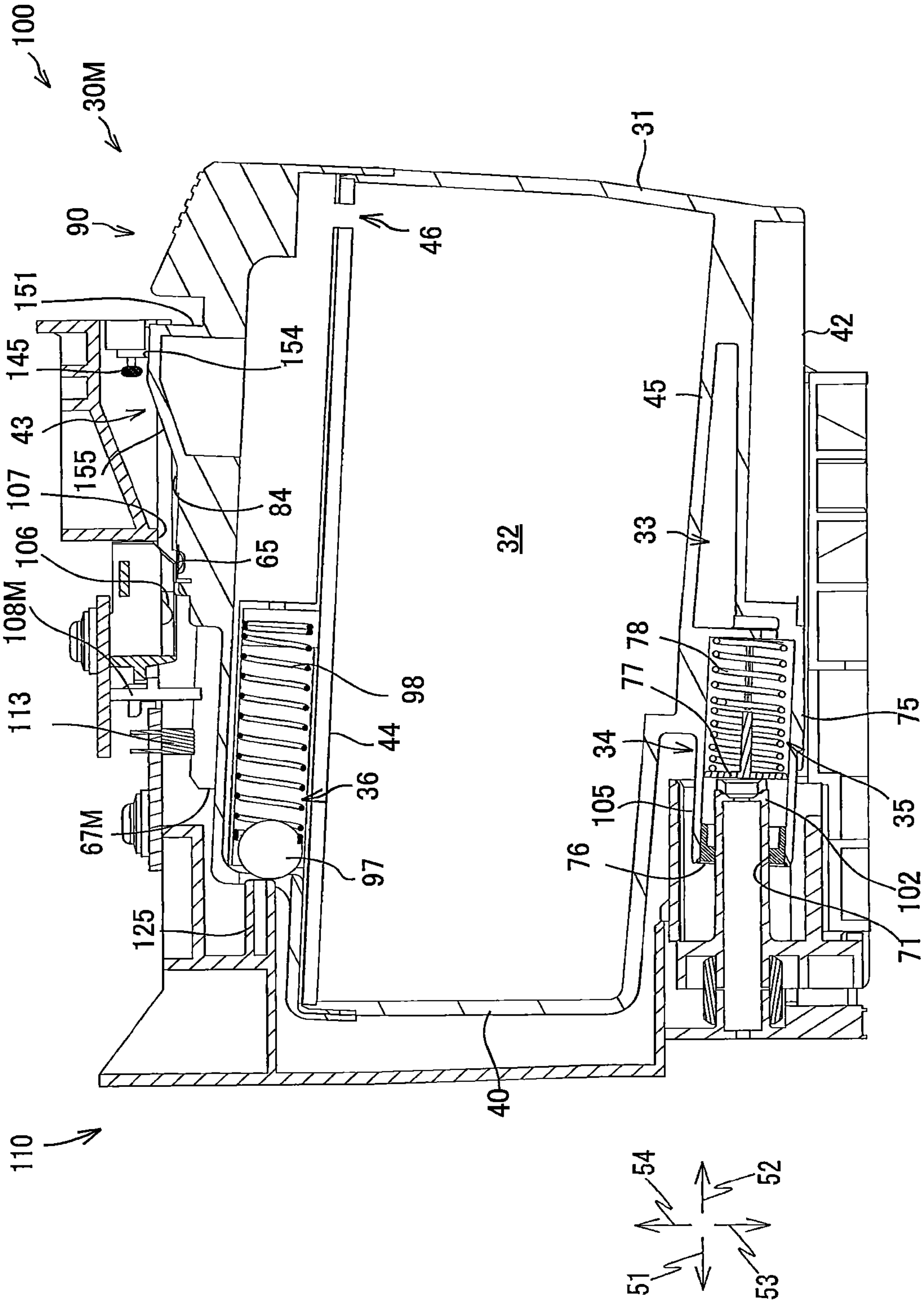
FIG. 16 is a vertical cross-sectional diagram illustrating a state where the ink cartridge (of magenta color) according to the embodiment is inserted in the corresponding insertion space of the cartridge-attachment section.

Further, the interfering surface 67*b* of the light-blocking plate 67 arrives at the corresponding gate 108 of the cartridge-attachment section 110. For example, in case that the ink cartridge 30M is inserted into the prescribed insertion space 111M of the case 101, the left-right position of the interfering surface 67*b*M of the light-blocking plate 67M is coincident with the left-right position of the slit 119M of the gate 108M. Accordingly, as the cartridge body 31 of the ink cartridge 30M is moved in the forward direction 51 along the corresponding guide groove 109, the interfering surface 67*b*M passes through the slit 119M without abutting against the opposing walls 118 of the gate 108M, and moves past the gate 108M to be positioned frontward of the gate 108M, as depicted in FIG. 16. The locking surface 151 is positioned still rearward of the lock shaft 145.

Figure 18:
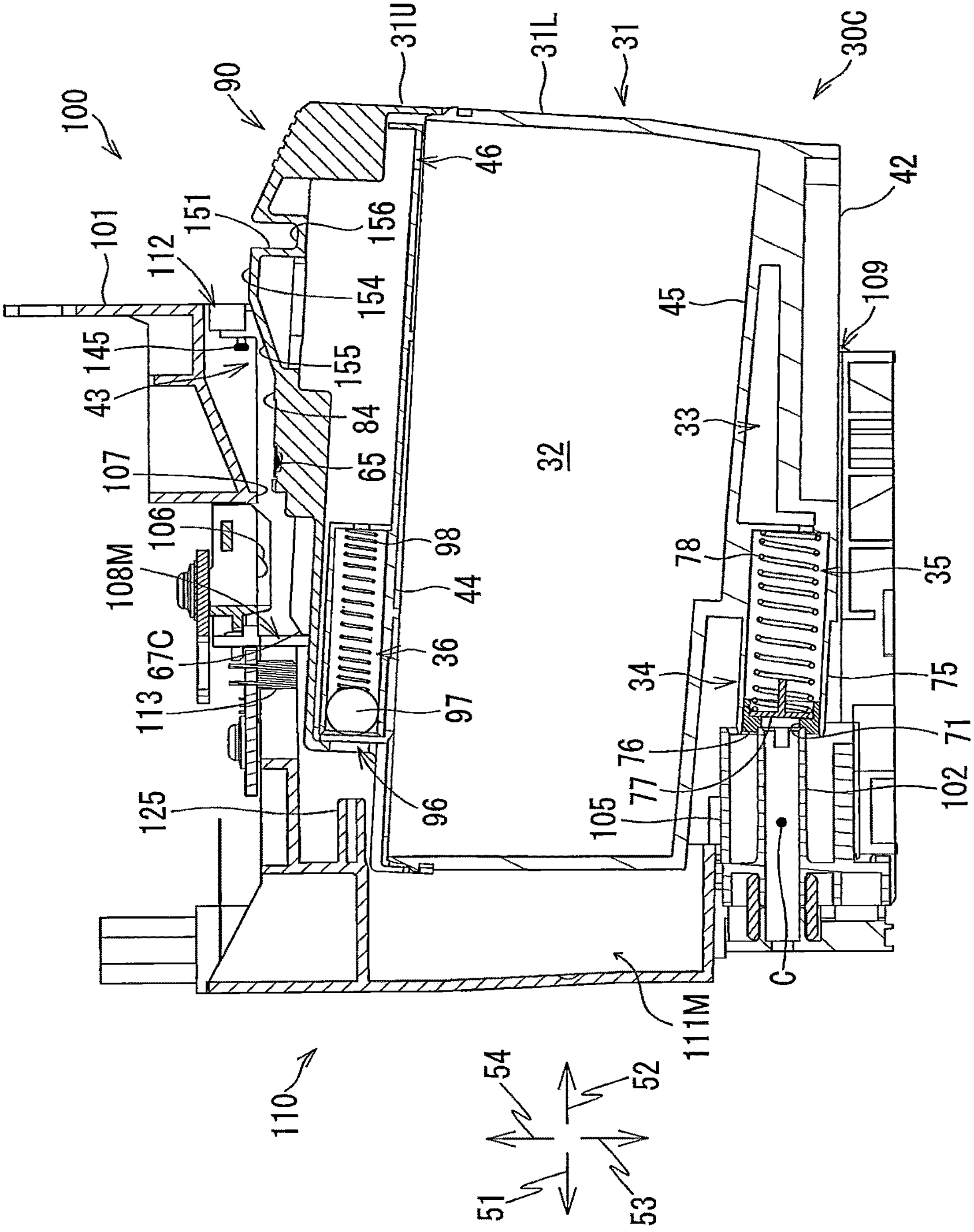
FIG. 18 is a vertical cross-sectional diagram illustrating a state where the ink cartridge (of cyan color) is inserted in the insertion space for the ink cartridge of magenta color and a light-blocking plate (interfering surface) of the ink cartridge (of cyan color) is in abutment with the gate for the ink cartridge of magenta color.

Here, as a comparative example, assume that the ink cartridge 30C is inserted into the insertion space 111M that does not correspond to the ink cartridge 30C. In this case, since the left-right position of the interfering surface 67*b*C does not coincide with the left-right position of the slit 119M, the interfering surface 67*b*C abuts against the opposing walls 118 of the gate 108M as the cartridge body 31 of the ink cartridge 30C is moved in the forward direction 51 along the guide groove 109, as illustrated in FIG. 18. The interfering surface 67*b*C of the ink cartridge 30C therefore cannot pass through the slit 119M. As a result, the ink cartridge 30C cannot be inserted further forward in the frontward direction 51 from the state depicted in FIG. 18. Accordingly, the ink needle 102 does not separate the valve 77 of the ink cartridge 30C from the packing 76. That is, the ink supply port 71 is not yet opened by the ink needle 102 and thus the ink supply portion 34 is not connected to the ink needle 102. Still alternatively, the ink needle 102 may be separated from the ink supply port 71 of the ink supply portion 34 in the front-rear direction when the interfering surface 67*b*C abuts against the opposing walls 118 of the gate 108M. In the present embodiment, "the ink supply portion 34 is connected to the ink needle 102" denotes a state where the ink needle 102 separates the valve 77 from the ink supply port 71 and the ink supply port 71 is opened. Thus, in FIG. 18, the ink supply portion 34 is not connected to the ink needle 102, since the ink needle 102 is in contact with the packing 76 but the valve 77 still closes the ink supply port 71.

In this way, the light-blocking plate 67 of the ink cartridge 30 can function as a physical key to see whether or not the ink cartridge 30 is inserted into a correct one of the insertion spaces 111 (designated insertion space 111) of the cartridge-attachment section 110.

As the ink cartridge 30M is inserted further in the frontward direction 51 after passing through the gate 108M, the ink needle 102 passes through the ink supply port 71 to separate the valve 77 from the packing 76 against the biasing force of the coil spring 78. As a result, the vertical position of the ink supply portion 34 is fixed relative to the cartridge-attachment section 110. In this state, the ink cartridge 30M as a whole is applied with the biasing force of the coil spring 78 of the ink supply portion 34 so that the ink cartridge 30M is urged rearward. The rod 125 having entered into the air communication port 96 abuts against the valve 97 to separate the valve 97 from the air communication port 96 against the biasing force of the coil spring 98. As a result, the first ink chamber 32 is opened to the atmosphere through the through-hole 46, the air valve chamber 36, and the air communication port 96.

Further, the first protrusion 43 reaches the lock shaft 145, and the inclined surface 155 is brought into contact with the lock shaft 145 and slidingly moves in the frontward direction 51 relative to the lock shaft 145.

The ink cartridge 30M is applied with biasing forces generated by the compressed coil springs 78 and 98 acting in the rearward direction 52. The magnitude of the biasing force generated by each of the coil springs 78 and 98 is determined by a spring constant thereof and a distance thereof compressed from its natural length. The spring constant of the coil spring 98 is smaller than the spring constant of the coil spring 78. The compressed distance of the coil spring 78 (a distance by which the valve 77 is separated from the ink supply port 71) is larger than the compressed distance of the coil spring 98 (a distance by which the valve 79 is separated from the air communication port 96). As a result, in a state where the ink cartridge 30M is accommodated in the cartridge-attachment section 110, the magnitude of the biasing force generated by the coil spring 78 is larger than the magnitude of the biasing force of the biasing force generated by the coil spring 98.

The ink cartridge 30M is also applied with a rotational moment acting in a counterclockwise direction in FIG. 16, since the user pushes the upper portion 41U of the rear surface 41. However, against this rotational moment, the contact between the inclined surface 155 and the lock shaft 145 causes the ink cartridge 30M to pivot in a clockwise direction in FIG. 17 about a center C of the ink supply port 71 of the packing 76 into which the ink needle 102 is inserted. That is, the center C of the ink supply port 71 serves as a pivot center of the ink cartridge 30 in the present embodiment.

Incidentally, the position of the pivot center of the ink cartridge 30 may vary depending on the shape of the ink needle 102 and the shape of the ink supply port 71. In the present embodiment, indeed, as shown in FIGS. 4 and 17, the pivot center is a center of a portion PP at which the ink needle 102 and the inner peripheral surface of the tubular ink supply port 71 are in contact with each other. In the present embodiment, the pivot center is the center of the portion PP at which the ink needle 102 contact the inner peripheral surface of the packing 76 defining the ink supply port 71. This portion PP at which the ink needle 102 and the ink supply port 71 (the inner peripheral surface of the packing 76) contact each other will be referred to as a particular portion PP hereinafter, whenever necessary. The ink cartridge 30 is thus inserted in the frontward direction 51 in a posture illustrated in FIGS. 16 and 17. The posture illustrated in FIGS. 16 and 17 is referred to as a second posture, hereinafter.

Since the lower surface 42 of the cartridge body 31 is inclined relative to the front-rear direction (horizontal direction), a space is available between the lower surface 42 and the bottom surface of the guide groove 109. This space allows the above-described pivotal movement of the ink cartridge 30M in the clockwise direction.

Further, since the inner diameter of the air communication port 96 is larger than the outer diameter of the rod 125, a space is also provided between the rod 125 and the air communication port 96. This space also allows the pivotal movement of the ink cartridge 30 in the clockwise direction. In other words, in the state where the ink cartridge 30 is attached to the cartridge-attachment section 110, the rod 125 and the air communication port 96 do not contact with each other. That is, vertical positioning is not performed between the rod 125 and the air communication port 96.

In the second posture, a space is also provided between the electrodes 65 of the IC board 64 and the corresponding set of contacts 106 in the up-down direction. That is, the electrodes 65 and the contacts 106 are separated from each other in the up-down direction. Further, in the second posture as a result of the clockwise pivoting of the ink cartridge 30M, the contact surface 84 is located below the corresponding positioning portion 107. A space is therefore formed between the positioning portion 107 and the contact surface 84 in the up-down direction. That is, the positioning portion 107 and the abutment part 84 are separated from each other in the up-down direction.

As the ink cartridge 30M is further inserted forward in the frontward direction 51 from the state illustrated in FIG. 16 against the biasing force of the coil spring 78, the inclined surface 155 and the horizontal surface 154 of the first protrusion 43 move frontward beyond the lock shaft 145, reaching a position closer to the end wall of the case 101 than the lock shaft 145 is to the end wall, as illustrated in FIG. 17. In the ink cartridge 30M in the second posture, the locking surface 151 is positioned lower relative to the lock shaft 145.

As described above, the ink cartridge 30M(30) is applied with the rotational moment acting in the counterclockwise direction in FIG. 17 due to the user's forward pushing on the upper portion 41U of the rear surface 41. Also, the rotational moment acting in the clockwise direction in FIG. 17 is also generated in the ink cartridge 30M(30) by the biasing force of the coil spring 98 disposed in the air valve chamber 36. In a state where the inclined surface 155 and the horizontal surface 154 no longer abut against the lock shaft 145, the ink cartridge 30M(30) is caused to pivot in the counterclockwise direction in FIG. 17 about the pivot center C due to the user's pushing force against the biasing force of the coil spring 98. The contact surface 84 is thereby brought into contact with the positioning portion 107 from below.

At this time, the locking surface 151 faces rearward and opposes the lock shaft 145 in the front-rear direction. When the user stops pushing the ink cartridge 30M(30) in the frontward direction 51, the ink cartridge 30M(30) is moved rearward by the biasing force of the coil spring 78. The locking surface 151 therefore moves rearward to abut against the lock shaft 145 from frontward thereof. This contact between the locking surface 151 and the lock shaft 145 restricts the ink cartridge 30 from moving further rearward in the rearward direction 52. That is, positioning of the ink cartridge 30M(30) in the front-rear direction relative to the cartridge-attachment section 110 is provided by the contact between the locking surface 151 and the lock shaft 145.

Further, since the contact surface 84 abuts the positioning portion 107 from below at this time, the ink cartridges 30M(30) is also restricted from moving upward. That is, the ink cartridge 30M(30) is prevented from pivoting further in the counterclockwise direction about the center C. This abutment between the contact surface 84 and the positioning portion 107 thus provides positioning of the ink cartridge 30M(30) in the up-down direction. As a result, the ink cartridge 30M(30) is fixed in position in the corresponding insertion space 111M(111) of the cartridge-attachment section 110, as illustrated in FIG. 4. The posture of the ink cartridge 30M(30) illustrated in FIG. 4 (the attached posture) will also be referred to as a first posture, hereinafter, whenever necessary, for the sake of explanation. Thus, attachment of the ink cartridge 30M(30) to the cartridge-attachment section 110 is completed. In other words, the ink cartridge 30 is pivotable about the center C of the ink supply port 71 to move between the first posture and the second posture.

In the embodiment, the "insertion of the ink cartridge 30" is deemed to be completed when the ink cartridge 30 is fixed in position relative to the cartridge-attachment section 110, with the locking surface 151 engaged with the lock shaft 145. That is, the "insertion of the ink cartridge 30" is not deemed to end simply because the ink needle 102 is inserted into the ink supply portion 34.

In the first posture (attached posture), following forces act on the ink cartridge 30.

That is, the ink cartridge 30 is applied with a force acting downward (i.e., in a direction moving from the first posture to the second posture) about the center C, due to: a self-weight of the ink cartridge 30; a biasing force that the IC board 64 receives from the contacts 106; and the rotational moment acting in the clockwise direction and generated by the coil spring 98 provided in the air valve chamber 36. On the other hand, the ink cartridge 30 is also applied with a force acting upward (i.e., in a direction moving from the second posture to the first posture) about the center C due to the rotational moment acting in the counterclockwise direction, the rotational moment being generated by the coil spring 78 in the ink valve chamber 35 acting on the locking surface 151. Since the contact surface 84 is in abutment with the positioning portion 107, the contact surface 84 is in receipt of a component of the upward force acting on the ink cartridge 30, thereby providing the positioning of the ink cartridge 30 in the up-down direction.

In the first posture, the lock shaft 145 is separated in the up-down direction from the surface 156 extending rearward from the lower edge 151L of the locking surface 151. That is, the lock shaft 145 does not contribute to any positioning of the ink cartridge 30 in the up-down direction. Thus, in the cartridge-attachment section 110, the up-down positioning of the ink cartridge 30 is performed, not by the lock shaft 145 provided separately from the case 101, but by the positioning portion 107 that is integrally formed with the case 101 and that is disposed closer to the set of contacts 106 than the lock shaft 145 is to the contacts 106.

Figure 5B:
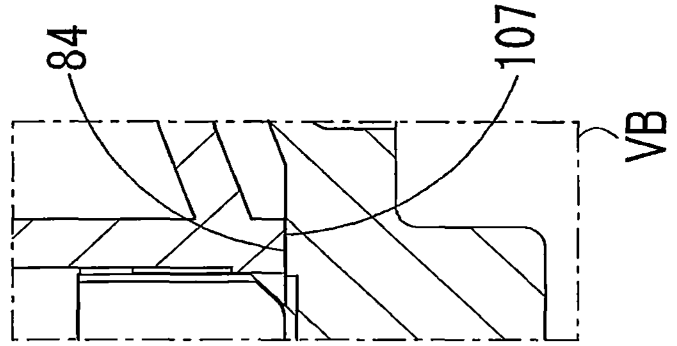
FIG. 5B is an enlarged cross-sectional view of an enclosed region VA illustrated in FIG. 4.
Figure 5A:
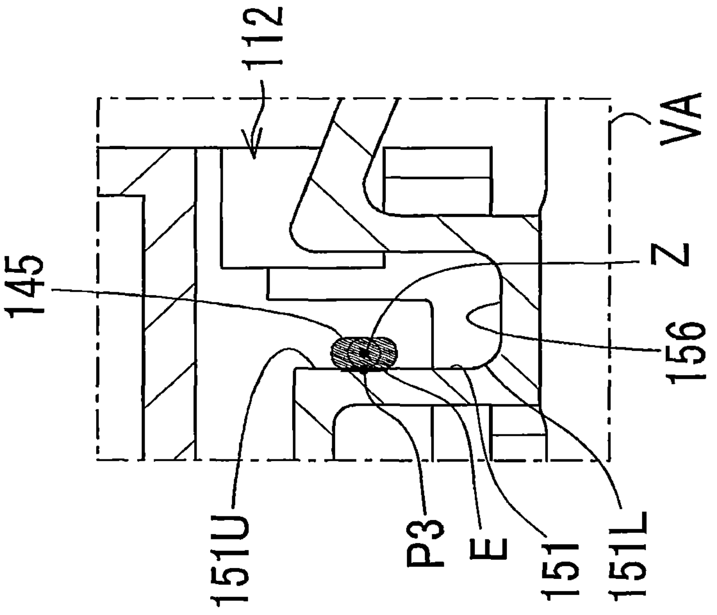
FIG. 5A is an enlarged cross-sectional view of an enclosed region VB illustrated in FIG. 4.

Referring to FIG. 4, assume an imaginary arc Q of a circle that is centered on the center C and that passes a center Z of the lock shaft 145 (see FIG. 5A). As illustrated in FIG. 4, in the ink cartridge 30M(30) in the first posture, the upper edge 151U of the locking surface 151 is positioned outside the imaginary arc Q, while the lower edge 151L of the locking surface 151 is positioned inside the imaginary arc Q. The ink cartridge 30M(30) in the first posture is fixed in position by the contact between the ink supply port 71 and the ink needle 102 and by the contact between the locking surface 151 and the lock shaft 145. In this state, the ink cartridge 30M(30) in the first posture is applied with the biasing force of the coil spring 78 acting in the rearward direction 52. As a result, a moment acting forward and upward is generated in the ink cartridge 30M(30). This moment corresponds to a magnitude of a force urging the ink cartridge 30M(30) to pivot in the counterclockwise direction about the center C.

In the ink cartridge 30M(30) in the first posture, the electrodes 65 of the IC board 64 electrically contact the corresponding contacts 106 while elastically deforming the contacts 106 upward. At this time, while the IC board 64 is urged downward by the elastically deformed contacts 106, due to the above-described moment acting on the ink cartridge 30M(30), the IC board 64 is kept elastically deforming the contacts 106.

Further, in the process of the counterclockwise pivoting of the ink cartridge 30M from the state illustrated in FIG. 17, the electrodes 65 of the IC board 64, which are positioned rearward of the center C and forward of the locking surface 151, are respectively brought into contact with the contacts 106 from below to be electrically connected thereto. That is, in the present embodiment, the direction in which the ink cartridge 30 moves during insertion and removal thereof (i.e., the front-rear direction) intersects with the direction in which the electrodes 65 of the IC board 64 and the contacts 106 contact and separate from each other (i.e., the up-down direction). Accordingly, the electrodes 65 of the IC board 64 are prevented from being moved in the front-rear direction relative to the contacts 106 while being in contact with the contacts 106, thereby suppressing generation of foreign matters such as shavings of the electrodes 65.

After attaching the ink cartridge 30 to the cartridge-attachment section 110, the user pivots the cover 114 from the opening position to the closing position. When the cover 114 is at the closing position, the cover sensor 115 outputs a detection signal indicative of detection of the cover 114. In response to receipt of the detection signal from the cover sensor 115, the controller 117 determines whether or not the cutout 66 is provided in the light-blocking plate 67 of the attached ink cartridge 30, depending on signals outputted from the optical sensor 113. The controller 117 then determines the type of the attached ink cartridge 30, such as an initial capacity of the ink cartridge 30 and a composition of the ink stored in the ink cartridge 30, based on the presence/absence of the cutout 66. The relationship between the presence/absence of the cutout 66 and the type of the ink cartridge 30 is prestored in the memory of the controller 117 as predetermined data.

Next, a process for removing the attached ink cartridge 30 from the cartridge-attachment section 110 will be described.

For removing the ink cartridge 30 from the cartridge-attachment section 110, the user first pivots the cover 114 from the closing position to the opening position and presses the operation surface 92 of the ink cartridge 30 downward. In the first posture of the ink cartridge 30, the operation surface 92 faces upward and rearward. Hence, when the user operates the operation surface 92, a force acting downward and forward is applied the ink cartridge 30. The locking surface 151 is separated from the lock shaft 145 by the force acting forward, and the ink cartridge 30 is pivoted in the clockwise direction in FIG. 4 by the downward force. As a result, as illustrated in FIG. 17, the contact surface 84 is separated from the positioning portion 107, and the electrodes 65 of the IC board 64 are separated from the respective contacts 106. The locking surface 151 is also positioned downward of the lock shaft 145. That is, the ink cartridge 30 is moved from the first posture to the second posture. When the IC board 64 and the locking surface 151 are separated from the contacts 106 and lock shaft 145, respectively, in accordance with the change of the ink cartridge 30 from the first posture to the second posture, the ink cartridge 30 is moved rearward relative to the cartridge-attachment section 110 due to the biasing force of the coil spring 78. The user can therefore hold the cartridge body 31 to remove the ink cartridge 30 out of the cartridge-attachment section 110. While the ink cartridge 30 is withdrawn from the cartridge-attachment section 110, the light-blocking plate 67 passes through the slit 119 of the corresponding gate 108, and moves rearward past the gate 108.

[Determination on the Type of Ink Cartridge 30 Attached to the Cartridge-Attachment Section 110]

Now, how to determine the type of the ink cartridge 30 attached to the cartridge-attachment section 110 will be described while referring to a flowchart of FIG. 19.

In the present embodiment, the controller 117 determines the type of the ink cartridges 30 mounted in the insertion space 111 based on output signals from the optical sensor 113. As described above, the output signals from the optical sensor 113 vary depending on whether or not the cutout 66 is formed in the light-blocking plate 67 in the mounted ink cartridge 30.

Figure 19:
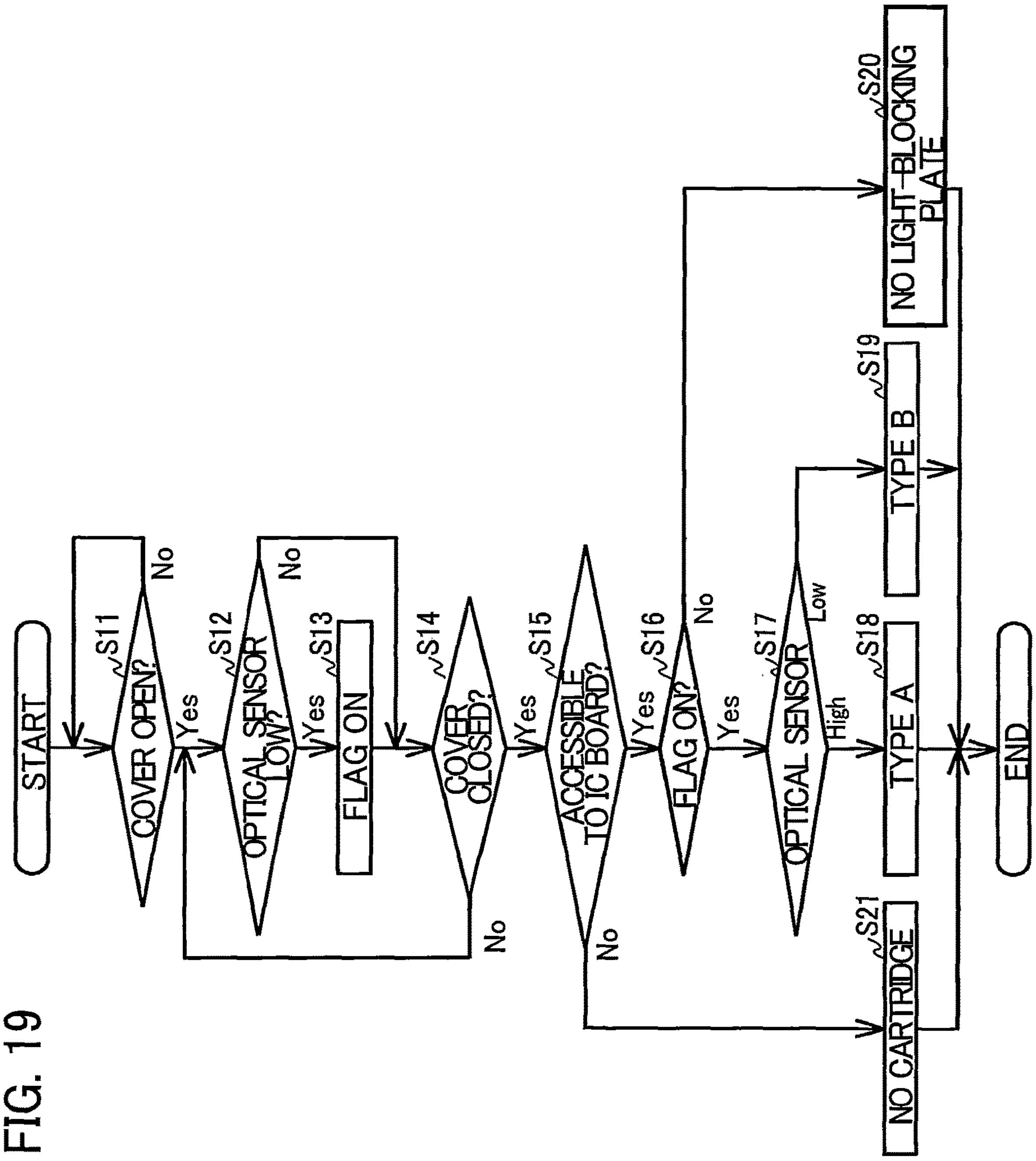
FIG. 19 is a flow chart illustrating steps of a process to determine types of the ink cartridges according to the embodiment attached to the cartridge-attachment section performed by a controller of the printer.

Specifically, referring to FIG. 19, the controller 117 first determines in S11 whether or not the cover 114 is at the opening position. The controller 117 repeats the step S11 (S11: NO) unless the controller 117 receives a high level signal from the cover sensor 115. The controller 117 determines that the cover 114 is at the opening position (S11: Yes) upon receipt of the high level signal from the cover sensor 115. The controller 117 then determines in S12 whether or not the high level signal from the optical sensor 113 is changed to a low level signal. The signal outputted from the optical sensor 113 becomes low level at least once when the detection surface D of the light-blocking plate 67 of the ink cartridge 30 comes between the light-emitting portion and the light-receiving portion of the optical sensor 113 during insertion of the ink cartridges 30 into the cartridge-attachment section 110.

That is, the change in signal from high level to low level at the optical sensor 113 means that the ink cartridge 30 is inserted into the designated insertion space 111 of the cartridge-attachment section 110. For example, if the ink cartridge 30M is inserted into the insertion space 111C other than the designated insertion space 111M, the optical sensor 113 of the insertion space 111C does not output the low level signal since the optical sensor 113 of the insertion space 111C cannot detect the detection surface D of the light-blocking plate 67M of the ink cartridge 30M that cannot passes through the slit 109C of the gate 108C, as illustrated in FIG. 18.

When the signal from the optical sensor 113 changes to low level (S12: YES), the controller 117 then sets a flag stored in the memory ON in S13. That is, the ON flag means that the ink cartridge 30 having the light-blocking plate 67 (detection surface D) has been inserted into the designated insertion space 111 of the cartridge-attachment section 110.

In case that the signal from the optical sensor 113 does not change to low level but is maintained at high level (S12: NO), the controller 117 then advances to the step S14. The optical sensor 113 continues to issue the high level signal unless the detection surface D of the light-blocking plate 67 passes the optical sensor 113, that is, in case that the ink cartridge 30 is not inserted into the designated insertion space 111 of the cartridge-attachment section 110. Note that, here, even if the ink cartridge 30 without the light-blocking plate 67 (detection surface D) is inserted into the designated insertion space 111, the optical sensor 113 continues to output the high level signal (S12: NO) since the light from the optical sensor 113 is not interrupted. The controller 117 therefore advances to the step S14.

The controller 117 then determines in S14 whether or not the cover 114 is closed. Specifically, when the signal outputted from the cover sensor 115 changes to low level, the controller 117 determines that the cover 114 is at the closing position (S14: YES) and advances to the step S15. The controller 117 goes back to the step S12 as long as the signal from the cover sensor 115 remains at high level and does not change to low level (S14: NO).

After the cover 114 is determined to be at the closing position in S14, the controller 117 determines in S15 whether or not accessing to the IC board 64 through the contacts 106 can be made. In case that the controller 117 cannot access the IC board 64 (S15: NO), the controller 117 determines in S21 that the ink cartridge 30 is not attached to the cartridge-attachment section 110. In this case, the controller 117 may give a warning to the user to inform him that the ink cartridge 30 is not attached to the cartridge-attachment section 110, for example, through a message such as "No Cartridge" on a display.

In case that the controller 117 can access the IC board 64 (S15: YES), the controller 117 determines in S16 whether or not the flag stored in the memory is ON. When the flag is not ON (S16: NO), the controller 117 determines in S20 that the ink cartridge 30 without the light-blocking plate 67 is attached. In this case, the controller 117 may give a warning to the user to inform him that the inserted ink cartridge cannot be detected, for example, through a message such as "Unable to Detect Cartridge" on the display. The ink cartridge 30 may lose the light-blocking plate 67, for example, due to some kind of damages impinged on the light-blocking plate 67.

When the flag is ON (S16: YES), the controller 117 then determines in S17 whether the signal outputted from the optical sensor 113 is high level or low level. In case that the signal from the optical sensor 113 is a high level signal (S17: High), the controller 117 determines in S18 that the attached ink cartridge 30 belongs to a type A. That is, the ink cartridge 30 having the light-blocking plate 67 formed with the cutout 66 as shown in FIGS. 6 to 8, for example, belongs to the type A. The optical sensor 113 is configured to output the high level signal in case that the cutout 66 is formed in the light-blocking plate 67 of the attached ink cartridge 30. The cartridge 30 of the type A may be a high-capacity cartridge whose initial capacity of ink is large, for example. In case that the controller 117 determines that the attached ink cartridge 30 belongs to the type A, the controller 117 may set an initial number of sheets that the printer 10 can print with the initial amount of ink stored in the ink cartridge 30 of the type A. Alternatively, the controller 117 may set a threshold value corresponding to the initial amount of ink stored in the ink cartridge 30 of the type A. The controller 117 may halt printing operations if the printer 10 has used an amount of ink larger than the threshold value, or may give a warning to the user to inform him that little ink is left in the attached ink cartridge 30.

In case that the signal outputted from the optical sensor 113 is a low level signal (S17: Low), the controller 117 determines in S19 that the attached ink cartridge 30 belongs to a type B. That is, the ink cartridge 30 having the light-blocking plate 67 without the cutout 66 as shown in FIG. 18, for example, belongs to the type B. The optical sensor 113 is configured to output the low level signal in case that the cutout 66 is not formed in the light-blocking plate 67 of the attached ink cartridge 30. The cartridge 30 of the type B may be a low-capacity cartridge whose initial capacity of ink is not large, or smaller than the initial capacity of ink of the ink cartridge 30 of the type A. In case that the controller 117 determines that the attached ink cartridge 30 belongs to the type B, the controller 117 may set an initial number of sheets that the printer 10 can print with the initial amount of ink stored in the ink cartridge 30 of the type B. Alternatively, the controller 117 may set a threshold value corresponding to the initial amount of ink stored in the ink cartridge 30 of the type B. The controller 117 may halt printing operations if the printer 10 has used an amount of ink larger than the threshold value, or may give a warning to the user to inform him that little ink is left in the attached ink cartridge 30.

[Operational and Technical Advantages of the Embodiment]

As a result of the pivoting of the ink cartridge 30 from the second posture to the first posture, the ink cartridge 30 is fixed in position in the insertion space 111 relative to the cartridge-attachment section 110. Specifically, in the first posture, the locking surface 151 is in contact with the lock shaft 145 from frontward thereof, thereby providing positioning of the ink cartridge 30 in the front-rear direction; and the contact surface 84 is in contact with the positioning portion 107 from below, thereby proving positioning of the ink cartridge 30 in the up-down direction. This structure can prevent application of excessive load to the lock shaft 145 and the positioning portion 107. Hence, deformation of the lock shaft 145 and the positioning portion 107 is less likely to occur, thereby realizing stable positioning of the ink cartridge 30 in the insertion space 111 relative to the cartridge-attachment section 110.

The engaging region E of the locking surface 151 is positioned upward relative to the IC board 64 in the first posture.

The IC board 64 is positioned rearward relative to the rear edge 75R of the ink supply portion 34 in the frontward direction 51 in in the first posture. With this structure, an upward rotational moment can be applied to the IC board 64 no matter what portion of the ink supply portion 34 can be the pivot center of the pivoting of the printing-fluid cartridge, i.e., regardless of where the particular portion PP would be in the ink supply portion 34.

Further, the contact surface 84, which is positioned closer to the IC board 64 than the locking surface 151 is to the IC board 64, provides the positioning of the ink cartridge 30 in the up-down direction. This structure can realize enhanced accuracy in positioning of the electrodes 65 of the IC board 64 relative to the contacts 106.

Further, the IC board 64 and the contact surface 84 are positioned to be aligned with each other in the front-rear direction. Accordingly, positioning between the electrodes 65 of the IC board 64 and the contacts 106 can be realized stably and reliably.

During the insertion of the ink cartridge 30 into the cartridge-attachment section 110, the inclined surface 155 of the first protrusion 43 contacts the lock shaft 145, thereby moving the ink cartridge 30 downward. With this structure, the IC board 64 is less likely to interfere with the positioning portion 107 during the insertion of the ink cartridge 30 into the cartridge-attachment section 110.

Further, the upper edge of the inclined surface 155 (point P1) is positioned uppermost between the IC board 64 and the inclined surface 155 in the front-rear direction. In other words, in a region between the IC board 64 and the inclined surface 155, the upper edge (point P1) of the inclined surface 155 constitutes the uppermost edge of the ink cartridge 30 in the first posture. That is, this structure can suppress those parts arranged on the upper wall 39 from interfering with the positioning portion 107 during the insertion of the ink cartridge 30 into the cartridge-attachment section 110.

The contact surface 84 is positioned upward relative to the electrodes 65 of the IC board 64, and downward relative to the upper edge (point P1) of the inclined surface 155. Accordingly, this structure can also suppress interference between the contact surface 84 and the lock shaft 145 during the insertion of the ink cartridge 30 into the cartridge-attachment section 110.

Further, the IC board 64 is disposed rearward relative to the ink supply port 71 in the front-rear direction. While the vertical position of the electrodes 65 of the IC board 64 may vary in accordance with the pivotal movement of the ink cartridge 30 about the center C (specifically, about the portion PP), accurate positioning of the electrodes 65 of the IC board 64 in the up-down direction can be realized by the abutment of the contact surface 84 against the positioning portion 107. This structure can enhance degree of freedom in arrangement of the IC board 64 on the upper surface 39.

Further, in the structure of the embodiment, the IC board 64 is positioned rearward of the center C (ink supply port 71) but frontward of the locking surface 151. The electrodes 65 of the IC board 64 are brought into contact with the contacts 106 in the up-down direction that intersects with the front-rear direction in which the ink cartridge 30 moves during insertion and removal thereof relative to the cartridge-attachment section 110. This structure can prevent the electrodes 65 of the IC board 64 from moving in the front-rear direction relative to the contacts 106 while being in contact with the contacts 106, thereby preventing generation of foreign matters at the electrodes 65, such as shavings of the electrodes 65.

Further, the coil spring 78 of the ink valve chamber 35 urges the ink cartridge 30 in the attached state (in the first posture) in the rearward direction 52. The locking surface 151 is configured to receive this rearward urging force from the coil spring 78, thereby stably holding the ink cartridge 30 in the attached state.

In a state where the ink cartridge 30 is attached to the cartridge-attachment section 110 (in the first posture), the ink cartridge 30 is also applied with the force acting in the rearward direction 52 by the urging force of the coil spring 98 in the air valve chamber 36, in addition to the rearward force by the urging force of the coil spring 78 of the ink valve chamber 35. The coil spring 98 is arranged upward relative to the center of the dimension (height) of the ink cartridge 30 in the up-down direction, and has a smaller urging force than the urging force of the coil spring 98. Accordingly, in the attached state (first posture) of the ink cartridge 30, the counterclockwise rotational moment about the center C (particular portion PP) generated by the coil spring 78 is larger than the clockwise rotational moment generated by the coil spring 98. Accordingly, the ink cartridge 30 can be maintained in the first posture (in the attached state) in the insertion space 111 relative to the cartridge-attachment section 110. Further, the space available between the coil spring 78 and the coil spring 98 in the up-down direction can be utilized as the first ink chamber 32.

Further, the cartridge-attachment section 110 includes the contacts 106 and the positioning portion 107. That is, the member supporting the contacts 106 (cartridge-attachment section 110) also includes the positioning portion 107. Since the ink cartridge 30 is directly inserted into and fixed in position relative to the cartridge-attachment section 110 in the first posture, the positioning of the ink cartridge 30 relative to the contacts 106 can be realized with high accuracy.

[Variations and Modifications]

In the following, various modifications to the depicted embodiment will be described. Like parts and components will be designated with the same reference numerals as those of the depicted embodiment to avoid duplicating explanation.

1. First Modification

Figure 20:
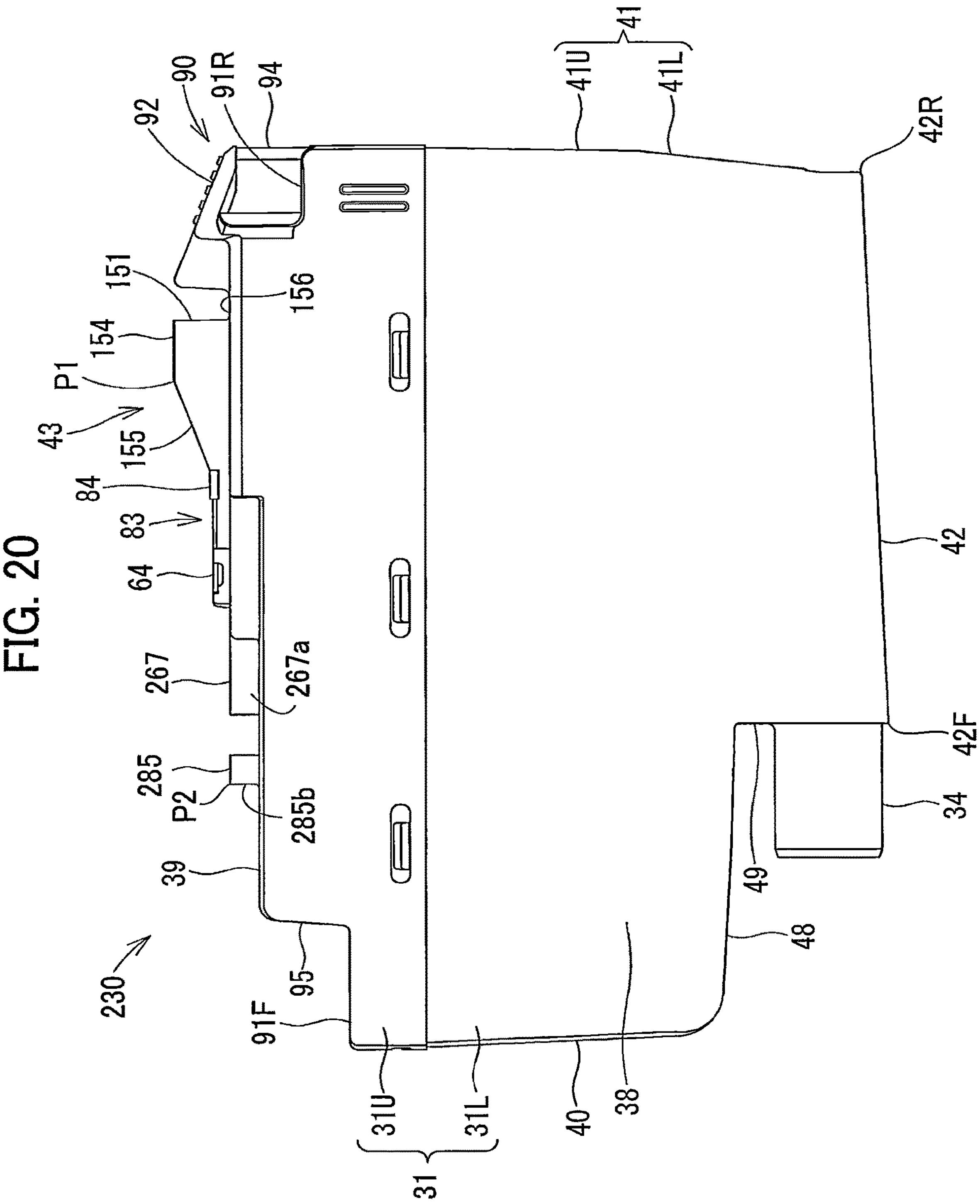
FIG. 20 is a left side view of an ink cartridge according to a first modification to the embodiment.

In the above-described embodiment, the interfering surface 67*b* constitutes the front surface of the light-blocking plate 67. However, the interfering surface 67*b* and the light-blocking plate 67 need not necessarily be formed integrally. For example, as illustrated in FIG. 20, an ink cartridge 230 may include a protrusion 285 having an interfering surface 285*b*, and a light-blocking plate 267 having a light-blocking surface 267*a* as the detection surface D. That is, the protrusion 285 (interfering surface 285*b*) and light-blocking plate 267 (light-blocking surface 267*a*) are provided independently of each other. As in the embodiment, the interfering surface 285*b* is arranged to be aligned with the light-blocking plate 267 in the front-rear direction. The protrusion 285 is positioned frontward of the light-blocking plate 267 in the front-rear direction. The light-blocking plate 267 is configured to block the light from the corresponding optical sensor 113 during insertion of the ink cartridge 230 and in the attached posture of the ink cartridge 230. The light-blocking plate 267 shown in FIG. 20 is not formed with a cutout.

Incidentally, in this configuration of the first modification, the protrusion 285 may be configured not to block light. That is, in case that the protrusion 285 and the light-blocking plate 267 are provided as separate members from each other, the protrusion 285 may or may not be made of a material capable of transmitting light therethrough (translucent resin, for example).

With this structure, by separating the interfering surface 285*b* from the light-blocking plate 267, impact, which will be impinged on the interfering surface 285*b* at the time of wrong insertion of the ink cartridge 230, is prevented from being directly transmitted to the light-blocking plate 267. Further, in case that the protrusion 285 is capable of transmitting light, the protrusion 285 does not disturb detection of the light-blocking plate 267 by the corresponding optical sensor 113 during insertion of the ink cartridge 230 into the corresponding insertion space 111 of the cartridge-attachment section 110.

2. Second Modification

Figure 21:
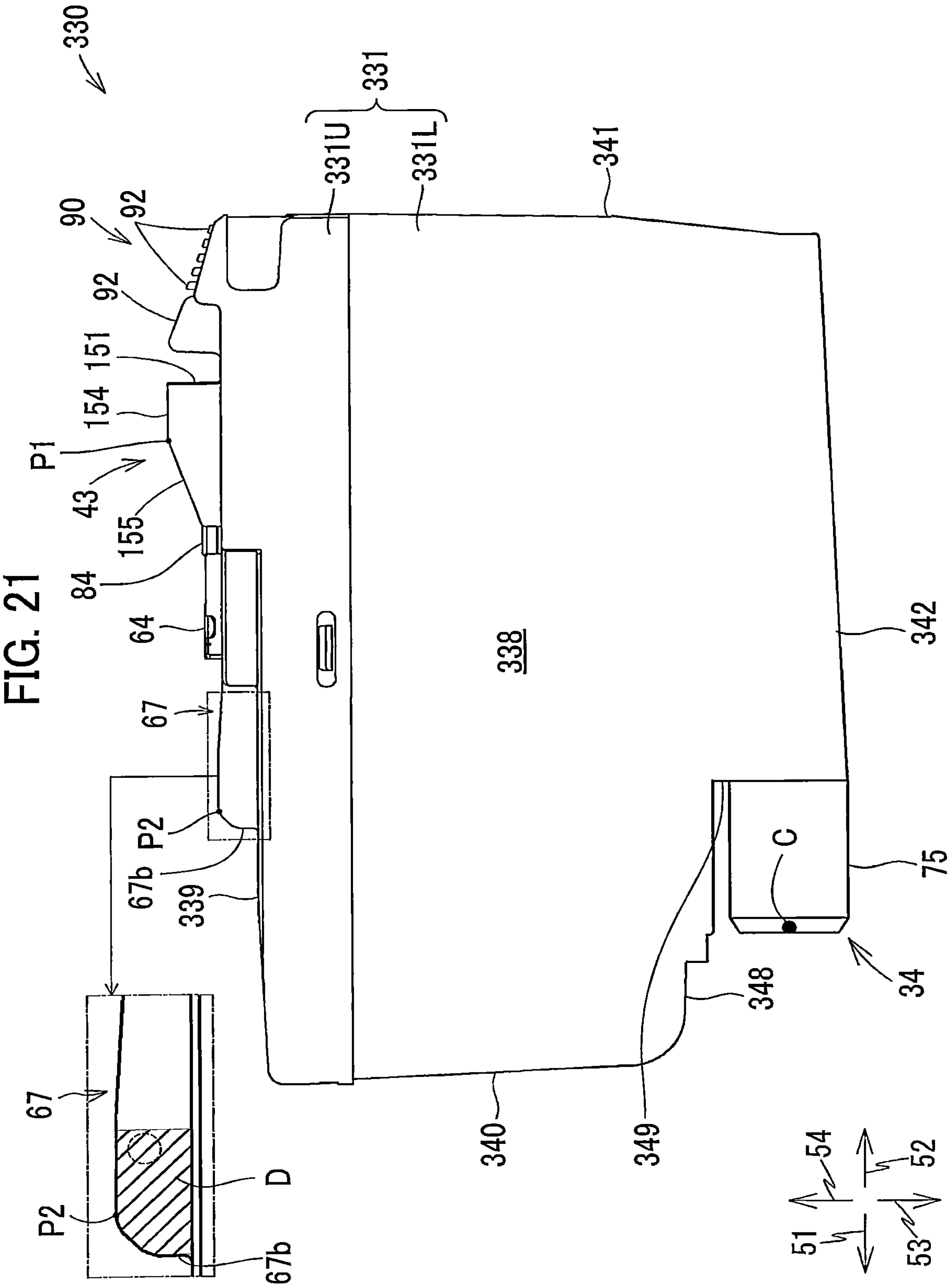
FIG. 21 is a left side view of an ink cartridge according to a second modification to the embodiment.
Figure 22:
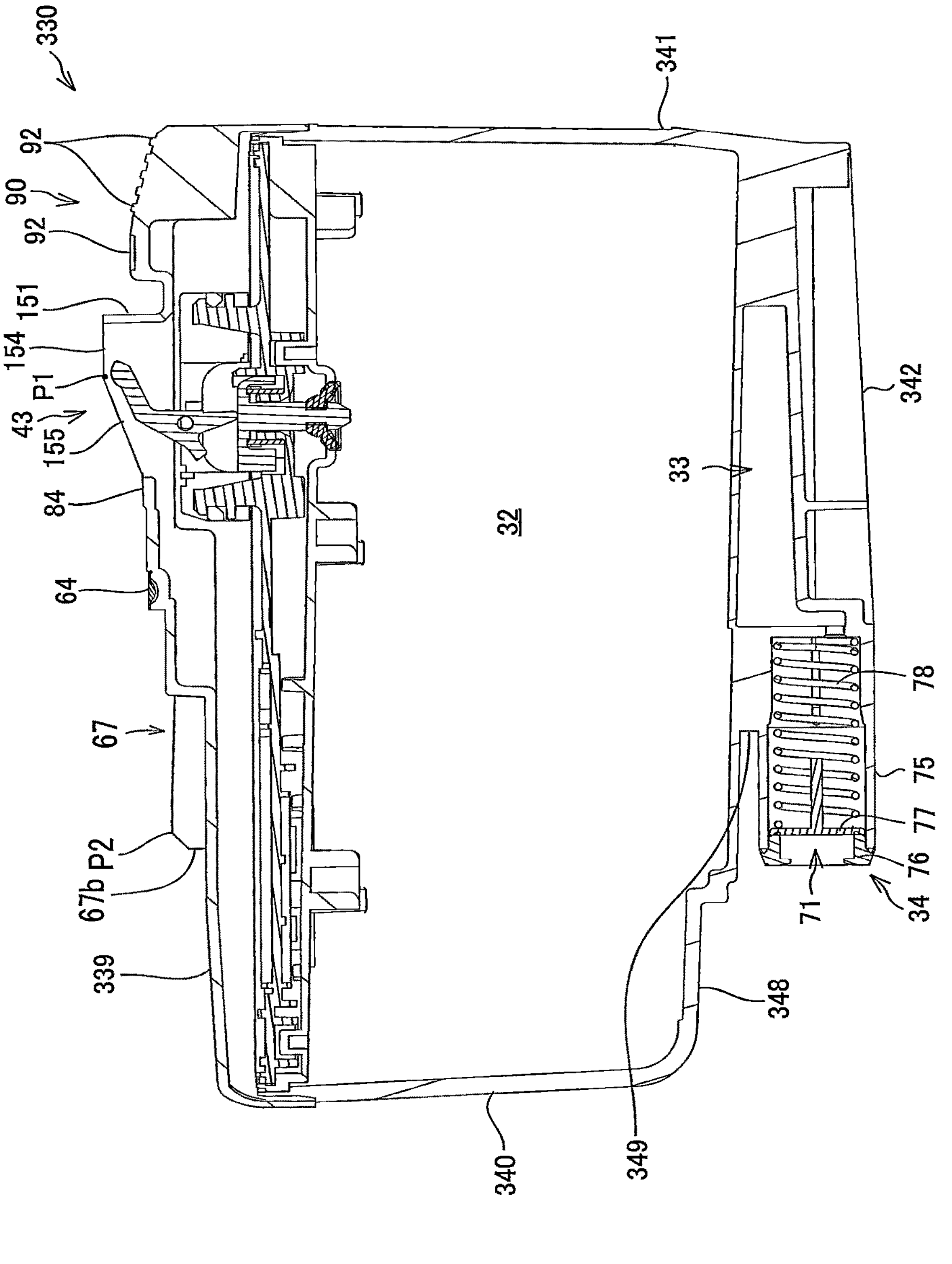
FIG. 22 is a vertical cross-sectional view of the ink cartridge according to the second modification to the embodiment.

Further, FIGS. 21 and 22 depict an ink cartridge 330 according to a second modification to the embodiment.

The ink cartridge 330 includes a cartridge body 331 configured of an upper cover 331U and a lower case 331L. The cartridge body 331 includes a front surface 340, a rear surface 341, an upper surface 339, a bottom surface 342, side surfaces 337 and 338, a sub-lower wall 348, and a connecting wall 349 corresponding to the front surface 40, the rear surface 41, the upper surface 39, the bottom surface 42, the side surfaces 37 and 38, the sub-lower wall 48, and the connecting wall 49 of the ink cartridge 30 of the embodiment, respectively. In FIG. 21, the side wall 337 is not shown. The ink supply portion 34 is provided at the connecting wall 349, as in the embodiment.

In a side view, as shown in FIG. 21, the ink cartridge 330 has the same configuration on the upper surface 339 as that on the upper surface 39 of the ink cartridge 30 of the embodiment. Note that the ink cartridge 330 shown in FIG. 21 includes the light-blocking plate 67 without the cutout 66. That is, a portion of the light-blocking plate 67 corresponding to the cutout 66 (a portion indicated by a circle in a broken line in FIG. 21) now serves as the detection surface D. That is, the light from the optical sensor 113 is configured be incident on the circled portion on the detection surface D.

In the depicted embodiment, the coil spring 98 is disposed in the air valve chamber 36 to move the valve 97 to open and close the air communication port 96. Accordingly, while the ink cartridge 30 is inserted into and attached to the cartridge-attachment section 110, the ink cartridge 30 receives the urging force acting in the clockwise direction (by the coil spring 98) as well as the urging force acting in the counterclockwise direction (by the coil spring 78 of the ink supply portion 34).

In contrast, referring to FIG. 22, the ink cartridge 330 according to the second modification does not include the valve 97 and the coil spring 98. That is, the ink cartridge 330 is configured to receive the urging force of the coil spring 78 of the ink supply portion 34 as an urging force acting in the rearward direction 52 during insertion and attachment of the ink cartridge 330 relative to the cartridge-attachment section 110.

More specifically, once the ink needle 102 is inserted into the ink supply port 71 and connected to the ink supply portion 34, since no downward rotational moment is applied to the ink cartridge 330, the ink cartridge 330 is applied with the upward rotational moment about the center C (portion PP) by the urging force of the coil spring 78 acting in the counterclockwise direction, in addition to the user's forward pushing of an upper portion of the rear surface 341. The ink cartridge 330 is therefore pivoted counterclockwise from the second posture to the first posture. As a result, as in the depicted embodiment, the electrodes 65 of the IC board 64 are brought into contact with the contacts 106 from below to be electrically connected thereto; and the contact surface 84 is brought into contact with the positioning portion 107 from below. As the user releases his fingers from the ink cartridge 330, the ink cartridge 330 is moved in the rearward direction 52 due to the urging force of the coil spring 78, causing the locking surface 151 to abut against the lock shaft 145 from its front side. The ink cartridge 330 is thus fixed in position in the front-rear direction. That is, the locking surface 151 receives the rearward moment applied from the coil spring 78, thereby maintaining the ink cartridge 330 in the attached state (in the first posture or upright posture).

In the ink cartridge 330 of the second modification as well, the light-blocking plate 67 and the IC board 64 are arranged on the upper surface 39 constituting the cartridge body 31 such that the interfering surface 67*b* of the light-blocking plate 67 is disposed frontward and downward relative to the electrodes 65 of the IC board 64. With this structure, the gate 108 corresponding to the interfering surface 67*b* is less likely to contact the electrodes 65 of the IC board 64 during the insertion of the ink cartridge 330 into the corresponding insertion space 111 of the cartridge-attachment section 110.

Further, as in the ink cartridge 30 of the depicted embodiment, positioning of the ink cartridge 330 relative to the cartridge-attachment section 110 is provided: by the abutment of the locking surface 151 against the lock shaft 145 in the front-rear direction; and by the contact of the contact surface 84 with the positioning portion 107 in the up-down direction. With this simple structure of the second embodiment as well, stable positioning of the ink cartridge 330 relative to the cartridge-attachment section 110 can be realized.

Still further, as in the ink cartridge 30 of the depicted embodiment, in the attached state of the ink cartridge 330, the rearward urging force of the coil spring 78 is stably received by the locking surface 151 that is in contact with the lock shaft 145, thereby preventing the ink cartridge 330 from moving further in the rearward direction 52 and providing positioning of the ink cartridge 330 in the front-rear direction relative to the cartridge-attachment section 110. Accordingly, the contact pressure between the electrodes 65 of the IC board 64 and the contacts 106 can be stably maintained.

Further, with this structure of the second modification, the same technical and operational advantages as those of the embodiment can be obtained.

3. Third Modification

In the depicted embodiment, the cartridge body 31 is configured of two different members, i.e., the upper cover 31U and the lower case 31L attached to each other. However, the cartridge body 31 may be formed as a single member, without including an upper cover and a lower case.

Figure 23A:
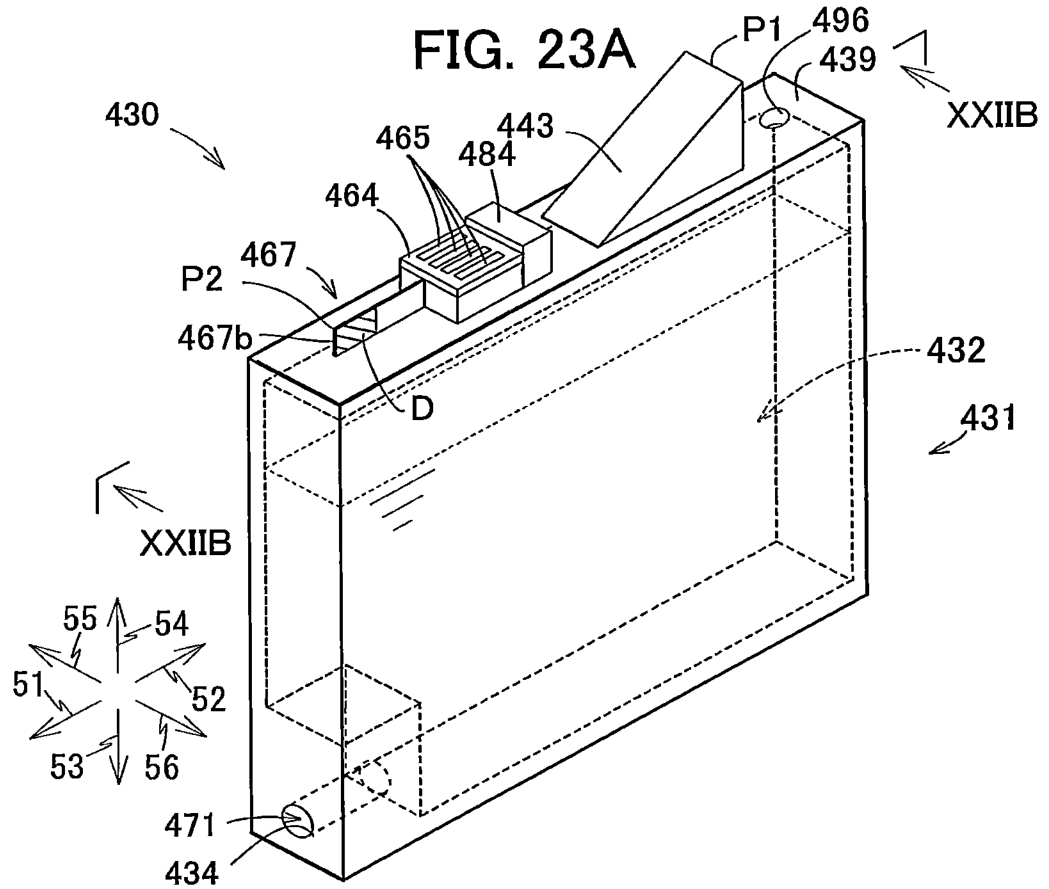
FIG. 23A is a perspective view of an ink cartridge according to a third modification to the embodiment.
Figure 23B:
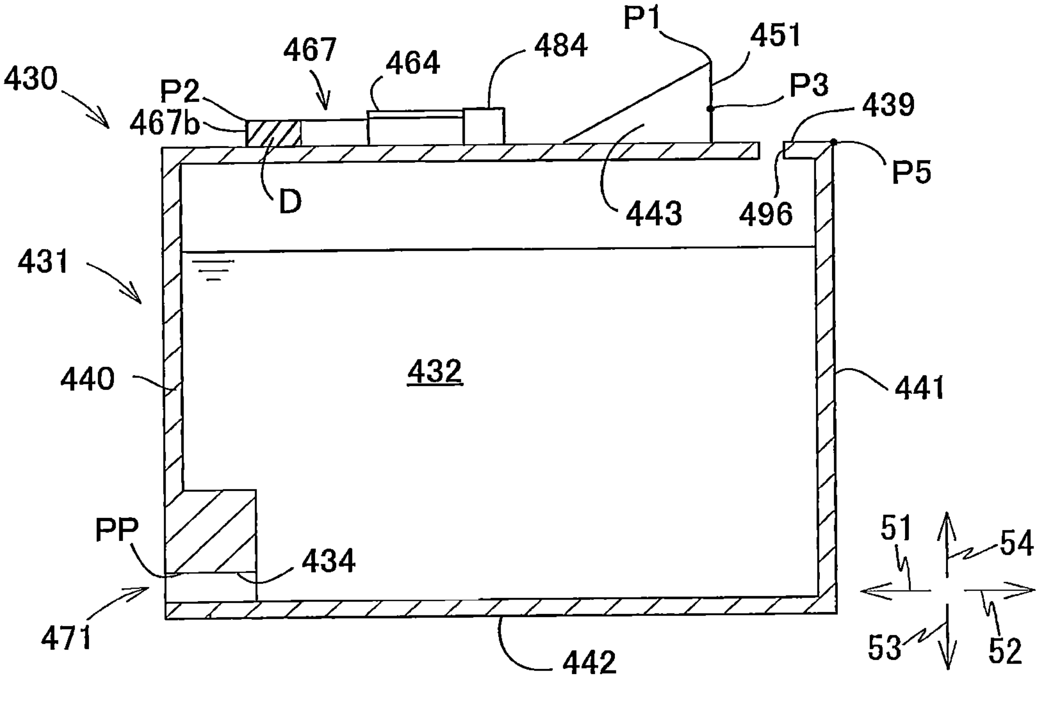
FIG. 23B is a vertical cross-sectional view of the ink cartridge according to the third modification to the embodiment taken along a plane XXIIB-XXIIB shown in FIG. 23A.

FIGS. 23A and 23B illustrate an ink cartridge 43 according to a third modification to the embodiment. The ink cartridge 430 includes a cartridge body 431 of a rectangular parallelepiped shape. The cartridge body 431 includes a front wall 440, a rear wall 441, an upper wall 439, a bottom wall 442 and side walls 437 and 438. Each of these walls 440, 441, 439, 442, 437 and 438 constitute an outer shell of the ink cartridge 430. In other words, the cartridge body 431 is not configured of a cover and a case. Thus, an upper surface of the upper wall 439 constitutes an upper surface of the cartridge body 431. A front surface of the front wall 440 constitutes a front surface of the cartridge body 431. The front surface of the front wall 440 (front surface of the cartridge body 431) is a flat surface, unlike the front surface (40, 49, 95) of the ink cartridge 30 of the embodiment. A rear surface of the rear wall 441 constitutes a rear surface of the cartridge body 431. The rear surface of the rear wall 441 (rear surface of the cartridge body 431) is a flat surface, although the rear surface 41 of the ink cartridge 30 of the embodiment is configured of two portions (upper portion 41U and lower portion 41L).

An ink chamber 432 is defined inside the cartridge body 431. More specifically, the ink chamber 432 is defined by inner surfaces of the front wall 440, the rear wall 441, the upper wall 439, the bottom wall 442 and the side walls 437 and 438. An upper end region in the ink chamber 432 (a region above an ink surface of ink stored in the ink chamber 432) is in communication with ambient air through an air communication port 496 formed in the upper wall 439. Note that, the air communication port 496 may not necessarily be formed in the upper wall 439, but may be formed in one of other walls constituting the cartridge body 431. For example, the air communication port 496 may be formed in one of the side walls 437 and 438.

An ink supply portion 434 is provided at the front wall 440. In this modification, the ink supply portion 434 is a through-hole formed in a lower end portion of the front wall 440 to penetrate therethrough in the front-rear direction. The ink supply portion 434 defines an ink supply port 471 that is open frontward on the front surface of the front wall 440.

On the upper surface 439, a light-blocking plate 467, an IC board 464, a contact surface 484 and a first protrusion 443 having a locking surface 451 are arranged in the front-rear direction, as in the depicted embodiment. Specifically, the light-blocking plate 467, the IC board 464, the contact surface 484, and the locking surface 451 are aligned with one another in the front-rear direction in this order from the front toward the rear. The light-blocking plate 467 is positioned frontward and downward relative to the IC board 64. The front surface of the light-blocking plate 467 serves as an interfering surface 467*b*. The light-blocking plate 467 has side surfaces including the detection surface D. The light-blocking plate 467 shown in FIGS. 23A and 23B is not formed with a cutout (i.e., the ink cartridge 430 shown in FIGS. 23A and 23B belongs to the type B). The contact surface 484 is arranged between the IC board 464 and the locking surface 451 in the front-rear direction. The contact surface 484 is positioned upward relative to the IC board 464 but downward relative to an upper edge (denoted as the point P1) of the locking surface 451. The upper edge (the point P1) of the locking surface 451 is the highest (farthest away from the upper surface 439) among all parts disposed at the upper surface 439 between the light-blocking plate 467 and the locking surface 451 in the front-rear direction. That is, the upper edge (the point P1) of the locking surface 451 constitutes an uppermost edge of the ink cartridge 430 between the light-blocking plate 467 and the locking surface 451. The locking surface 451 is positioned closer to the rear wall 441 than to the IC board 464 in the front-rear direction.

With this structure, since the detection surface D (light-blocking surface) of the light-blocking plate 467 is positioned frontward and downward relative to the contact surface 484, the positioning portion 107 of the printer 10, which is configured to contact the contact surface 484, is less likely to interfere with the light-blocking plate 467 (i.e., the interfering surface 467*b* and the detection surface D) during insertion of the ink cartridge 430 into the cartridge-attachment section 110. Further, the lock shaft 145 of the cartridge-attachment section 110, which is configured to engage the locking surface 451, is less likely to interfere with the contact surface 484, the detection surface D (interfering surface 467*b*), and the IC board 64 during the insertion of the ink cartridge 30 into the cartridge-attachment section 110.

With this structure of the third modification, the same technical and operational advantages as those of the embodiment can be obtained.

4. Fourth Modification

Figure 24A:
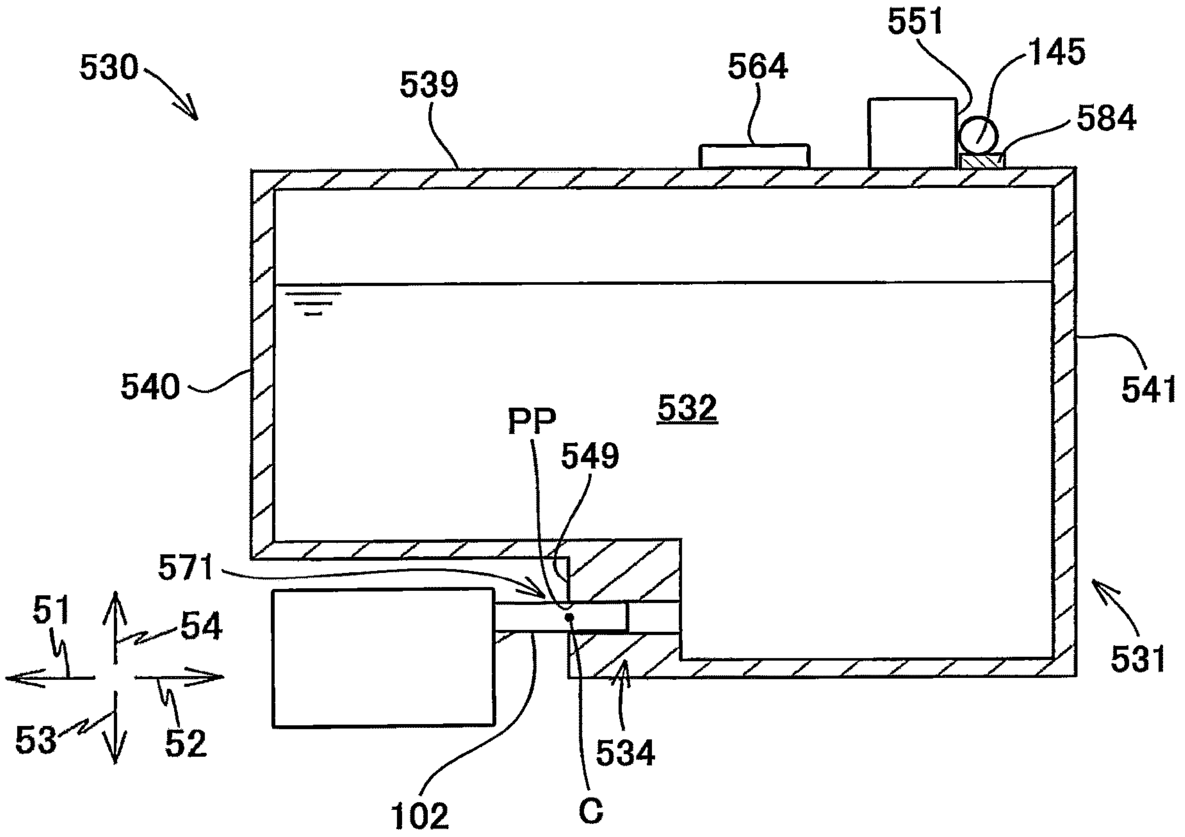
FIG. 24A is a vertical cross-sectional view of an ink cartridge according to a fourth modification to the embodiment.
Figure 24B:
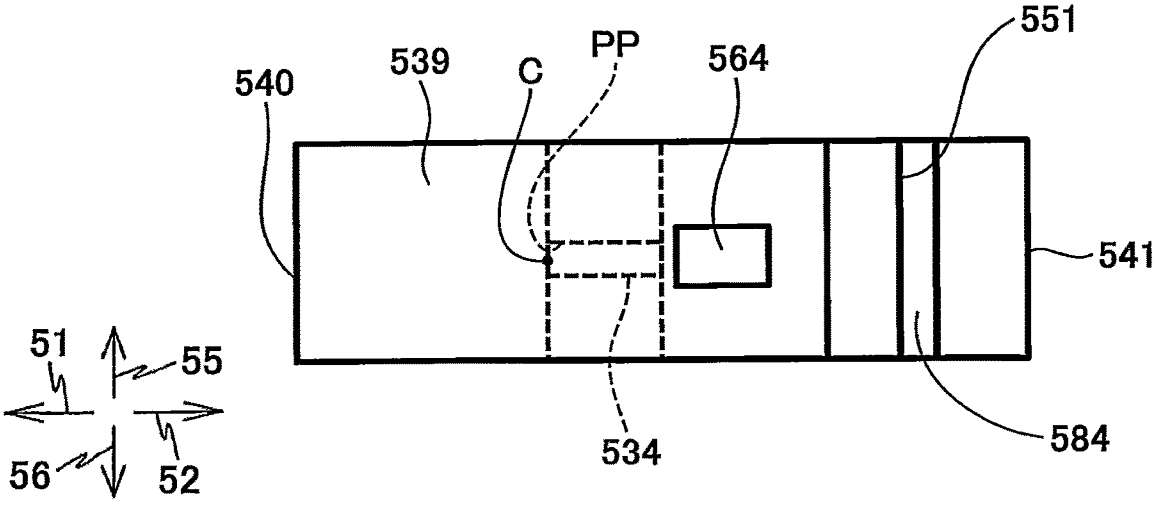
FIG. 24B is a top view of the ink cartridge according to the fourth modification to the embodiment.

FIGS. 24A and 24B illustrate an ink cartridge 530 according to a fourth modification to the embodiment.

The ink cartridge 530 includes a cartridge body 531 in which an ink chamber 532 is defined. The cartridge body 531 includes a front wall 540 and a connecting wall 549 constituting a front surface of the ink cartridge 530. That is, the ink cartridge 530 has a stepped front surface as in the embodiment. Further, contrary to the ink supply portion 34 of the embodiment, an ink supply portion 534 of this modification does not protrude frontward from the front surface of the ink cartridge 530. Rather, the ink supply portion 534 is a through-hole formed in the connecting wall 549 to penetrate therethrough in the front-rear direction. Thus, the ink supply portion 534 has an ink supply port 571 that is open on the front surface of the connecting wall 549. The ink supply port 571 faces frontward in the first posture (upright posture). The ink needle 102 of the cartridge-attachment section 110 is configured to be inserted into the ink supply port 571. A portion at which the ink needle 102 and the ink supply port 571 contact each other is denoted as PP in FIGS. 24A and 24B. This portion PP serves as a pivot center of the ink cartridge 530.

The cartridge body 531 includes an upper wall 539 whose upper surface serves as the upper surface of the ink cartridge 530. On the upper surface of the upper wall 539, an IC board 564, a contact surface 584 and a locking surface 551 are provided. As in the embodiment, the IC board 564 and the contact surface 584 are both positioned rearward relative to the ink supply port 571 of the ink supply portion 534, and the locking surface 551 is configured to be engaged with the lock shaft 145 of the cartridge-attachment section 110. However, in the fourth modification, the contact surface 584 is positioned rearward relative to the locking surface 551. That is, the locking surface 551 is positioned rearward relative to the IC board 564, but frontward relative to the contact surface 584 in the front-rear direction.

In accordance with pivotal movement of the ink cartridge 530 from the second posture to the first posture, the contact surface 584 is brought into contact with the lock shaft 145 from below. That is, in the attached state of the ink cartridge 530, the lock shaft 145 is in contact with both of the locking surface 551 and the contact surface 584 to provide positioning of the ink cartridge 530 in the front-rear direction as well as in the up-down direction. Put another way, the lock shaft 145 also has the function of the positioning portion 107 of the embodiment.

With this structure of the fourth modification, the same technical and operational advantages as those of the embodiment can be obtained.

5. Fifth Modification

Figure 25A:
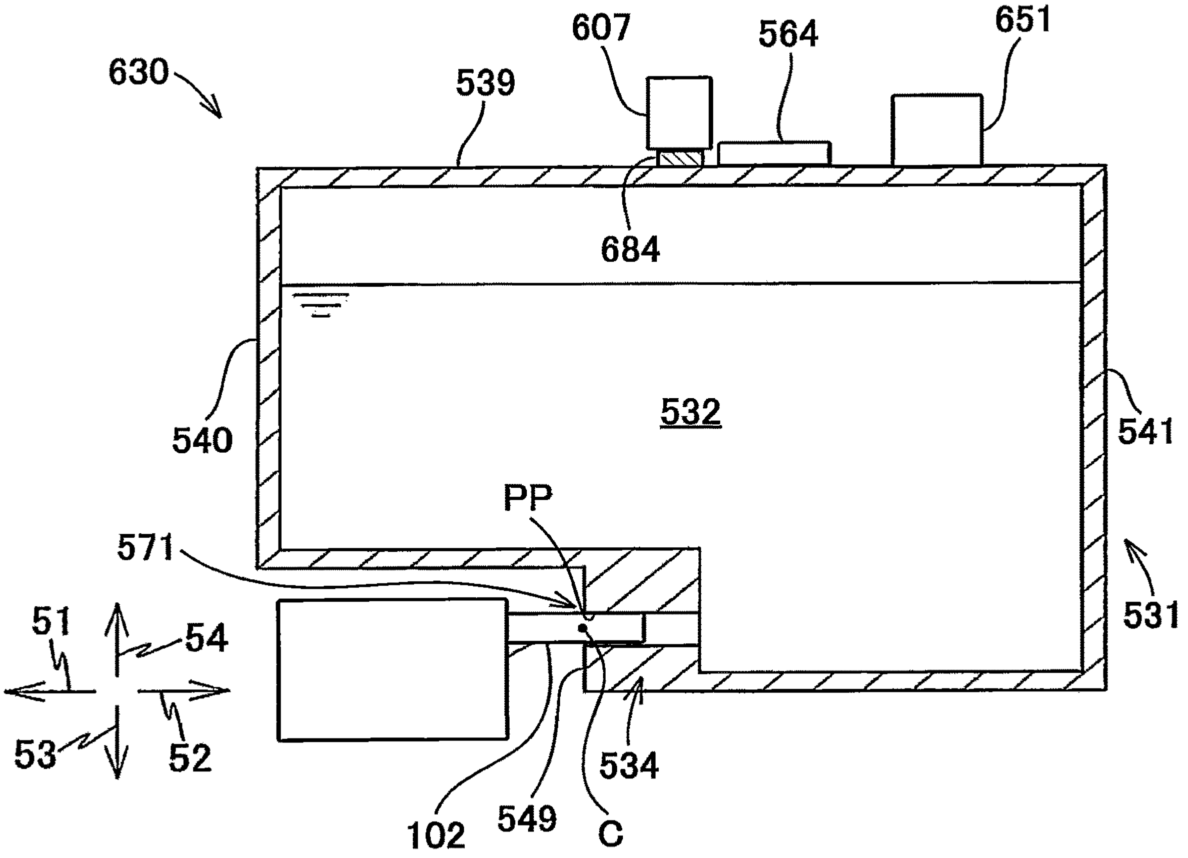
FIG. 25A is a vertical cross-sectional view of an ink cartridge according to a fifth modification to the embodiment.
Figure 25B:
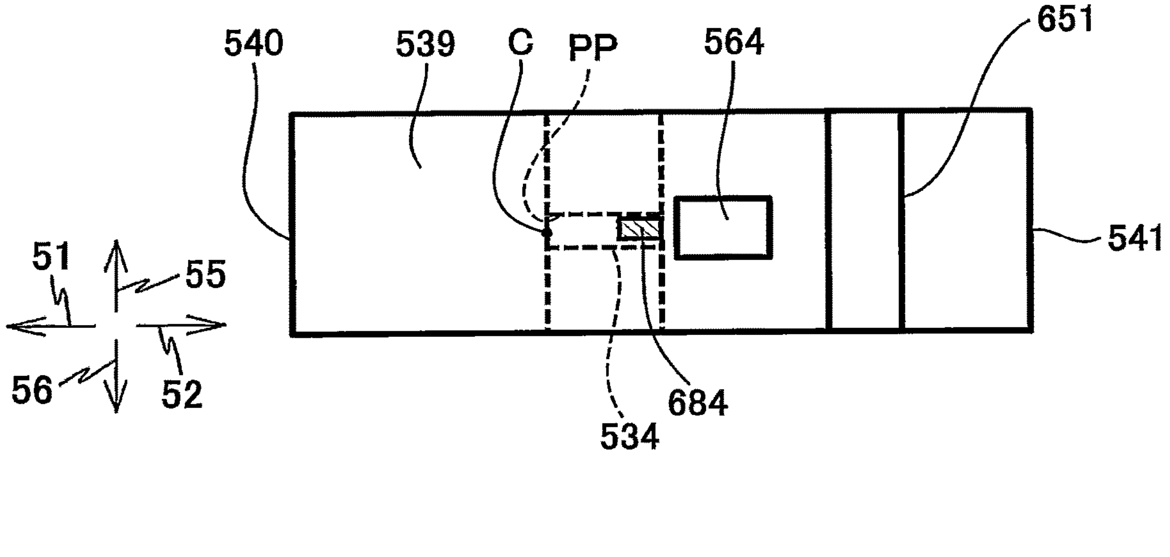
FIG. 25B is a top view of the ink cartridge according to the fifth modification to the embodiment.

FIGS. 25A and 25B illustrate an ink cartridge 630 according to a fifth modification to the embodiment.

The ink cartridge 630 includes the cartridge body 531 of the fourth embodiment. On the upper surface of the upper wall 539, the IC board 564, a contact surface 684 and the locking surface 551 are provided. The contact surface 684 is positioned rearward relative to the ink supply port 571 of the ink supply portion 534 (portion PP) as in the embodiment. However, the contact surface 684 is positioned frontward relative to the IC board 564 in this modification. That is, the contact surface 684 is positioned frontward of the IC board 564 and the locking surface 551 in the front-rear direction. Still, in this modification, the IC board 564 is positioned closer to the contact surface 684 than to the locking surface 651 in the front-rear direction. In accordance with pivotal movement of the ink cartridge 630 from the second posture to the first posture, the contact surface 684 is brought into contact with a positioning portion 607 provided at the cartridge-attachment section 110 (see FIG. 25A).

With this structure of the fifth modification, the same technical and operational advantages as those of the embodiment can be obtained.

6. Sixth Modification

In the depicted embodiment, the contact surface 84 is aligned with the IC board 64 in the front-rear direction. However, the contact surface 84 may not be aligned with the IC board 64 in the front-rear direction.

Figure 26A:
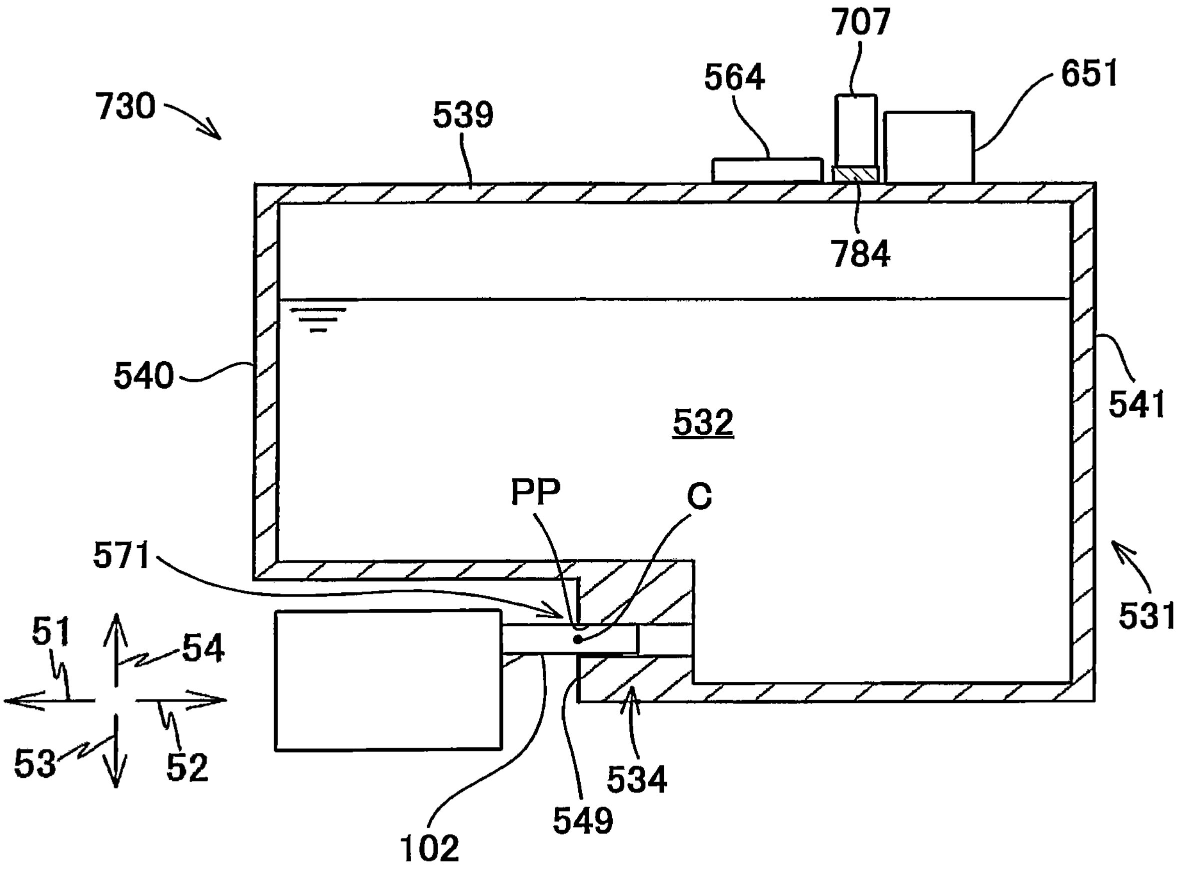
FIG. 26A is a vertical cross-sectional view of an ink cartridge according to a sixth modification to the embodiment.
Figure 26B:
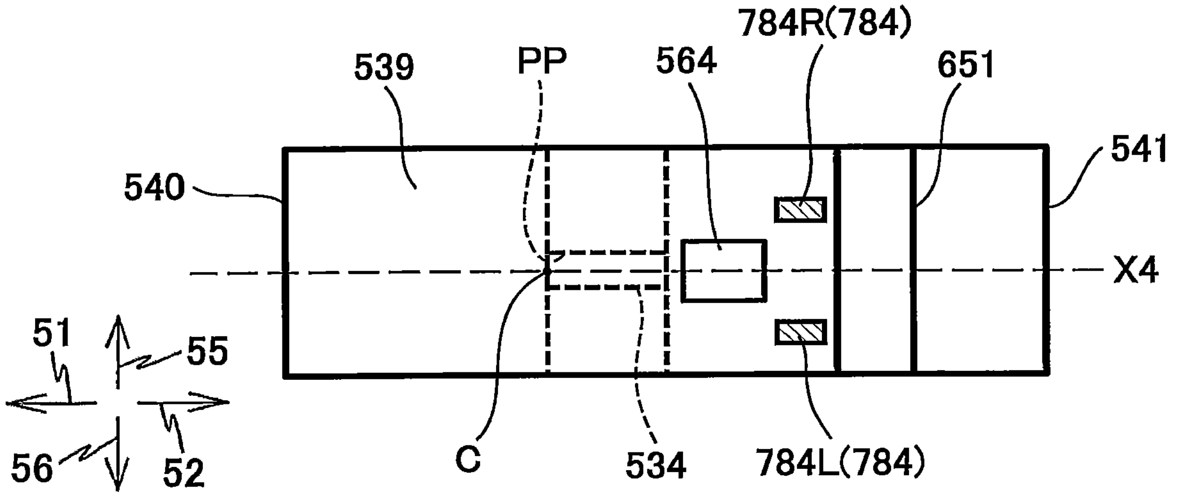
FIG. 26B is a top view of the ink cartridge according to the sixth modification to the embodiment.

FIGS. 26A and 26B illustrate an ink cartridge 730 according to a sixth modification to the embodiment. This ink cartridge 730 includes the cartridge body 531 of the fourth embodiment. On the upper surface of the upper wall 539, the IC board 564, the locking surface 551, and a contact surface 784 configured of a pair of contact portions 784L and 784R are provided.

In this modification, the contact portions 784L and 784R are positioned spaced away from each other in the left-right direction. Specifically, referring to FIG. 26B, assuming an imaginary plane X4 extending in the front-rear direction and passing through centers of the IC board 564 and the locking surface 551 in the left-right direction, the contact portions 784L and 784R are positioned opposite to each other with respect to the imaginary plane X4. That is, neither one of the contact portions 784L nor 784R is aligned with the IC board 564 in the front-rear direction. The imaginary plane X4 passes through the portion PP in the ink supply portion 534 (pivot center) in this modification. In accordance with pivotal movement of the ink cartridge 730 from the second posture to the first posture, the contact portions 784L and 784R are brought into contact with a positioning portion 707 provided at the cartridge-attachment section 110 (see FIG.

26A). Further, in this modification as well, the IC board 564 is positioned closer to the contact surface 784 (contact portions 784L and 784R) than to the locking surface 551 in the front-rear direction.

With this structure, the contact between the contact surface 784 (contact portions 784L and 784R) and the positioning portion 707 can suppress the ink cartridge 730 from pivotally moving about the portion PP relative to the imaginary plane X4. Further, the same technical and operational advantages as those of the embodiment can be obtained.

7. Seventh Modification

In the depicted embodiment, the contact surface 84 is a plane facing upward in the first posture. That is, the contact surface 84 of the embodiment extends parallel to the front-rear direction (horizontal direction). However, the contact surface 84 may not necessarily face upward in the first posture.

Figure 27A:
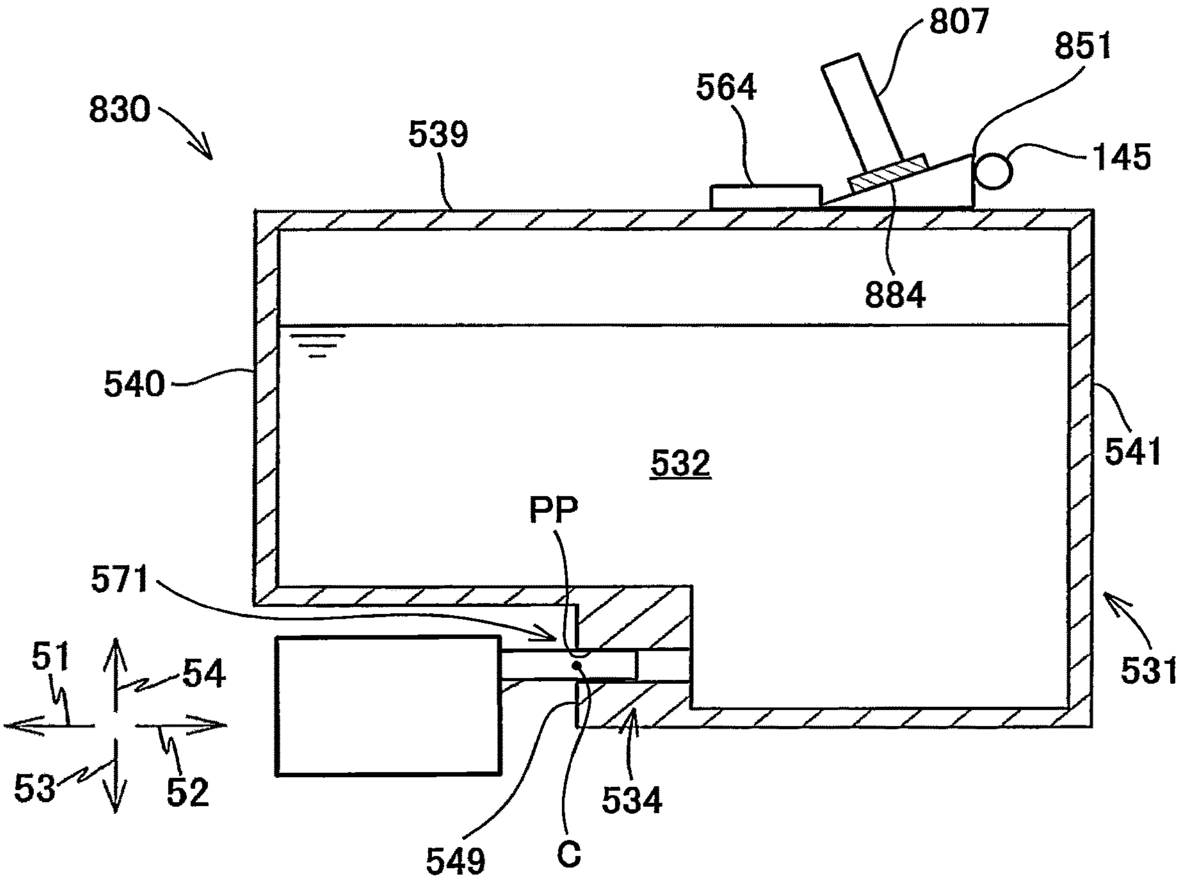
FIG. 27A is a vertical cross-sectional view of an ink cartridge according to a seventh modification to the embodiment.
Figure 27B:
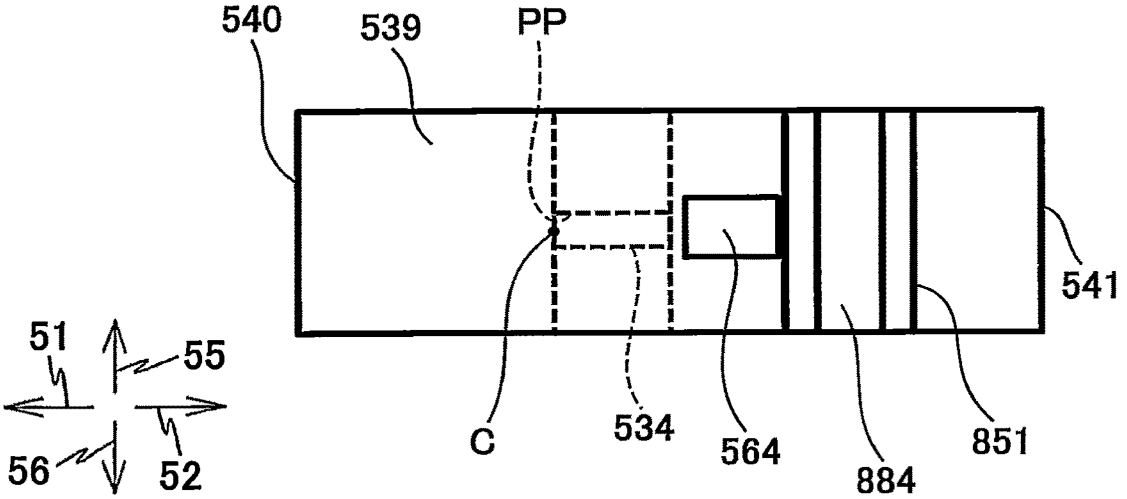
FIG. 27B is a top view of the ink cartridge according to the seventh modification to the embodiment.

For example, FIGS. 27A and 27B illustrate an ink cartridge 830 according to a seventh modification to the embodiment.

The ink cartridge 830 includes the cartridge body 531 of the fourth embodiment. On the upper surface of the upper wall 539, the IC board 564, a contact surface 884 and a locking surface 851 are provided. The contact surface 884 is a sloped surface that is positioned frontward relative to the locking surface 851 in the front-rear direction. The contact surface 884 is sloped relative to the front-rear direction such that the contact surface 884 faces upward and frontward. Preferably, in this structure, the contact surface 884 is slanted relative to the front-rear direction at an angle equal to or smaller than 45°. The locking surface 851 is a plane extending vertically and is configured to be engaged with the lock shaft 145 of cartridge-attachment section 110, as in the embodiment. In accordance with pivotal movement of the ink cartridge 830 from the second posture to the first posture, the contact surface 884 is brought into contact with a positioning portion 807 provided at the cartridge-attachment section 110 (see FIG. 27A) from below, as in the embodiment.

With this structure of the seventh modification, the same technical and operational advantages as those of the embodiment can be obtained.

8. Eighth Modification

In the depicted embodiment, the contact surface 84 is a plane constituting a portion of the cartridge body 31 of the ink cartridge 30. However, the contact surface 84 may not necessarily be a part of the cartridge body 31.

Figure 28A:
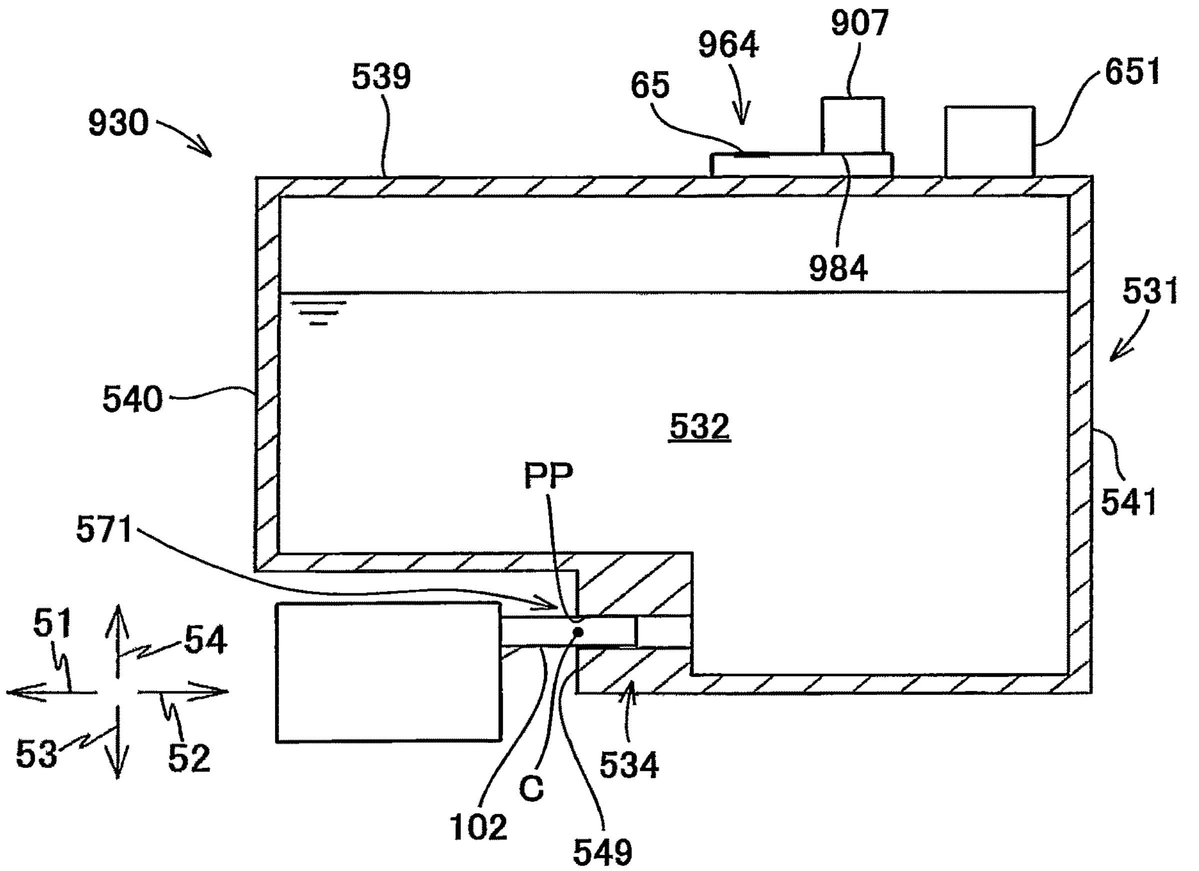
FIG. 28A is a vertical cross-sectional view of an ink cartridge according to an eighth modification to the embodiment.
Figure 28B:
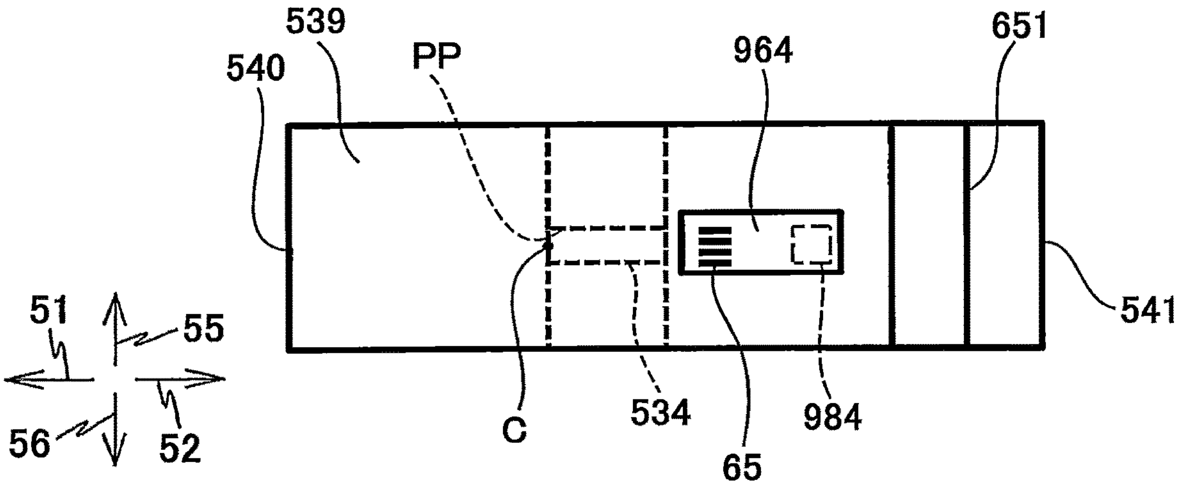
FIG. 28B is a top view of the ink cartridge according to the eighth modification to the embodiment.

For example, FIGS. 28A and 28B illustrate an ink cartridge 930 according to an eighth modification to the embodiment.

The ink cartridge 930 includes the cartridge body 531 of the fourth embodiment. On the upper surface of the upper wall 539, an IC board 964 and the locking surface 651 are provided. In this modification, the IC board 964 is elongated in the front-rear direction. The IC board 964 has a frontward portion on which the electrodes 65 are disposed, and a rearward portion serving as a contact surface 984 configured to contact a positioning portion 907 (see FIG. 28A) of the cartridge-attachment section 110. In this modification, the electrodes 65 are an example of the electrical interface. That is, the ink cartridge 930 has the contact surface 984 that is positioned rearward of the portion PP. That is, the contact surface 984 is positioned rearward relative to the electrodes 65 in the front-rear direction. Still, in this modification, the electrodes 65 are positioned closer to the contact surface 984 than to the locking surface 651 in the front-rear direction. In accordance with pivotal movement of the ink cartridge 930 from the second posture to the first posture, the contact surface 984 is brought into contact with the positioning portion 607 of the cartridge-attachment section 110 from below, as in the depicted embodiment.

With this structure, since the IC board 964 on which the electrodes 65 are disposed also includes the contact surface 984, positioning accuracy can be enhanced. Further, with this structure of the eighth modification, the same technical and operational advantages as those of the embodiment can be obtained.

9. Other Variations

In the above-described embodiment, the controller 117 is configured to determine the type of the ink cartridge 30 attached to the cartridge-attachment section 110 based on the presence/absence of the cutout 66 in the light-blocking plate 67, during insertion of the ink cartridge 30 into the cartridge-attachment section 110 and at the time of completion of the attachment of the ink cartridge 30 to the cartridge-attachment section 110. Alternatively, assuming that the cutout 66 is not formed in each light-blocking plate 67, the controller 117 may be configured to determine whether or not the ink cartridge 30 is attached to the cartridge-attachment section 110 based on presence/absence of the light-blocking plate 67.

Figure 29:
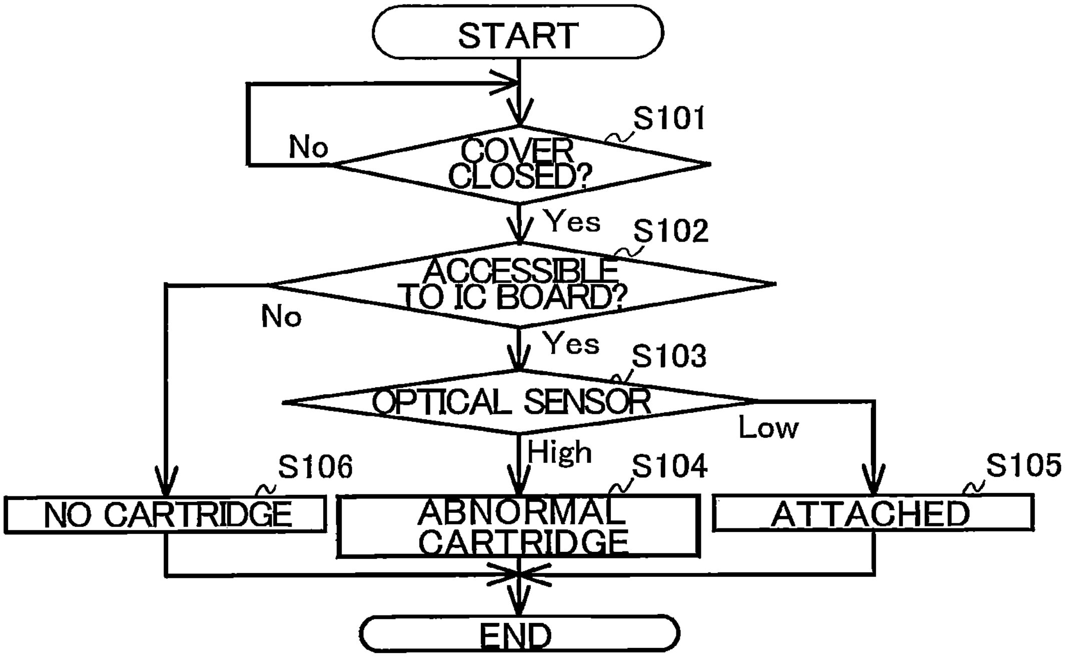
FIG. 29 is a flow chart illustrating steps of a process according to a variation of the embodiment performed by the controller of the printer to determine whether the ink cartridge according to the embodiment is attached to the cartridge-attachment section.

Specifically, referring to a flowchart of FIG. 29, the controller 117 first determines in S101 whether or not the cover 114 is closed. Specifically, when the signal outputted from the cover sensor 115 changes to low level, the controller 117 determines that the cover 114 is at the closing position (S101: YES) and advances to the step S102. The controller 117 repeats the step S101 as long as the signal from the cover sensor 115 remains at high level and does not change to low level (S101: NO).

After the cover 114 is determined to be at the closing position in S101, the controller 117 determines in S102 whether or not accessing to the IC board 64 through the contacts 106 can be made. For example, the controller 117 may determine whether or not the accessing to the IC board 64 is possible based on: whether or not a specific voltage can be applied to the IC board 64 (i.e., based on absence or presence of the IC board 64); or whether or not the controller 117 can get access to a memory of the IC board 64.

In case that the controller 117 cannot access the IC board 64 (S102: NO), the controller 117 determines in S106 that the ink cartridge 30 is not attached to the cartridge-attachment section 110. In this case, the controller 117 may give a warning to the user to inform him that the ink cartridge 30 is not attached to the cartridge-attachment section 110, for example, through a message such as "No Cartridge" on the display.

In case that the controller 117 can access the IC board 64 (S102: YES), the controller 117 determines in S103 whether the signal outputted from the optical sensor 113 is high level or low level. In case that the signal from the optical sensor 113 is a high level signal (S103: High), the controller 117 determines in S104 that an abnormal ink cartridge 30 is attached to the cartridge-attachment section 110. The optical sensor 113 is configured to output the high level signal in case that the light-blocking plate 67 is not provided at the attached ink cartridge 30. Thus, the controller 117 determines the attached ink cartridge 30 is abnormal. In case that the controller 117 determines that the attached ink cartridge 30 is abnormal, the controller 117 may give a warning to the user to inform him so, for example, through a message such as "Abnormal Cartridge Attached" on the display.

In case that the signal outputted from the optical sensor 113 is a low level signal (S103: Low), the controller 117 determines in S105 that the ink cartridge 30 is correctly attached to the cartridge-attachment section 110. Here, the optical sensor 113 is configured to output the low level signal, since the light-blocking plate 67 of the attached ink cartridge 30 blocks the light emitted from the optical sensor 113. In other words, the controller 117 is configured to determine whether or not the ink cartridge 30 is attached to the cartridge-attachment section 110 by detecting the presence/absence of the light-blocking plate 67. According to this variation, the ink cartridge 30 is determined to be attached to the cartridge-attachment section 110 in case that: the controller 117 can access the IC board 64; and the light-blocking plate 67 blocks or attenuates the light from the optical sensor 113.

Still another variation is conceivable with regard to the determination performed by the controller 117.

In the depicted embodiment, the controller 117 may determine whether or not the ink cartridge 30 is attached to the cartridge-attachment section 110 based on whether or not accessing to the IC board 64 is possible; and the controller 117 is configured to determine the type of the ink cartridge 30 attached to the cartridge-attachment section 110 based on the presence/absence of the cutout 66 in the light-blocking plate 67.

However, the controller 117 may determine whether or not the ink cartridge 30 is attached to the cartridge-attachment section 110 based on presence or absence of the light-blocking plate 67: and the controller 117 may further determine whether or not the attached ink cartridge 30 is abnormal based on whether or not accessing to the IC board 64 is possible. Assume in this case as well that the cutout 66 is not formed in each light-blocking plate 67.

Figure 30:
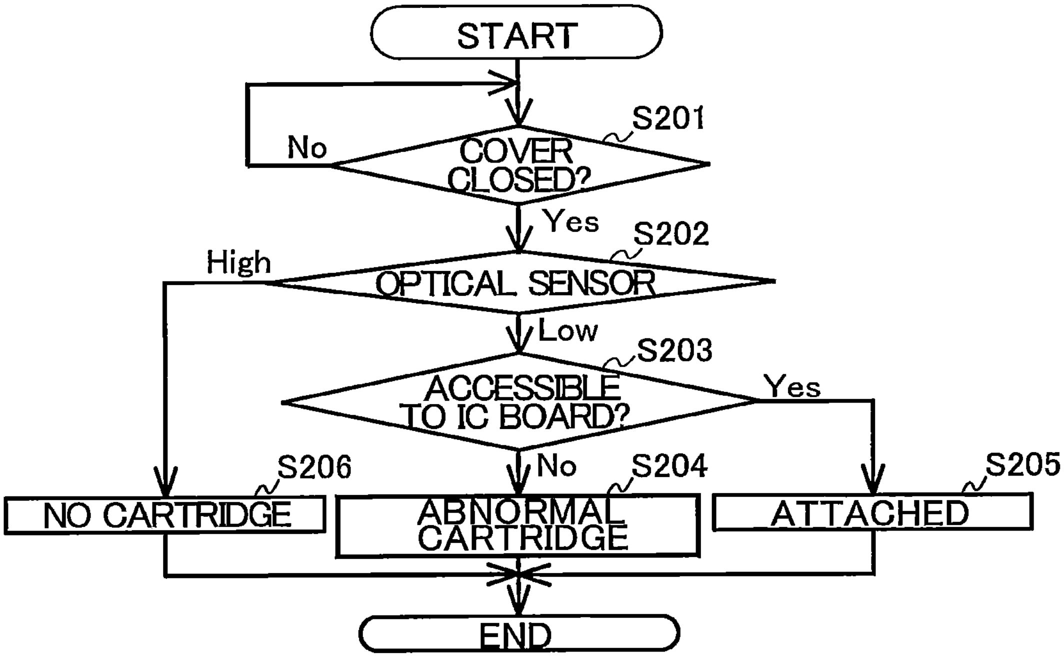
FIG. 30 is a flow chart illustrating steps of a process according to another variation of the embodiment performed by the controller of the printer to determine whether the ink cartridge according to the embodiment is attached to the cartridge-attachment section.

More specifically, referring to a flowchart of FIG. 30, the controller 117 first determines in S201 whether or not the cover 114 is closed. Specifically, when the signal outputted from the cover sensor 115 changes to low level, the controller 117 determines that the cover 114 is at the closing position (S201: YES) and advances to the step S202. The controller 117 repeats the step S201 as long as the signal from the cover sensor 115 remains at high level and does not change to low level (S201: NO).

After the cover 114 is determined to be at the closing position in S201, the controller 117 determines in S202 whether the signal outputted from the optical sensor 113 is high level or low level. The optical sensor 113 is configured to output the high level signal in case that the light-blocking plate 67 is not provided at the attached ink cartridge 30 and thus the light from the optical sensor 113 is not blocked or attenuated by the light-blocking plate 67. In case that the signal from the optical sensor 113 is a high level signal (S202: High), the controller 117 determines in S206 that the ink cartridge 30 is not attached to the cartridge-attachment section 110. In case that the controller 117 determines in S206 that no ink cartridge 30 is attached, the controller 117 may give a warning to the user to inform him so, for example, through a message such as "No Cartridge" on the display.

In case that the signal from the optical sensor 113 is a low level signal (S202: Low), the controller 117 then determines in S203 whether or not accessing to the IC board 64 can be made. For example, the controller 117 may determine whether or not the accessing to the IC board 64 is possible based on: whether or not a specific voltage can be applied to the IC board 64 (i.e., based on absence or presence of the IC board 64); or whether or not the controller 117 can get access to a memory of the IC board 64.

In case that the controller 117 cannot access the IC board 64 (S203: NO), the controller 117 determines in S204 that the attached ink cartridge 30 is abnormal. In case that the controller 117 determines that the attached ink cartridge 30 is abnormal, the controller 117 may give a warning to the user to inform him so, for example, through a message such as "Abnormal Cartridge Attached" on the display.

In case that the controller 117 can access the IC board 64 (S203: YES), the controller 117 determines in S205 that the ink cartridge 30 is correctly attached to the cartridge-attachment section 110.

Further, in the above-described embodiment, the ink cartridge 30 is pivotable about the center C of the ink supply port 71 to move between the first posture and the second posture. Alternatively, the pivot center may be positioned other than the ink supply port 71. For example, the pivot center may be a prescribed position on a particular portion of an outer surface of the cylinder 75 that contacts the guide portion 105. Alternatively, in case that a member may be provided at the cartridge-attachment section 110 so as to make contact with the sub-lower wall 48 of the attached ink cartridge 30, the pivot center may be set to a position at which the member and the sub-lower wall 48 contact each other. In the embodiment, since the center C of the ink supply port 71 is defined as the pivot center, the ink needle 102 inserted in the ink supply port 71 is less likely to come off the packing 76 during pivotal movement of the ink cartridge 30 between the first posture and the second posture, thereby suppressing leakage of ink.

Still alternatively, the ink cartridge 30 may be configured to slide in the up-down direction to move between the first posture and the second posture.

Further, instead of the cartridge body 31 configured of the upper cover 31U and the lower case 31L, the cartridge body may have a nesting structure configured of two separate members: an inner case and an outer case that houses the inner case therein. In this case, the inner case defines an ink chamber therein, and the outer case constitutes an outer shell of the cartridge body 31.

Further, in the depicted embodiment, the light-blocking plate 67 is connected to the raised portion 39A constituting the upper surface 39 of the ink cartridge 30. However, the upper surface 39 does not necessarily include the raised portion 39A, but may be a flat plane, as in the third modification shown in FIGS. 23A and 23B. Further, even if the upper surface 39 includes the rear portion 39A (i.e., the upper surface 39 has a stepped structure as in the embodiment), the light-blocking plate 67 is not necessarily connected to the rear portion 39A.

Further, in the above-described embodiment, four kinds of the ink cartridges 30C, 30M, 30Y and 30K adapted to be inserted into the designated insertion spaces 111C, 111M, 111Y and 111K, respectively, are provided as a set. However, more than four kinds of ink cartridges 30 may be provided as one set of the printing-fluid cartridges.

Note that the rearmost point P5 of the ink cartridge 30 may not be defined on the rear surface 41 of the cartridge body 31. The rearmost point P5 may be defined on the operation portion 90, in case that the operation portion 90 has a portion that protrudes further rearward relative to the rear surface 41 constituting the cartridge body 31 of the ink cartridge 30.

Further, in the above-described embodiment, the coil spring 78 of the ink supply portion 34 functions to urge the ink cartridge 30 attached to the cartridge-attachment section 110 rearward. However, a different structure from the depicted configuration may be employed for urging the ink cartridge 30 attached to the cartridge-attachment section 110 rearward.

For example, a spring for biasing the ink cartridge 30 rearward may be provided at a position other than the ink supply portion 34. A spring may be provided at the front surface 40 of the cartridge body 31 to extend frontward therefrom for urging the ink cartridges 30 rearward. Alternatively, a spring may be disposed at the end wall of the case 101 to extend rearward therefrom to urge the ink cartridge 30 attached to the cartridge-attachment section 110 in the rearward direction 52.

In the depicted embodiment, the coil spring 98 is disposed within the air valve chamber 36 to move the valve 97 to open and close the air communication port 96. This coil spring 98 also serves to urge the ink cartridge 30 rearward in the depicted embodiment. However, a coil spring different from the coil spring 98 may be provided solely for urging the ink cartridge 30 in the rearward direction 52. For example, assuming that the air communication port 96 is formed in the connecting wall 95 or in an outer wall other than the front wall 40, a coil spring may be disposed at the connecting wall 95 or somewhere in an inner space defined in the upper cover 31U such that the coil spring does not serves to open the first ink chamber 32 to the atmosphere.

Further, while ink serves as an example of the printing fluid in the depicted embodiment, the printing fluid of the present disclosure is not limited to ink. For example, a pretreatment liquid that is ejected onto sheets prior to ink during a printing operation may be stored in the printing-fluid cartridge. Alternatively, cleaning water for cleaning the recoding head 21 may be stored in the printing-fluid cartridge. Still further, powder-like material having fluidity, such as toner, may be used as the printing fluid.

What is claimed is:

1. A printing-fluid cartridge configured to be inserted into a printing-fluid consuming apparatus, the printing-fluid cartridge comprising:

a storage chamber configured to store printing fluid therein;

a supply portion extending in a frontward direction and configured to supply the printing fluid from the storage chamber in the frontward direction, the supply portion having a supply port facing in the frontward direction;

an upper surface positioned upward relative to the storage chamber in an upward direction perpendicular to the frontward direction;

a substrate disposed at the upper surface, the substrate being provided with at least one electrical interface, the at least one electrical interface being positioned rearward relative to the supply port of the supply portion in the frontward direction; and a locking surface positioned upward relative to the storage chamber in the upward direction and facing rearward in the frontward direction, wherein the upper surface includes a first contact portion and a second contact portion configured to contact the printing-fluid consuming apparatus when the printing-fluid cartridge is inserted in the printing-fluid consuming apparatus, wherein the first contact portion and the second contact portion are in a spaced apart relationship and aligned with each other in a widthwise direction perpendicular to the frontward direction and the upward direction, the first and second contact portions being positioned rearward relative to the supply port of the supply portion and rearward relative to the at least one electrical interface in the frontward direction, the first and second contact portions facing upward in the upward direction, wherein the substrate has a width in the widthwise direction, and wherein the first contact portion and the second contract portion define a gap therebetween in the widthwise direction, the gap between the first contact portion and the second contact portion being greater than the width of the substrate in the widthwise direction.

2. The printing-fluid cartridge as claimed in claim 1, wherein the first contact portion and the second contact portion are arranged opposite to each other in the widthwise direction with respect to an imaginary plane extending in the frontward direction and passing through a center of the at least one electrical interface and a center of the locking surface in the widthwise direction.

3. The printing-fluid cartridge as claimed in claim 2, wherein at least a portion of the locking surface intersects with the imaginary plane.

4. The printing-fluid cartridge as claimed in claim 1, wherein at least one of the first and second contact portions has a portion that is positioned rearward relative to the substrate in the frontward direction.

5. The printing-fluid cartridge as claimed in claim 4, wherein at least one of the first and second contact portions has a portion that is positioned forward of the locking surface in the frontward direction.

6. The printing-fluid cartridge as claimed in claim 5, wherein the first contact portion and the second contact portion are arranged opposite to each other in the widthwise direction with respect to an imaginary plane extending in the frontward direction and passing through a center of the at least one electrical interface and a center of the locking surface in the widthwise direction.

7. The printing-fluid cartridge as claimed in claim 6, wherein at least a portion of the locking surface intersects with the imaginary plane.

8. A printing-fluid cartridge configured to be inserted into a printing-fluid consuming apparatus, the printing-fluid cartridge comprising:

a storage chamber configured to store printing fluid therein;

a supply portion extending in a frontward direction and configured to supply the printing fluid from the storage chamber in the frontward direction, the supply portion having a supply port facing in the frontward direction;

an upper surface positioned upward relative to the storage chamber in an upward direction perpendicular to the frontward direction;

a substrate disposed at the upper surface, the substrate being provided with at least one electrical interface, the at least one electrical interface being positioned rearward relative to the supply port of the supply portion in the frontward direction; and a locking surface positioned upward relative to the storage chamber in the upward direction and facing rearward in the frontward direction, wherein the upper surface includes a first contact portion and a second contact portion configured to contact the printing-fluid consuming apparatus when the printing-fluid cartridge is inserted in the printing-fluid consuming apparatus, wherein the first contact portion and the second contact portion are in a spaced apart relationship and aligned with each other in a widthwise direction perpendicular to the frontward direction and the upward direction, the first and second contact portions being positioned rearward relative to the supply port of the supply portion and rearward relative to the at least one electrical interface in the frontward direction, the first and second contact portions facing upward in the upward direction, wherein the locking surface has an upper end in the upward direction, and wherein the first and second contact portions are positioned lower than the upper end of the locking surface in the upward direction.

9. The printing-fluid cartridge as claimed in claim 8, wherein the first contact portion and the second contact portion are arranged opposite to each other in the widthwise direction with respect to an imaginary plane extending in the frontward direction and passing through a center of the at least one electrical interface and a center of the locking surface in the widthwise direction.

10. The printing-fluid cartridge as claimed in claim 9, wherein at least a portion of the locking surface intersects with the imaginary plane.

11. The printing-fluid cartridge as claimed in claim 10, wherein the substrate has a width in the widthwise direction, and wherein the first contact portion and the second contact portion define a gap therebetween in the widthwise direction, the gap between the first contact portion and the second contact portion being greater than the width of the substrate in the widthwise direction.

12. The printing-fluid cartridge as claimed in claim 8, wherein at least one of the first and second contact portions has a portion that is positioned rearward relative to the substrate in the frontward direction.

13. The printing-fluid cartridge as claimed in claim 12, wherein at least one of the first and second contact portions has a portion that is positioned forward of the locking surface in the frontward direction.

14. The printing-fluid cartridge as claimed in claim 8, wherein the first contact portion and the second contact portion are arranged opposite to each other in the widthwise direction with respect to an imaginary plane extending in the frontward direction and passing through a center of the at least one electrical interface and a center of the locking surface in the widthwise direction, and wherein at least one of the first and second contact portions has a portion that is positioned rearward relative to the substrate in the frontward direction.

15. The printing-fluid cartridge as claimed in claim 14, wherein at least a portion of the locking surface intersects with the imaginary plane.

16. The printing-fluid cartridge as claimed in claim 15, wherein the substrate has a width in the widthwise direction, and wherein the first contact portion and the second contact portion define a gap therebetween in the widthwise direction, the gap between the first contact portion and the second contact portion being greater than the width of the substrate in the widthwise direction.

17. The printing-fluid cartridge as claimed in claim 16, wherein at least one of the first and second contact portions has a portion that is positioned forward of the locking surface in the frontward direction.

* * * * *